Nov. 29, 1960   D. W. FATH ET AL   2,962,175
BLAST FURNACE CHARGING CONTROLLER
Filed March 10, 1958   13 Sheets-Sheet 1

Inventors
Douglas W. Fath
Charles E. Smith
By Wm. A. Autio
Attorney

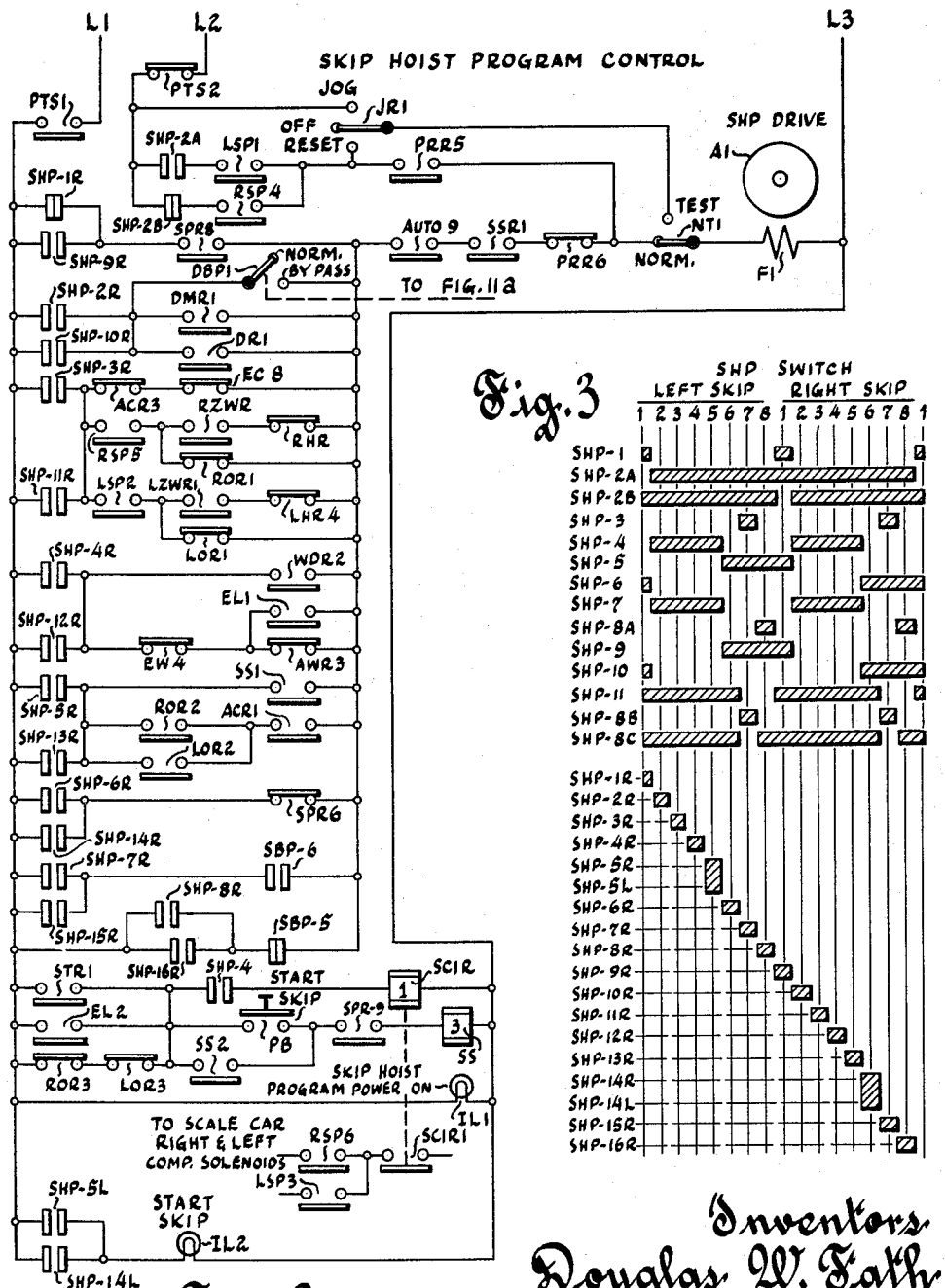

Nov. 29, 1960     D. W. FATH ET AL     2,962,175
BLAST FURNACE CHARGING CONTROLLER
Filed March 10, 1958     13 Sheets-Sheet 3

*Fig. 4a*

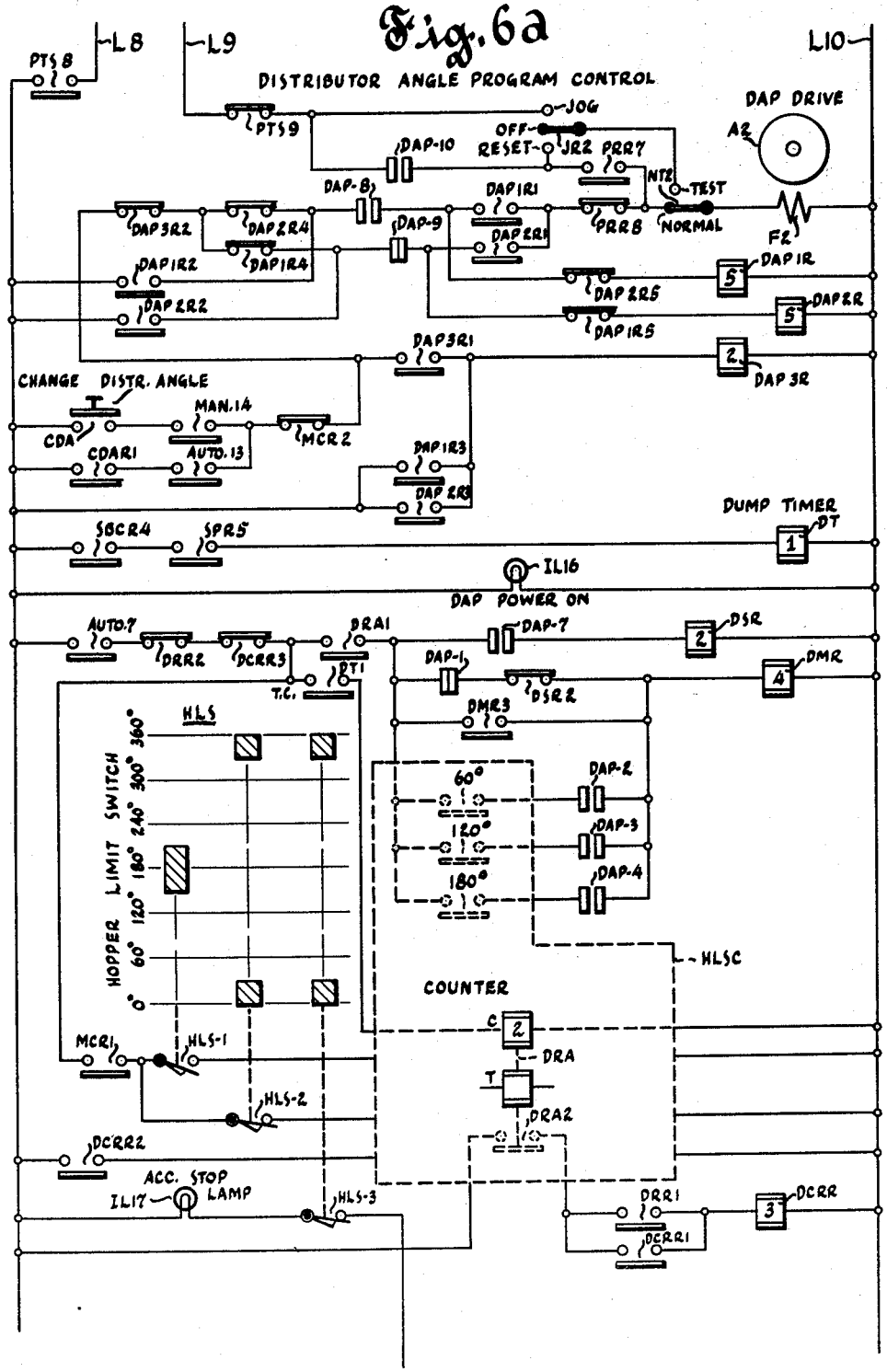

Nov. 29, 1960 D. W. FATH ET AL 2,962,175
BLAST FURNACE CHARGING CONTROLLER
Filed March 10, 1958 13 Sheets-Sheet 6

Inventors
Douglas W. Fath
Charles E. Smith
By Wm. A. Autio
Attorney

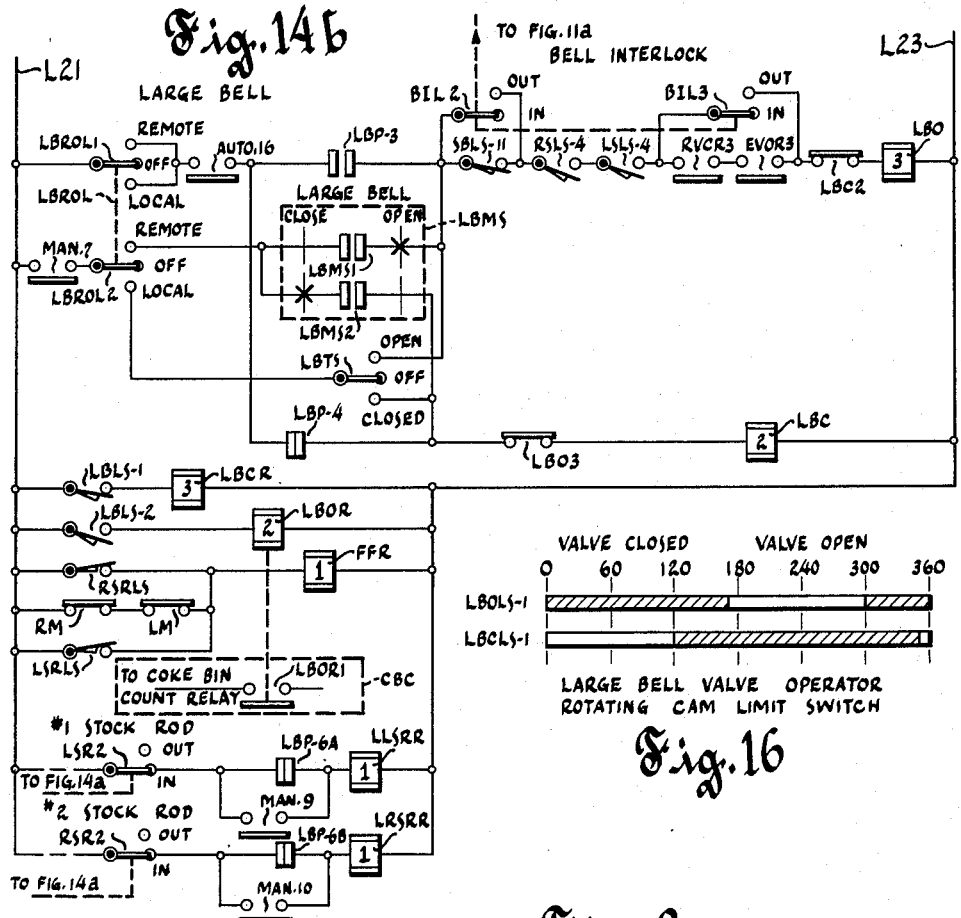
Fig. 14b
Fig. 16
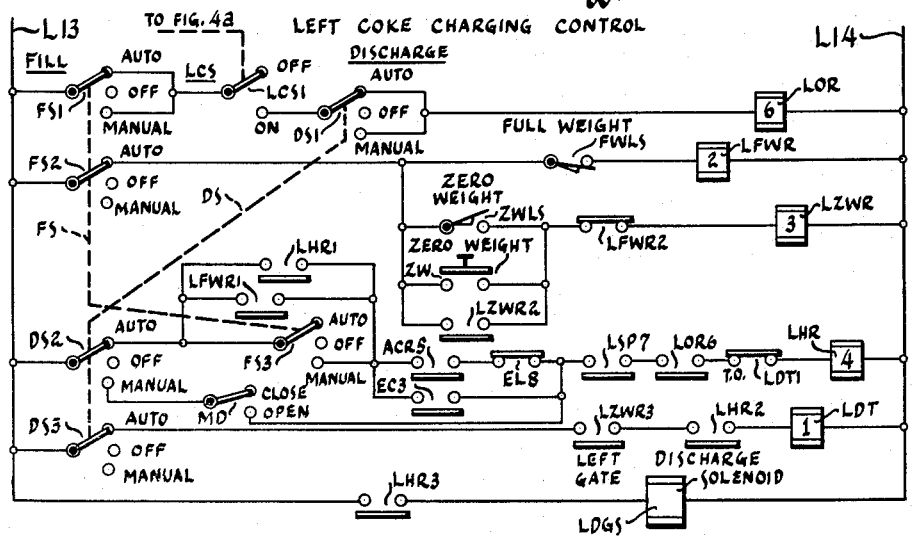
Fig. 8

Nov. 29, 1960     D. W. FATH ET AL     2,962,175
BLAST FURNACE CHARGING CONTROLLER
Filed March 10, 1958     13 Sheets-Sheet 9

Nov. 29, 1960  D. W. FATH ET AL  2,962,175
BLAST FURNACE CHARGING CONTROLLER
Filed March 10, 1958  13 Sheets-Sheet 10
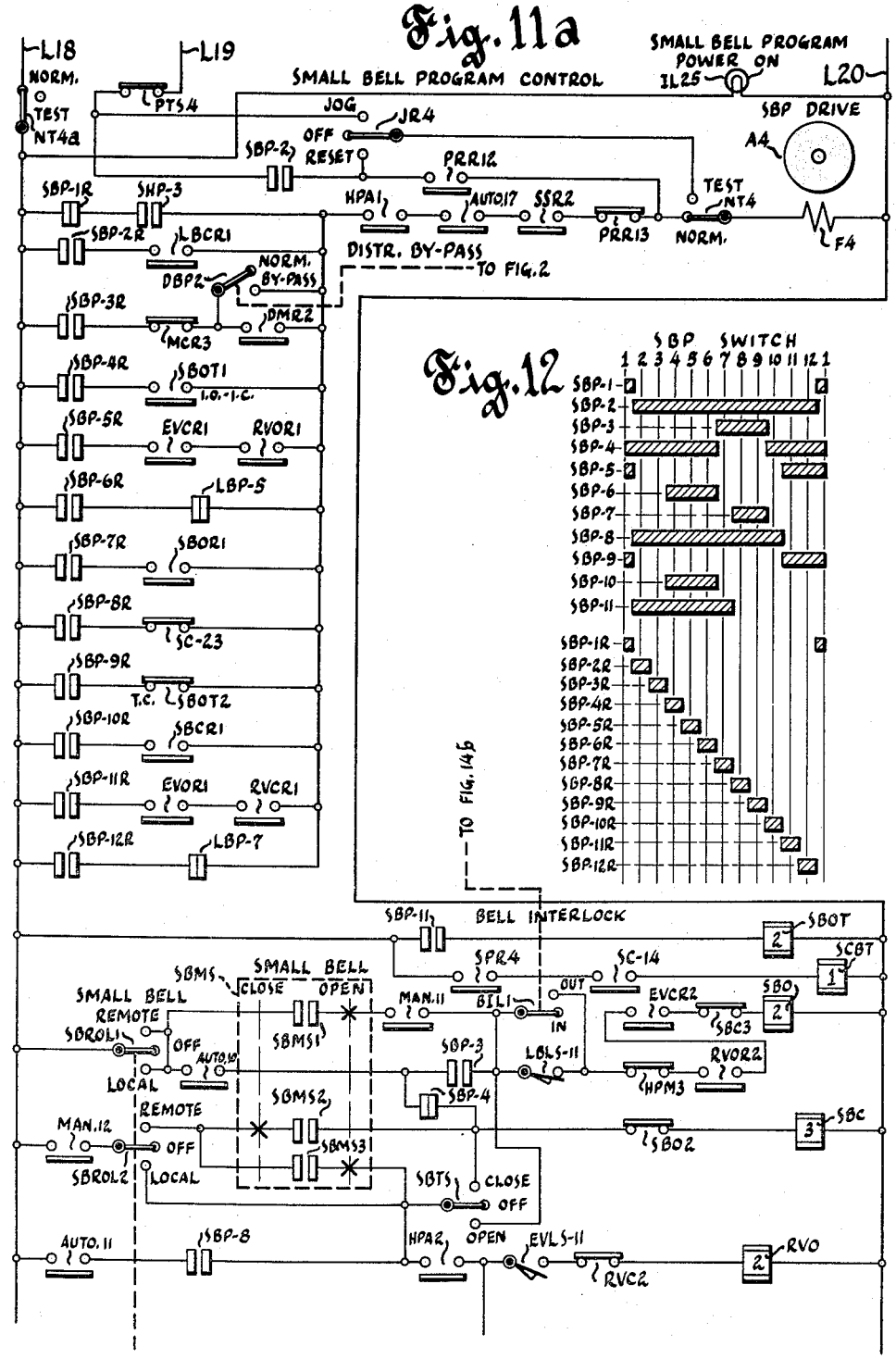

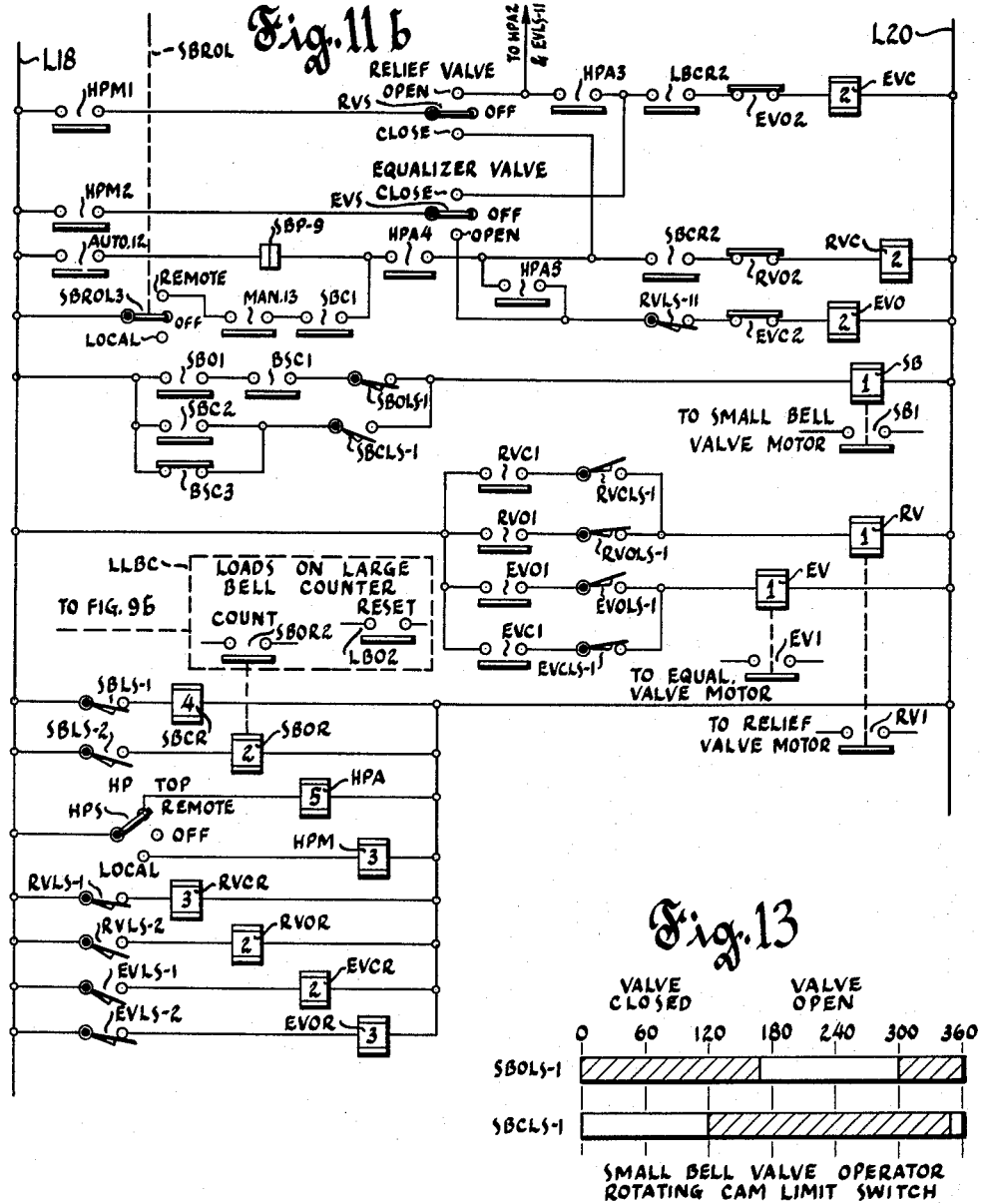

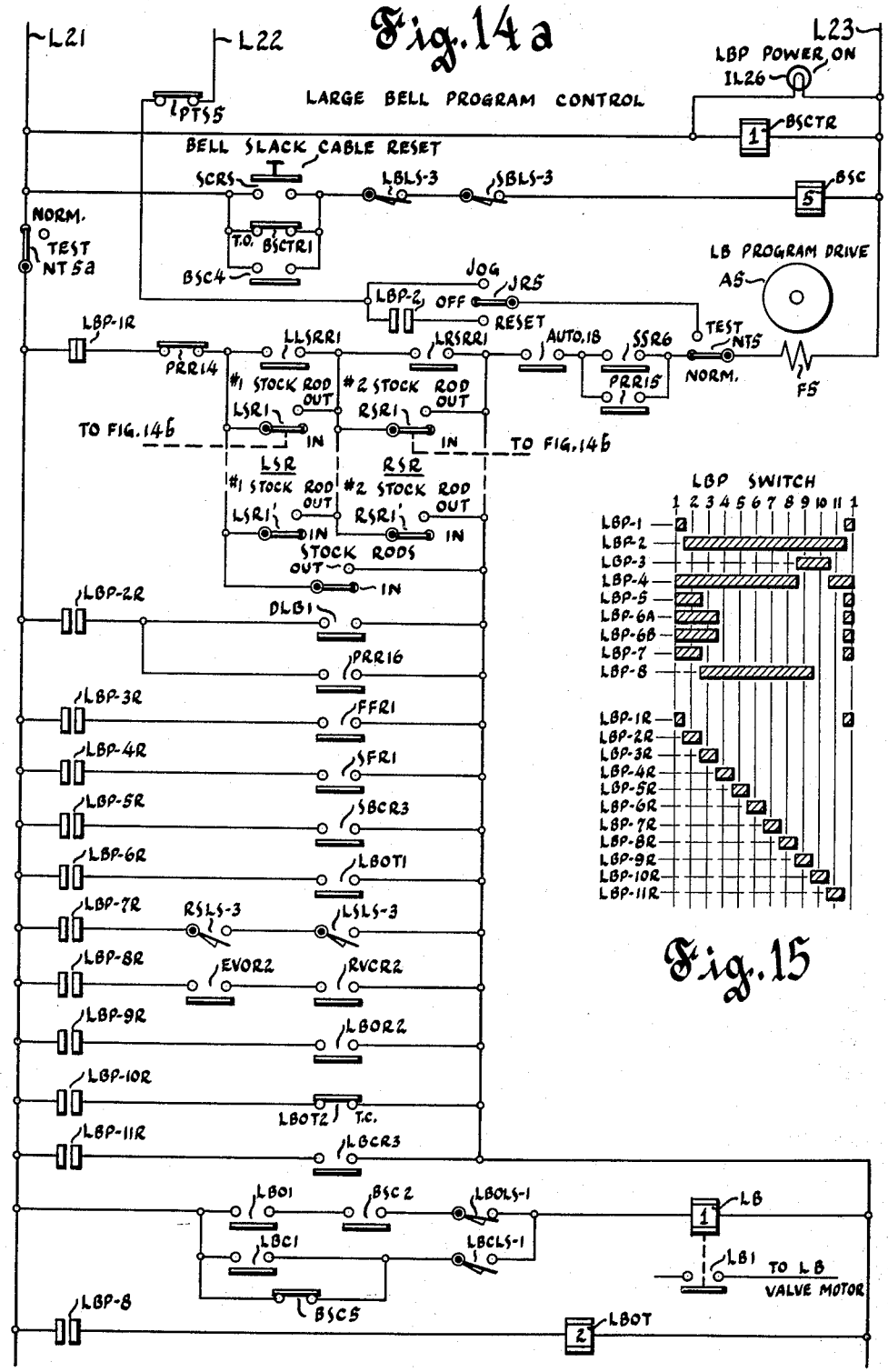

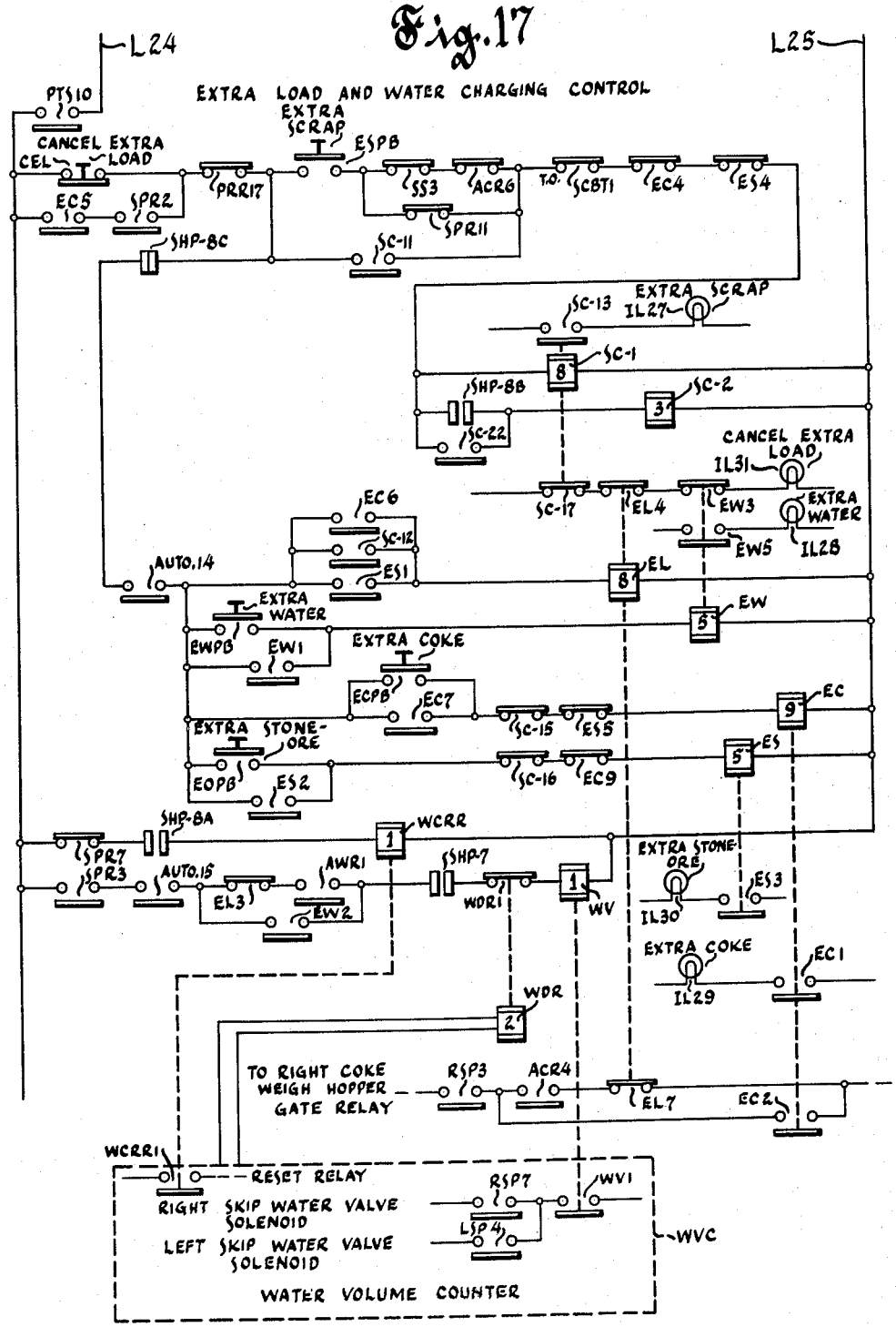

United States Patent Office 2,962,175
Patented Nov. 29, 1960

2,962,175
BLAST FURNACE CHARGING CONTROLLER
Douglas W. Fath, Brookfield, and Charles E. Smith, Milwaukee, Wis., assignors to Cutler-Hammer, Inc., Milwaukee, Wis., a corporation of Delaware
Filed Mar. 10, 1958, Ser. No. 720,400
47 Claims. (Cl. 214—19)

This invention relates to charging control and indicating systems for blast furnaces and the like.

In the processing of ore in a blast furnace, it is the usual practice to employ a skip hoist mechanism for charging the furnace. The usual skip hoist mechanism of this type comprises a pair of inclined tracks extending between a skip charging pit at the base of the furnace and a distributor hopper at the top of the furnace, and a pair of skip cars traveling on these tracks for conveying charging material from the pit and dumping the same into the distributor hopper. The skip cars are connected together through their operating mechanism in counter-balancing relation and arranged so that when one car is traveling upwardly along its track toward the top of the furnace the other car is traveling downwardly along its track toward the charging pit. During each of a plurality of steps of a cycle of the charging sequence, the skip car in the charging pit is loaded with a predetermined, measured quantity of preselected charging material whereafter the loaded skip car is hoisted to the top of the furnace and the material dumped onto a cone-shaped small bell in the distributor hopper. In order to evenly distribute the large and small particles of the charging material and to preselect and control the distribution of the different types of charging material in the furnace, the distributor hopper is rotated after each skip load has been dumped therein whereafter the small bell is lowered to discharge the material onto a cone-shaped large bell. After a preselected number of loads have been deposited on the large bell in a desired distribution, the latter is lowered to discharge the material into the furnace.

The high pressure furnace top comprising the small and large bells is provided with alternately operable relief and equalizer valves to facilitate opening of the bells. The relief valve connects the space between the bells to the atmosphere while the equalizer valve connects the space between the bells to the interior of the furnace. Thus, the respective valves when opened equalize the pressures on opposite sides of the bells to facilitate opening the latter. The valve operating mechanisms are interlocked with the bells so that the relief valve can be opened when both the large bell and equalizer valve are closed and the equalizer valve can be opened when both the small bell and relief valve are closed.

In the operation of the blast furnace, it is necessary that the charging sequence, that is, the order in which the various charging materials such as ore, stone, coke, water, etc. are dumped into the distributor hopper, be capable of controlled variation as desired. To attain this, it has been found desirable to provide a charging control system affording preselection of a desired charging sequence program and modification thereof at will by addition of extra skip loads of desired materials. It has also been found desirable to provide a system wherein the various charging control functions are automatically coordinated with one another requiring minimum manual operations of the operators thereby to reduce the operating time and increase the capacity of the charging control system. In addition, it has been found desirable to provide the automatic control system with facilities for transferring selected portions thereof for manual control and for testing control independently of the other portions thereof.

Accordingly, an object of the invention is to provide improved means affording the aforementioned and other control functions.

A more specific object of the invention is to provide an improved programming, multiple selection and indicating system for automatically controlling charging of a blast furnace in accordance with a preselected charging sequence and for automatically recycling the same at the end of each charging cycle.

Another object of the invention is to provide improved interlocking program control between a skip hoist, a load summary network, a distributor, a small bell and a large bell combined with manual operating control means for these elements.

Another object of the invention is to provide improved interlocking control of the small and large bell and relief and equalizer valves combined with manual operating control means for these elements.

Another object of the invention is to provide an improved charging program control system having selective automatic and manual operating control means and means for resetting the system to its normal position.

Another object of the invention is to provide a skip hoist program control network interlocked with an automatic coke control network to insure discharge of coke into the skip car before operation of the skip hoist is initiated if a coke charge has been preselected for the corresponding load.

Another object of the invention is to provide a skip hoist program control network interlocked with an automatic water control network to insure discharge of water into the skip car before operation of the skip hoist is initiated if a water charge has been preselected for the corresponding load.

Another object of the invention is to provide an improved extra load control system for controlling insertion of extra loads of selected charging materials at any desired points in the preselected charging sequence and for canceling such extra loads.

Another object of the invention is to provide an improved charging program control system which can be transferred from automatic to manual operation or to test operation without restoring the undervoltage relay.

Another object of the invention is to provide an improved distributor angle program control system for controlling distributor rotation in accordance with a predetermined angle program.

Another object of the invention is to provide improved small bell program control means for operating the small bell and relief and equalizer valves.

Another object of the invention is to provide improved large bell program control means interlocked with stockrod hoists for operating the large bell in accordance with a predetermined dumping program.

Another object of the invention is to provide improved program control devices for operating the skip hoist, the distributor, and the small and large bells combined with check devices insuring that such program control devices are operating in a predetermined sequence.

Another object of the invention is to provide improved load summary program control means for controlling blast furnace charging in accordance with a preselected skip load charging sequence.

Another object of the invention is to provide such blast furnace charging program control system with a plurality of improved control features to facilitate testing, maintenance, resetting into synchronization, and manual operation in the event of failure of portions thereof.

Another object of the invention is to provide such charging program control system with improved safety means automatically operable upon the occurrence of unstandard conditions.

Other objects and advantages of the invention will hereinafter appear.

While the apparatus hereinafter described is effectively adapted to fulfill the objects stated, it is to be understood that we do not intend to confine our invention to the particular preferred embodiments of control systems disclosed, inasmuch as they are susceptible of various modifications without departing from the scope of the appended claims.

In the drawings,

Fig. 2 is a diagrammatic illustration of a skip hoist program control system;

Fig. 3 is a cam layout development of a skip hoist program switch;

Figure 5:
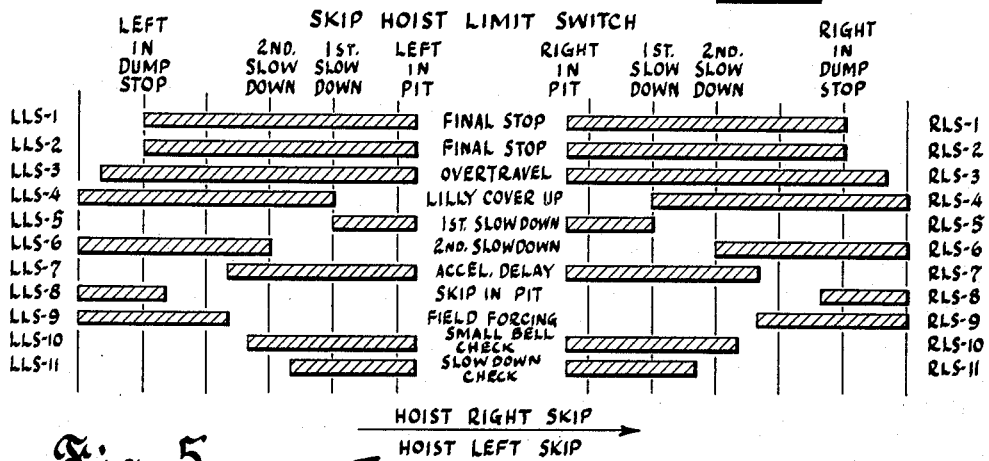
Figure 4B:
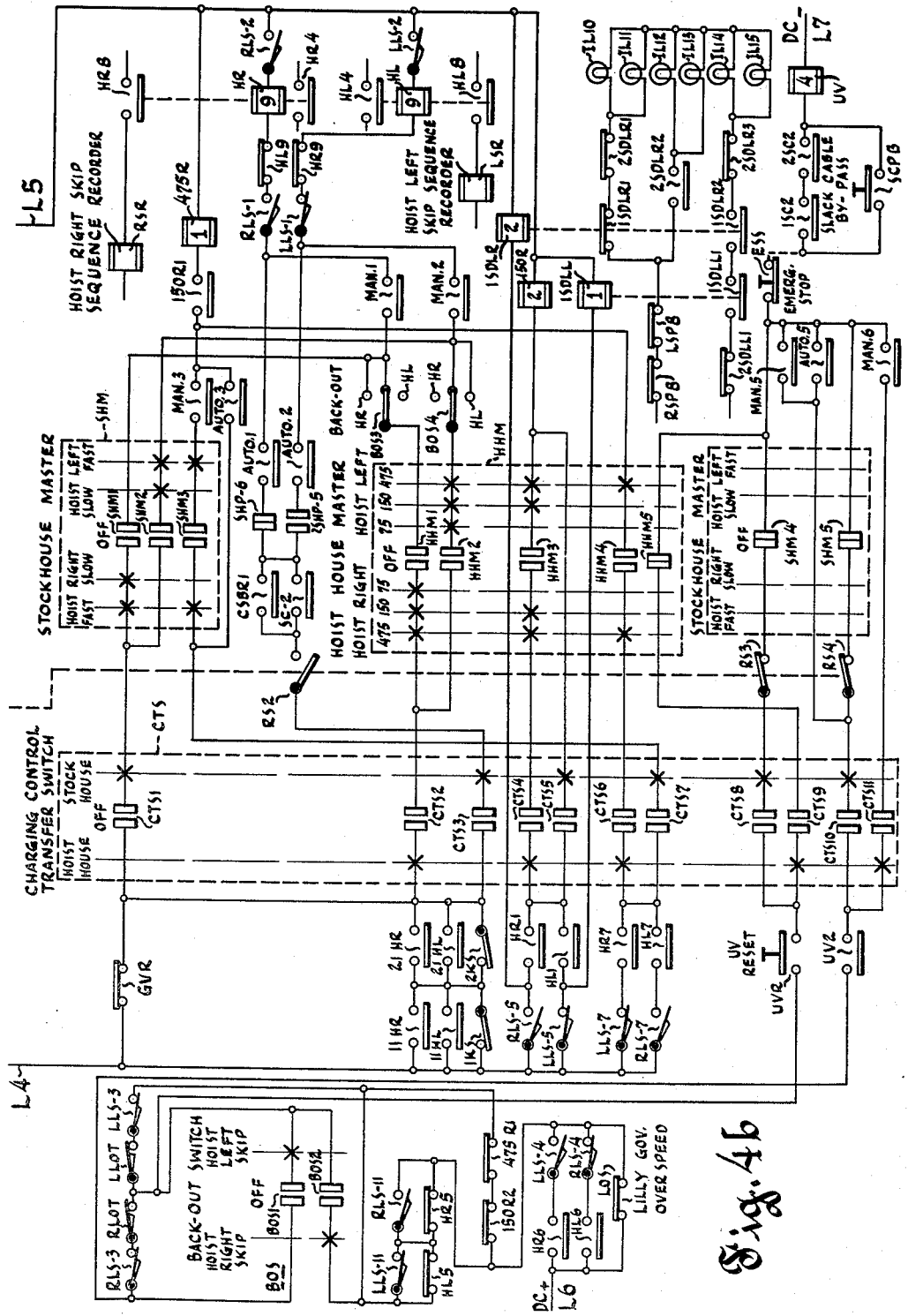
Figure 6B:
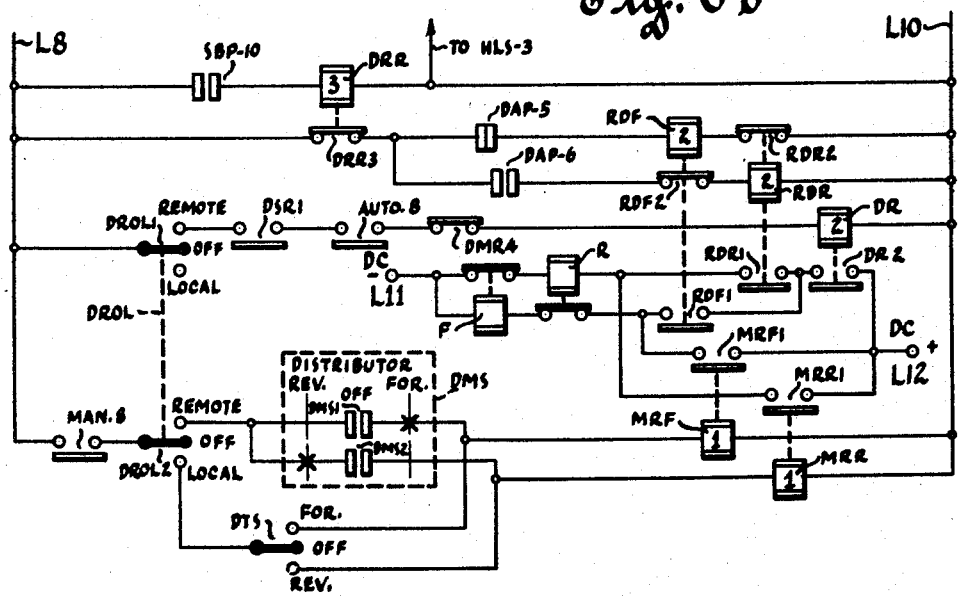
Figure 7:
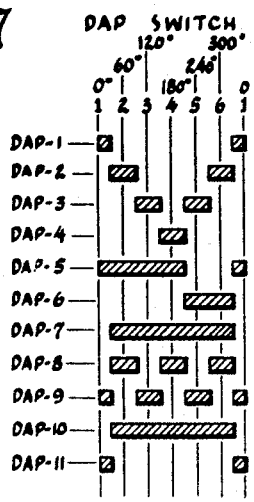
Figure 9A:
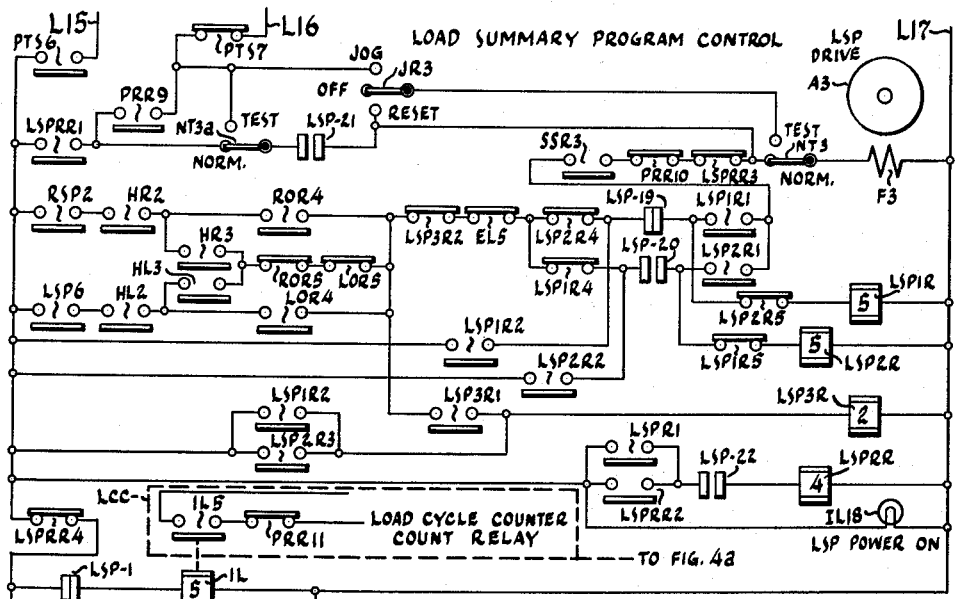
Figure 10:
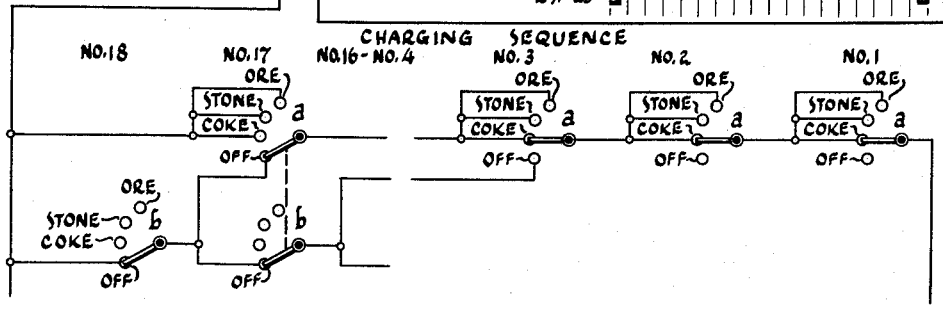
Figure 9B:
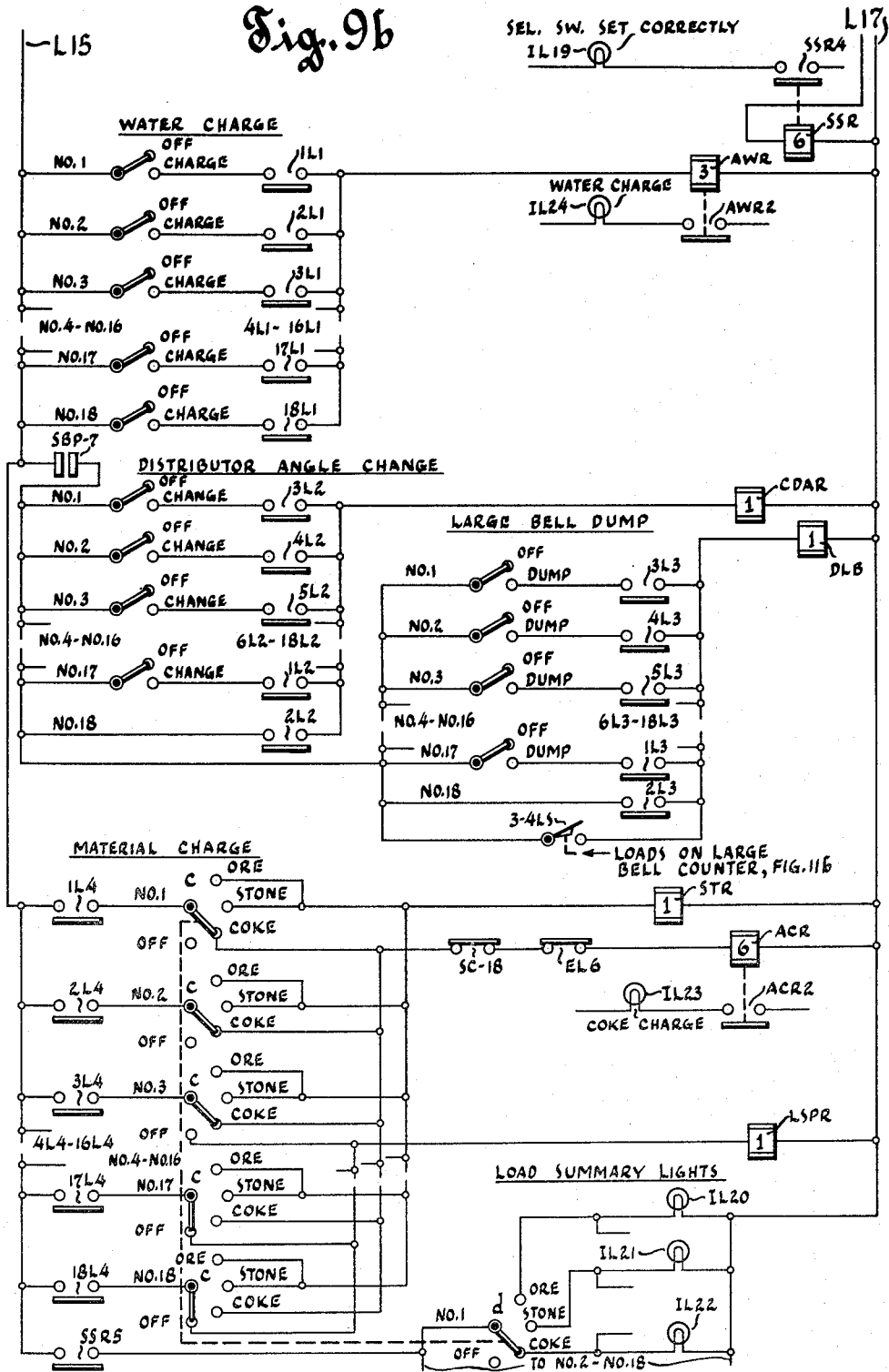

Figs. 4A and 4B when connected together at the bottom of Fig. 4A and the top of Fig. 4B diagrammatically illustrate a skip hoist control and directional contactor control system;

Fig. 5 is a cam layout development of a skip hoist limit switch;

Figs. 6A and 6B when connected at the bottom of Fig. 6A and the top of Fig. 6B diagrammatically illustrate a distributor angle program control system;

Fig. 7 is a cam layout development of a distributor angle program switch;

Fig. 8 diagrammatically shows a left coke charging control network;

Figs. 9A and 9B when connected at the bottom of Fig. 9A and at the top of Fig. 9B diagrammatically show a load summary program control network;

Fig. 10 is a cam layout development of a load summary program switch;

Figs. 11A and 11B when connected at the bottom of Fig. 11A and top of Fig. 11B diagrammatically show a small bell program control network;

Fig. 12 is a cam layout development of a small bell program switch;

Fig. 13 is a cam layout development of a small bell valve operator rotating cam limit switch;

Figs. 14A and 14B when connected at the bottom of Fig. 14A and top of 14B diagrammatically show a large bell program control network;

Fig. 15 is a cam layout development of a large bell program switch;

Fig. 16 is a cam layout development of a large bell valve operator rotating cam limit switch; and Fig. 17 diagrammatically shows an extra load and water charging control network.

In the circuit diagrams, the relays and contactors have been given reference characters indicative of the functions thereof, and the numeral within the operating coil indicates the total number of contacts for the corresponding device. For example, in the lower portion of Fig. 2, a start skip relay has an operating coil SS (hereinafter referred to as relay SS) and 3 contacts, the latter being identified as SS1, SS2 and SS3.

The heart of the automatic charging controller consists of five motor driven program switches including a skip hoist program switch SHP, a small bell program switch SBP, a large bell program switch LBP, a load summary program switch LSP, and a distributor angle program switch DAP; and four counters including a loads cycle counter LCC, a load on large bell counter LLBC, a hopper limit switch counter HLSC, and a coke bin counter CBC. Any suitable counting devices may be used for the three first mentioned counters, and therefore, the details thereof have not been shown to avoid complicating the drawings. For a description of the coke bin counter reference may be had to Douglas W. Fath and Charles E. Smith copending application Serial No. 721,717, filed March 17, 1958.

These devices provide a forced interlocking system which initiates all operations and checks to insure that each operation has progressed correctly before initiating the succeeding operation.

The program switches are motor driven devices each having the required number of cam operated double break contacts and the three first mentioned program switches also having a plural position rotary type switch. The switch driving motors are provided with self-contained adjustable brakes to prevent drift and each program switch is arranged to index to a plurality of different operating positions one step at a time as hereinafter more clearly described. For a description of the structure of the program switches reference may be had to Douglas W. Fath and Charles E. Smith copending application Serial No. 788,553, filed January 23, 1959.

The SHP switch allows the skip hoist to run only after all filling operations have been completed and it also checks to insure that the distributor and small bell cycles are completed. The SBP switch allows the small bell to operate only after checking to insure that the large bell, distributor, equalizer valve, relief valve and small bell control relays are in their proper positions. The LBP switch allows the large bell to operate only after checking to insure that the small bell, equalizer valve, relief valve, stockrods and large bell control relays are in their proper positions and that the furnace is not full. The LSP switch schedules the charging sequence (coke, ore, stone, water, etc.), the large bell dumping sequence, and the distributor angle change sequence. The LSP switch is indexed ahead one step for each skip hoist charging trip except for extra loads which may be inserted in the preselected charging sequence. The DAP switch schedules the angle of rotation of the distributor in response to the sequence of operation preset on and under the control of the LSP switch.

The loads on large bell counter count the number of loads deposited on the large bell by counting the number of small bell dumps. The number of loads on the large bell may be indicated by any suitable numerical indicator. The load cycle counter counts the number of times a complete charging sequence, as set up on the load summary program charging sequence selector switches, has been completed. This counting device indexes ahead one step each time the LSP switch resets to the load No. 1 operating position. The number of the particular load cycle may be indicated by a suitable numerical indicator. The hopper limit switch counter counts the pulses sent from the hopper limit switch and stops the distributor rotation at zero degrees, sixty degrees, or a multiple of sixty degrees as determined by the setting of the DAP switch. The coke bin counter changes the combination of bins from which coke is being drawn to fill the weigh hoppers in order to equalize the amount of coke drawn from each bin. This counter indexes ahead one step each time the large bell is dumped and, therefore, changes the bin or bins from which coke is being drawn after each large bell dump.

Figure 1:
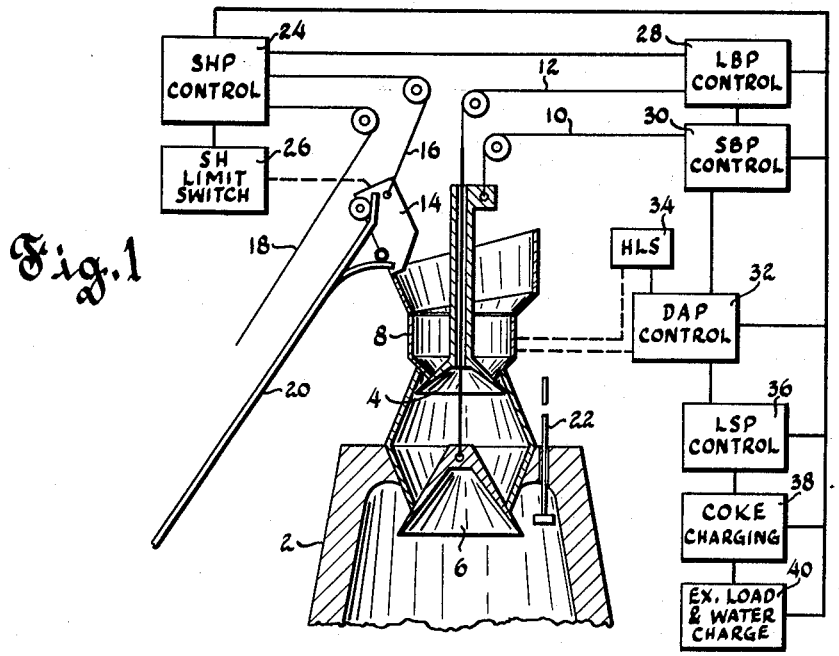
Figure 1 is a diagrammatic view of a blast furnace, schematically illustrating a high pressure top and a skip car, and a block diagram of a charging control system therefor.

Referring to Fig. 1, there is shown the upper portion of a blast furnace 2 of the usual type having its material charging opening at the top closed by a mechanism comprising a small bell 4, a large bell 6 and a rotatable hopper 8. Small bell 4 is provided with a cable 10 and large bell 6 is provided with a cable 12 for lowering and raising the same. A right skip car 14 attached to cable 16 and a left skip car (not shown) attached to cable 18 and traveling on a pair of tracks 20 are provided for conveying charging material from a charging pit at the base of the furnace and dumping the same into hopper 8, skip car 14 being shown in its dumping position. Furnace 2 is also provided with right and left stockrods indicated generally as 22 for measuring the depth of the charge in the furnace.

Following the dumping of each skip car load onto small bell 4 in distributor hopper 8, the distributor hopper is rotated a preselected amount (in multiples of sixty degrees) and the small bell is lowered to discharge the material onto the large bell. When a desired distribution of charging material has been deposited on large bell 6, the latter is lowered to drop the material into the furnace. Prior to opening of large bell 6, stockrods 22 are hoisted and automatically lowered again when the large bell has been closed.

An automatic control system is provided for controlling the charging functions. As schematically illustrated in Fig. 1, this control system comprises a skip hoist program control 24, a skip hoist limit switch 26, a large bell program control 28, a small bell program control 30, a distributor angle program control 32, a hopper limit switch 34, a load summary program control 36, a left coke charging system 38, and an extra load and water charging system 40.

Referring to Figs. 2 and 3, there is shown a skip hoist program control comprising a skip hoist program switch SHP having a plurality of cams shown in Fig. 3 for operation of its contacts and a control network therefor, Fig. 2. The SHP switch comprises contacts SHP-1, 2A, 2B, 3 through 7, 8A, 8B, 8C, 9, 10 and 11 for performing control functions hereinafter described, rotary switch contacts SHP-1R through SHP-16R for controlling rotation of the switch, and contacts SHP-5L and SHP-14L for controlling a start skip indicator hereinafter described. The SHP switch is provided with 16 operating positions, the first 8 positions, 1 through 8, being utilized for the left skip car and the remaining 8 positions, 1 through 8, being utilized for the right skip car. Thus, it is essential that the SHP switch by synchronized with the skip hoist before the control is put into operation. This is accomplished by the program reset apparatus hereinafter described.

The control network shown in Fig. 2 comprises a SHP switch drive motor having an armature A1 and a field winding F1, the latter being connectable across power supply lines L1 and L2 for automatic operation and across power supply lines L2 and L3 for test and reset operations. The SHP switch is constructed to index one step at a time as it checks various operations by energizing field winding F1 through rotary switch contacts SHP-1R through SHP-8R for the left skip car operating positions and through rotary switch contacts SHP-9R through SHP-16R for the right skip car operating positions. The rotary switch contacts such as contacts SHP-1R and SHP-9R, SHP-2R and SHP-10R, etc., for the corresponding left and right skip car operating positions on the SHP switch are connected in parallel as shown at the left-hand portion of Fig. 2 to afford identical operational checks when the right skip car is hoisted as are provided when the left skip car is hoisted. These operational checks will be hereinafter described in connection with the description of operation of the system.

The control network in Fig. 2 is also provided with a distributor by-pass switch DBP1 for permitting skip hoist operation independently of the distributor control, and a scale car interlocking relay SCIR for controlling scale car right and left compartment solenoids (not shown) to permit the scale car to discharge ore or stone into the right or left skip car, respectively, when a load of either of these materials is scheduled. For a detailed disclosure of the scale car dumping system, reference may be had to Douglas W. Fath and Charles E. Smith copending application Serial No. 720,402, filed March 10, 1958. There is also provided a skip hoist program power-on indicator lamp IL1 and a start skip indicator lamp IL2, and a start skip relay SS energizable by closure of a normally open manual pushbutton switch PB for starting the skip hoist when a load of ore or stone has been scheduled. For coke charges, the SHP switch automatically indexes ahead to start the skip hoist without a manual operation on the part of an operator.

Referring to Figs. 4A and 4B, there are shown a skip hoist control relay network and a skip hoist directional control network, respectively, energizable from and connectable to one another through power supply lines L4 and L5. Fig. 4B in addition includes an undervoltage network energizable across power supply lines L6 and L7. The control relay network in Fig. 4A is provided with a program test transfer contactor PTS operable when energized to connect alternating current power to the program control networks, and a program reset relay PRR energizable by closure of a normally open manual pushbutton program reset switch PR for initiating resetting of the aforementioned program switches to their No. 1 operating positions. The energizing circuit of relay PRR also includes normally closed contacts RS1 of a skip hoist run-stop switch RS in its Off position, normally closed contacts LCS2 of a left coke system selector switch LCS, and normally closed contacts RCS2 of a right coke system selector switch. The right coke system is similar to the left coke system, and therefore has not been shown to avoid complicating the drawings. A normally closed manual pushbutton stop filling switch SFS located at a mud gun control station is provided for controlling a stop filling relay SFR and a stop filling alarm timing relay SFTR. Relay SFR controls a stop filling indicator lamp IL3 whereas relay SFTR controls a stop filling alarm horn AH.

Fig. 4A is also provided with a program-all-reset relay PARR, a program reset indicator lamp IL4, and a skip hoist control power-on indicator lamp IL5. A manual-off-auto selector switch MOA is provided for manual selection of either a manual relay MAN or an automatic relay AUTO for energization to prepare for the desired mode of operation. Relay AUTO controls a skip-hoist-on-automatic indicator lamp IL6.

No. 1 and No. 2 slack cable detectors, one for each of the skip hoist cables, are provided for stopping the skip hoist in the event of slack conditions in these cables. These detectors comprise latched relays 1SCR and 2SCR, respectively, each having a closing coil C and a tripping coil T. The closing coils are normally energized across lines L4 and L5 to maintain energization of slack cable relays 1SC and 2SC, respectively, as shown. The tripping coils T are provided with normally open coil short-circuiting tripping contacts 1TC and 2TC, respectively, which may be integral with the skip hoist cables, for tripping these relays to stop the skip hoist under slack cable conditions.

A left skip in pit relay LSP is connected across lines L4 and L5 through right skip limit switch RLS-8, and a right skip in pit relay RSP in connectable across lines L4 and L5 through left skip limit switch LLS-8. A skip in pit latched relay SPLR having a closing coil C and a tripping coil T connectable across the operating coils of relays LSP and RSP, respectively, is provided for controlling hoist left skip arrow indicator lamp IL7 and hoist right skip arrow indicator lamp IL8. A skip in pit relay SPR is connectable across lines L4 and L5 for energization by relay LSP or RSP. A right skip second slowdown light relay 2SDLR is connectable through right skip limit switch RLS-6, and a left skip second slowdown light relay 2SDLL is connectable through left skip limit switch LLS-6 for energization across lines L4 and L5. The network in Fig. 4A is further provided with a check small bell relay CSBR for preventing the skip car from entering its dump position at the top of the furnace when the small bell is open except on a scrap charge when relay CSBR is rendered ineffective, and a skip hoist power-on indicator lamp IL9 connected across lines L4 and L5.

The skip hoist directional control network in Fig. 4B comprises a hoist right relay HR and a hoist left relay HL for controlling the hoist right and hoist left skip hoist motor directional power contactors (not shown), as well as performing other functions hereinafter described. A hoist right skip sequence recorder RSR and a hoist left skip sequence recorder are provided to record the functions of the skip hoists. A 150 feet per minute relay 150R and a 475 feet per minute relay 475R are provided for controlling acceleration of the skip cars, and a right skip first slowdown light relay 1SDLR and a left skip first slowdown light relay 1SDLL are provided for cooperation with the aforementioned second slowdown light relays to control indicator lamps IL10 through IL15 in the lower right-hand portion of Fig. 4B.

In addition, the network in Fig. 4B comprises normally closed manual knife switches 1KS and 2KS in the maintaining circuits of relays HR and HL, skip hoist motor directional power contactor contacts 11HR, 21HR and 11HL and 21HL for maintaining energization of relays HR and HL, and normally closed generator voltage relay contacts GVR in the initial energizing circuits of relays HR and HL hereinafter described.

The network in Fig. 4B further comprises a charging control transfer switch CTS having normally open contacts CTS1–11 and a Stockhouse operating position for automatic control of the skip hoist as well as for manual control thereof from the stockhouse and a Hoisthouse operating position for manual control of the skip hoist from the hoisthouse. There is also provided a stockhouse master switch SHM shown in two parts at the upper and lower portions of Fig. 4B affording manual control of the skip hoist from the stockhouse, and a hoisthouse master switch HHM affording manual control of the skip hoist from the hoisthouse. The charging control transfer switch and the stockhouse and hoisthouse master switches may be of the well known manual drum type. The stockhouse master switch has normally open contacts SHM1, 2 and 3 and normally closed contacts SHM4 and 5, while the hoisthouse master switch has normally open contacts HHM–1, 2, 3 and 4 and normally closed contacts HHM5. The skip hoist directional control network is further provided with a backout switch BOS having contacts BOS1 through BOS4 for controlling skip hoist backout in the event of overtravel as hereinafter described.

An undervoltage relay UV and control network therefor are provided in the lower portion of Fig. 4A for connection across lines L6 and L7 to control application of power to relay AUTO in Fig. 4A as well as to control application of power to the skip hoist directional control network in the upper portion of Fig. 4B. The control network of relay UV comprises a plurality of contacts hereinafter described which are effective to deenergize relay UV and stop the skip hoist in the event of failure of some portion of the system to function properly. In addition, the control network of relay UV comprises an undervoltage relay reset switch UVR, an emergency stop switch ESS, and a slack cable bypass switch SCBP for purposes hereinafter described.

The skip hoist control network further comprises a plurality of skip hoist limit switches operable according to the skip hoist limit switch cam layout developement shown in Fig. 5. The upper arrow in Fig. 5 depicts the direction of movement of the limit switches when the right skip car is hoisted from the charging pit at the base of the furnace to the dump position at the top of the furnace, and the lower arrow depicts the direction of movement of the limit switches when the left skip car is similarly hoisted. These limit switches comprise left skip final stop limit switches LLS–1 and LLS–2, left skip overtravel limit switch LLS–3, left skip Lilly overspeed governor cover-up limit switch LLS–4, left skip first slowdown limit switch LLS–5, left skip second slowdown limit switch LLS–6, left skip acceleration delay limit switch LLS–7, left skip-in-pit limit switch LLS–8, left skip field forcing limit switch LLS–9, left skip small bell check limit switch LLS–10, and left skip slowdown check limit switch LLS–11; and corresponding right skip limit switches RLS–1 through RLS–11 as indicated at the right-hand portion of Fig. 5. The shaded portions of Fig. 5 indicate a closed condition of the corresponding left skip and right skip limit switches while the non-shaded portions indicate an open condition thereof. These limit switches have been depicted at the lower portion of Fig. 4A and in Fig. 4B as being in the positions which they would have when the left skip car is in the charging pit and the right skip car is in its dump position at the top of the furnace. Under these conditions, all the program switches are in their No. 1 operating positions, this being the normal position of the charging control system prior to energization thereof.

The distributor angle program control comprises a distributor angle program switch DAP having a plurality of cams shown in Fig. 7 for operation of its contacts, a control network therefor shown in Fig. 6A, and a distributor directional control network shown in Fig. 6B. The DAP switch comprises contacts DAP–1 through DAP–11 for performing control functions hereinafter described, and is provided with six operating positions for controlling rotation of the distributor from its zero degree position in the forward direction to rotation angles of 60, 120 and 180 degrees, and in the reverse direction to rotation angles of 300 and 240 degrees. In Fig. 7, each of the six operating positions of the DAP switch is also marked with the degree of distributor rotation attained in the corresponding position. Thus, the desired amount of distributor rotation may be selected by presetting the DAP switch in the proper position.

The control network shown in Figs. 6A and 6B comprises a DAP switch drive motor having an armature A2 and a field winding F2, the latter being connectable across power supply lines L8 and L10 for automatic operation and across lines L9 and L10 for test operation. The DAP switch control network is provided with a manual pushbutton change distributor angle switch CDA.

Change distributor angle relay contacts CDAR1 and three DAP switch run relays DAP1R, DAP2R and DAP3R are provided for controlling indexing of the switch one step at a time each time a signal is received either manually from closure of switch CDA or automatically from the change distributor angle relay CDAR in the load summary program control in Fig. 9B.

A dump timer DT is provided for affording a time interval for dumping the material from the skip car into the distributor hopper at the top of the furnace before distributor rotation is initiated. A distributor angle program power-on indicator lamp IL16 is connected for energization across lines L8 and L10. A distributor start relay DSR is provided for initiating rotation of the distributor hopper and a distributor stop relay is provided for stopping such rotation. In addition, there is provided a run distributor forward relay RDF for controlling a forward contactor F and a run distributor reverse relay RDR for controlling a reverse contactor R utilized for automatic control of distributor rotation. A manual run forward relay MRF for controlling contactor F and a manual run reverse relay MRR for controlling contactor R are provided for manual control of distributor rotation, contactors F and R being connectable across lines L11 and L12.

The control network also comprises a hopper limit switch HLS of the cam operated type or the like and having a normally open limit switch HLS–1 and a normally closed limit switch HLS–2 for transmitting pulses to a hopper limit switch counter HLSC for reasons hereinafter described. Limit switch HLS–3 is provided for controlling an accurate stop indicator lamp IL17.

Hopper limit switch HLS is arranged to rotate 360 degrees for each 60 degrees rotation of the distributor hopper and thus to transmit two pulses, one from each limit switch HLS-1 and HLS-2, to the counter to count the rotation of the distributor hopper. Counter HLSC may be of any well known construction capable of registering these pulses and, therefore, has not been shown in detail to avoid complicating the drawings. Counter HLSC is arranged to count these pulses following operation of zero degree relay DRA and to close its 60 degree, 120 degree and 180 degree contacts following each consecutive two pulses, respectively, received from the hopper limit switch. Thus, the counter controls stopping of the distributor hopper at a rotation angle determined by the operating position of the DAP switch as hereinafter more fully described.

The distributor control network is further provided with a distributor remote-off-local selector switch DROL having a Remote operating position for automatic or manual control of the distributor and a Local operating position for testing distributor function. A distributor manual control switch DMS having normally open contacts DMS1 and DMS2 is provided for manually controlling the distributor in forward and reverse directions, respectively, and a distributor test switch DTS is provided for testing distributor operation independently of the counter. A distributor reset relay DRR and a distributor counter reset relay DCRR are provided for resetting purposes.

The left coke charging control system in Fig. 8 comprises a fill selector switch FS having three contact sets FS1-3 and a discharge selector switch DS having three contact sets DS1-3. The fill selector switch is employed by a scale car operator to select either automatic or manual filling of the weigh hoppers with charging material whereas the discharge selector switch is employed by the scale car operator to select automatic or manual discharge of the material from the weigh hoppers into the skip cars. The discharge control network is shown in Fig. 8. For a detailed description of the filling control system, reference may be had to Douglas W. Fath and Charles E. Smith copending application Serial No. 720,399, filed March 10, 1958.

The left coke charging control system also comprises an on-off selector switch LCS having a contact set LCS1 in Fig. 8 and a contact set LCS2 in the program reset circuit in the upper portion of Fig. 4A. A left coke system off relay LOR is provided for interlocking control with the skip hoist and load summary programs. A left coke full weight relay LFWR is provided to indicate that the left weigh hopper is full of coke by weight. A left coke zero weight relay LZWR is provided for preventing operation of the SHP switch and starting the skip hoist until the coke has been discharged into the skip car. A left coke weigh hopper gate relay LHR is provided for controlling a left weigh hopper discharge gate solenoid LDGS to discharge coke into the left skip car. In addition, there is provided a left hopper discharge gate timing relay LDT for timing the open interval of the discharge gate. A manual discharge selector switch MD is provided to afford manual control of the weigh hopper discharge gate when desired. Selector switch MD is operative when discharge selector switch DS is in its Manual operating position and is provided with an Open operating position for opening the discharge gate and a Close operating position for closing the discharge gate. There is further provided a zero weight pushbutton switch ZW for energizing zero weight relay LZWR in the event some coke sticks in the weigh hopper, a zero weight limit switch ZWLS which resets to its closed position when all the coke is discharged from the weigh hopper, and a full weight limit switch FWLS which resets to its open position when the coke is dumped from the weigh hopper into the skip car.

In actual practice, a right coke charging control system similar to the left coke charging control system is provided for controlling discharge of coke into the right skip car when the latter enters the charging pit. The right coke charging control system being similar to that shown in Fig. 8 has not been shown to avoid complicating the drawings.

The load summary program control comprises a load summary program switch LSP having a plurality of cams shown in Fig. 10 for operation of its contacts, a control network therefor shown in the upper portion of Fig. 9A, and a charging sequence preselecting and control network shown in the lower portion of Fig. 9A and in Fig. 9B. The LSP switch comprises contacts LSP-1 through LSP-18 for controlling load summary relays 1L through 18L, respectively, these being one load summary relay for each of the eighteen loads in the charging sequence. The LSP switch also comprises contacts LSP-19 and LSP-20 for alternately controlling stepping of the LSP switch, and contacts LSP-21 and LSP-22 for controlling resetting of the LSP switch to operating position 1. The control network in the upper portion of Fig. 9A further comprises three load summary program switch run relays LSP1R, LSP2R and LSP3R for controlling indexing of the LSP switch one step at a time, load summary program switch reset relays LSPR (Fig. 9B) and LSPRR (Fig. 9A) for controlling rotation of the LSP switch to operating position 1, and a load summary program control power-on indicator lamp IL18.

The charging sequence preselecting and control network comprises 18 charging sequence selector switches, 18 water charge selector switches, 17 distributor angle change selector switches, and 17 large bell dump selector switches for preselecting an 18 load charging sequence.

Each charging sequence selector switch No. 1 through No. 3 comprises three contact sets *a*, *c* and *d*; each charging sequence selector switch No. 4 through No. 17 comprises four contact sets *a*, *b*, *c* and *d*, and charging sequence selector switch No. 18 comprises three contact sets *b*, *c* and *d*. Contact sets *a* and *b* are shown at the lower portion of Fig. 9A while contact sets *c* and *d* are shown at the lower portion of Fig. 9B. Contact sets *a*, *b* and *c* of charging sequence selector switches No. 4 through No. 16 are connected in the same manner as the corresponding contact sets of switch No. 17 and therefore have not been shown in detail to avoid complicating the drawings. Contact sets *d* of charging sequence selector switches No. 2 through No. 18 are connected in the same manner as the corresponding contact set of switch No. 1 and therefore have not been shown for like reasons. Each contact set *a*, *b*, *c* and *d* comprises Ore, Stone and Coke operating positions and an Off position and a well known rotary contact for selecting a desired position.

Contact sets *a* and *b* are connected to provide a selector switch permissive circuit, that is, the selector switches must be set correctly before operation of the charging control system can be initiated. To this end, the Ore, Stone and Coke operating position contacts of contact sets *a* of each charging sequence selector switch No. 1 through No. 16 are connected together and to the rotary contact of contact set *a* of the succeeding charging sequence selector switch. The Ore, Stone and Coke operating position contacts of contact set *a* of switch No. 17 are connected together and to line L15, and the rotary contact of contact set *a* of switch No. 1 is connected in series with the operating coil of a selector-switches-set-correctly relay SSR to line L17. The Off position contact of contact set *a* of each charging sequence selector switch No. 3 through No. 17 is connected to the rotary contact of contact set *b* of the succeeding charging sequence selector switch. Also, the Off position contact of contact set *b* of each charging sequence selector switch No. 4 through No. 17 is connected to the rotary contact of contact set *b* of the succeeding charging sequence selector switch, while the Off position contact of contact set *b* of charging sequence selector switch No. 18 is connected to line L15. The Off position contacts of contact sets *a* of charging sequence selector switches No. 1 and No. 2 are disconnected in view of the fact that a charging sequence of at least three loads is always required. With this arrangement, relay SSR will operate only when each succeeding switch is utilized to set up a desired charging sequence and the remaining switches are in their Off position. Relay SSR permits operation of the charging control system and also controls a selector-switches-set-correctly indicator lamp IL19, and the ore, stone and coke load summary indicator lamps IL20, IL21 and IL22, respectively, at the lower portion of Fig. 9B.

Referring to the material charge contact sets c of the charging sequence selector switches at the lower portion of Fig. 9B, the Ore and Stone operating position contacts of these contact sets are connected together and through the operating coil of an ore and stone relay STR to line L17. The Coke operating position contacts of these contact sets are connected together and through the operating coil of an automatic coke relay ACR to line L17. The Off position contacts of contact sets c of charging sequence selector switches No. 3 through No. 18 are connected together and through the operating coil of load summary program reset relay LSPR to line L17. And the rotary contacts of these contact sets are connected through appropriate contacts of load summary relays 1L through 18L, respectively, to line L15. Automatic coke relay ACR is provided to control discharging of coke from the weigh hoppers into the skip cars as hereinafter described as well as to control a coke charge indicator lamp IL23.

The Ore operating position contact of contact set d of charging sequence selector switch No. 1 is connected through indicator lamp IL20 to line L17, the Stone operating position contact is connected through indicator lamp IL21 to line L17, and the Coke operating position contact is connected through indicator lamp IL22 to line L17, while the Off position contact is disconnected. The rotary contact of contact set d is connected through contacts SSR5 of selector-switches-set-correctly relay SRR to line L15. Contact sets d of charging sequence selector switches No. 2 through No. 18 are similarly connected to indicator lamps and have not been shown to avoid complicating the drawings.

Referring to the water charge selector switches at the upper portion of Fig. 9B, each water charge selector switch has a Charge operating position and an Off position. The water charge selector switches No. 1 through No. 18 are connected at their Charge operating position contacts in series with contacts of load summary relays 1L through 18L, respectively, to a common point and then to an automatic water relay AWR to control the latter whenever a water charge has been scheduled for a given load. Relay AWR controls discharge of water into the skip cars as well as a water charge indicator lamp IL24.

Each distributor angle change selector switch is provided with a Change operating position and an Off position. The distributor angle change selector switches No. 1 through No. 17 are connected at their Change operating position contacts in series with contacts of load summary relays 3L through 18L and 1L, repsectively, to a common point and then to a change distributor angle relay CDAR to control the latter whenever a distributor angle change is scheduled for a given load. A parallel circuit is provided through contacts 2L2 of load summary relay 2L for relay CDAR to initiate a distributor angle change after each charging sequence has been completed. Relay CDAR is provided to control indexing of the DAP switch one step for each energization thereof as hereinafter described.

Each large bell dump selector switch is provided with a Dump operating position and an Off position. The large bell dump selector switches No. 1 through No. 17 are connected at their Dump operating position contacts in series with contacts of load summary relays 3L through 18L and 1L, respectively, to a common point and then to a dump large bell relay DLB to control the latter whenever a large bell dump is scheduled for a given load. A parallel circuit is provided through contacts 2L3 of load summary relay 2L for relay DLB to initiate a large bell dump after each charging sequence has been completed. Another parallel circuit is provided through limit switch 3–4LS of the loads-on-large-bell counter to initiate a large bell dump whenever a predetermined number of loads have been deposited on the large bell. Limit switch 3–4LS is a cam operated device or the like and may be set to dump the large bell after any desired number of loads.

Relays CDAR and DLB are connected at one side directly to line L17 and at the other side through the aforementioned contacts of the load summary relays and distributor angle change and large bell dump selector switches, respectively, and then through normally open contacts SBP–7 of a small bell program switch to line L15. Thus, a distributor angle change and a large bell dump can be initiated only after the small bell program switch has reached a predetermined position preparatory to closing the small bell.

Connection of contacts 2L2 and 2L3 of the load summary No. 2 load relay 2L to complete energizing circuits for relays CDAR and DLB, respectively, in parallel with the distributor angle change and large bell dump selector switches affords a distributor angle change and a large bell dump automatically on the second load following completion of each charging sequence.

Referring to Figs. 11A and 11B, the small bell program control network comprises a small bell program switch SBP having a plurality of cams shown in Fig. 12 for operating contacts SBP–1 through SBP–11 to perform functions hereinafter described and rotary switch cams also shown in Fig. 12 for operating contacts SBP–1R through SBP–12R to drive the switch one step at a time through its 12 operating positions. The control network also comprises a small bell valve operator open limit switch SBOLS–1 and a small bell valve operator closed limit switch SBCLS–1 having cams shown in Fig. 13 for operating a valve operator motor hereinafter described. The control network furthermore comprises a circuit shown in the upper portion of Fig. 11A for controlling a SBP switch drive motor, and a circuit shown in the lower portion of Fig. 11A and Fig. 11B for controlling a relief valve, an equalizer valve and the small bell.

The SBP switch drive motor comprises an armature A4 and a field winding F4, the latter being connectable across power supply lines L16 and L18 for automatic operation and across lines L17 and L18 for test and reset operations through a normal-test switch NT4 and a jog-reset switch JR4. The SBP switch is arranged to index one step at a time as it checks a plurality of operations, hereinafter described, by energizing field winding F4 through rotary switch contacts SBP–1R through SBP–12R. A distributor bypass switch DBP2 is provided for affording small bell operation independently of the distributor control. Switch DBP1 in Fig. 2 and switch DBP2 in Fig. 11A are preferably arranged mechanically interconnected as a unitary switch as indicated by the broken lines. A small bell program power-on indicator lamp IL25 is connected across lines L18 and L20 for indicating energization of the control.

The circuit in the lower portion of Fig. 11A is provided with a small bell open timing relay SBOT for timing the open interval of the small bell, a scrap charge small bell open timing relay SCBT for permitting a scrap charge to be dumped into the distributor hopper while the small bell is open, and control circuits therefor hereinafter described. There is also provided a small bell remote-off-local selector switch SBROL extending from the lower left-hand portion of Fig. 11A into the upper left-hand portion of Fig. 11B and provided with three contact sets SBROL1–3 for controlling the small bell, relief valve, and equalizer valve. Switch SBROL is settable to its Remote operating position for automatic and manual control, to its Local operating position for testing, and to its Off position. Small bell manual switch SBMS having three normally open contacts SBMS1–3 and a Close and an Open operating position is provided to afford manual control of the small bell when selector switch SBROL is set in its Remote operating position. Bell interlock switch BIL1 preferably mechanically interconnected with the interlock switches in the large bell control network hereinafter described is provided with a normally open In position wherein the bells are interlocked and an Out position affording independent control of the small bell. Small bell test selector switch SBTS provides control of the small bell when selector switch SBROL is in its Local operating position. There is also provided a small bell opening relay SBO and a small bell closing relay SBC controllable by the aforementioned selector switches.

At the lower left-hand portion of Fig. 11B, there is provided a high pressure top selector switch HPS having a Remote operating position for energizing a high pressure top on-automatic relay HPA, a Local operating position for energizing a high pressure top on-manual relay HPM, and an Off position. At the upper portions of Fig. 11B, there is provided a relief valve selector switch RVS having an Open, an Off and a Close position, and an equalizer valve selector switch EVS having a Close, an Off and an Open position, these selector switches affording control of the relief and equalizer valves when selector switch HPS is in its Local operating position. There is also provided a relief valve opening relay RVO in the extreme lower portion of Fig. 11A, and in the upper portion of Fig. 11B, a relief valve closing relay RVC and equalizer valve closing and opening relays EVC and EVO, respectively, for control by the aforementioned selector switches and by automatic means hereinafter described.

An equalizer valve operator contactor EV is arranged to control an equalizer valve operator motor (not shown) and a relief valve operator contactor RV is arranged to control a relief valve operator motor (not shown) in conjunction with a plurality of limit switches hereinafter described. An equalizer valve operator preferably of a well known pneumatic type is employed for closing and opening the equalizer valve, and the details thereof have not been shown to avoid complicating the drawings. The construction and operation of the equalizer valve operator is hereinafter described in connection with the description of operation of the charging control system. The relief valve operator is similar to the equalizer valve operator as will be apparent from the description of operation thereof hereinafter appearing.

The aforementioned small bell valve operator open and closed limit switches SBOLS–1 and SBCLS–1, respectively, are arranged to control a small bell valve operator contactor SB which in turn controls a small bell valve motor (not shown). The small bell operator is also of a well known pneumatic type similar to the equalizer and relief valve operators and has not been shown to avoid complicating the drawings.

The control circuit also comprises a small bell closed relay SBCR in the lower left-hand portion of Fig. 11B for indicating a closed condition of the small bell, a small bell open relay SBOR for registering one count on a load on large bell counter LLBC each time the small bell opens, and a relief valve closed relay RVCR for indicating a closed condition of the relief valve to permit the large bell to open. Relief valve open relay RVOR indicates the open condition of the relief valve, equalizer valve closed relay EVCR prevents opening of the small bell until the equalizer valve is closed, and equalizer valve open relay EVOR prevents opening of the large bell until the equalizer valve is open.

In addition, the control circuit in Figs. 11A and 11B comprises a plurality of limit switches as follows:

An equalizer valve operator open limit switch EVOLS–1 tripped to open position when the valve operator is fully open.

An equalizer valve operator closed limit switch EVCLS–1 tripped to open position when the valve operator is fully closed.

A relief valve operator open limit switch RVOLS–1 tripped to open position when the valve operator is fully open.

A relief valve operator closed limit switch RVCLS–1 tripped to open position when the valve operator is fully closed.

Equalizer valve closed limit switches EVLS–1 and EVLS–11 tripped to closed positions when the valve is fully closed.

An equalizer valve open limit switch EVLS–2 tripped to closed position when the valve is fully open.

Relief valve closed limit switches RVLS–1 and RVLS–11 tripped to closed positions when the valve is fully closed.

A relief valve open limit switch RVLS–2 tripped to closed position when the valve is fully open.

A small bell valve operator open limit switch SBOLS–1 reset to open position when the valve operator is fully open.

A small bell valve operator closed limit switch SBCLS–1 reset to open position when the valve operator is fully closed.

A small bell closed limit switch SBLS–1 tripped to closed position when the small bell is fully closed.

A small bell open limit switch SBLS–2 tripped to closed position when the small bell is fully open.

A large bell closed limit switch LBLS–11 tripped to closed position when the large bell is closed.

Referring to Figs. 14A and 14B, the large bell program control network comprises a large bell program switch LBP having a plurality of cams shown in Fig. 15 for operating contacts LBP–1 through LBP–5, LBP–6A, LBP–6B, LBP–7 and LBP8 to perform functions hereinafter described, and rotary switch cams also shown in Fig. 15 for operating contacts LBP–1R through LBP–11R to drive the LBP switch one step at a time through its 11 operating positions. The control network also comprises a large bell valve operator open limit switch LBOLS–1 and a large bell valve operator closed limit switch LBCLS–1 having cams shown in Fig. 16 for operating a valve operator motor hereinafter described. The control network furthermore comprises a circuit shown in Fig. 14A for controlling a LBP switch drive motor, and a circuit shown in the extreme lower portion of Fig. 14A and in Fig. 14B for controlling the large bell, left and right stockrods and a coke bin counter CBC.

The LBP switch drive motor comprises an armature A5 and a field winding F5, the latter being connectable across power supply lines L19 and L21 for automatic operation and across lines L20 and L21 for test and reset operations through a normal-test switch NT5 and a jog-reset switch JR5. The LBP switch is arranged to index one step at a time as it checks a plurality of operations, hereinafter described, by energizing field winding F5 through rotary switch contacts LBP–1R through LBP–11R. A plurality of parallel connected No. 1 or left stockrod manual selector switches indicated generally as LSR in series connection with a plurality of parallel connected No. 2 or right stockrod manual selector switches indicated generally as RSR are provided at desired locations to afford manual initiation of rotation of the LBP switch as well as control of the left and right stockrods. Preferably these switches are provided at the mud gun control station, the hoist house control station and the scale car operator's station. Each selector switch comprises two sets of contacts LSR1 and RSR1 in Fig. 14A and LSR2 and RSR2 at the lower portion of 14B.

The control system also comprises a large bell program power-on indicator lamp IL26, a bell slack cable relay BSC for detecting slack in the small and large bell cables and initially settable by a bell slack cable pushbutton reset switch SCRS, and a bell slack cable timing relay BSCTR for maintaining relay BSC in the event of only momentary power failure.

The large bell control circuit in the extreme lower portion of Fig. 14A and in Fig. 14B, is provided with a large bell open timing relay LBOT for timing the open interval of the large bell, and a large bell valve operator contactor LB controlled by the aforementioned large bell valve operator open and closed limit switches LBOLS–1 and LBCLS–1, and which in turn controls a large bell valve motor (not shown). The large bell operator is of a well known pneumatic type similar to the relief and equalizer valve and small bell valve operators and, therefore, has not been shown to avoid complicating the drawings.

There is also provided a large bell remote-off-local selector switch LBROL at the upper left-hand portion of Fig. 14B and provided with two contact sets LBROL1 and LBROL2 and a Remote operating position for automatic and manual control of the large bell and a Local operating position for testing the large bell and an Off position. Large bell manual switch LBMS of the rotary drum type or the like having two normally open contacts LBMS1 and LBMS2 and a Close and an Open operating position is provided to afford manual control of the large bell when selector switch LBROL is in its Remote operating position. Bell interlock switches BIL2 and BIL3 preferably mechanically interconnected to one another and to interlock switch BIL1 in the small bell control network hereinbefore described are provided with normally open In positions wherein the bells are interlocked and an Out position affording independent control of the large bell. Large bell test selector switch LBTS provides control of the large bell when selector switch LBROL is in its Local operating position. There is also provided a large bell opening relay LBO and a large bell closing relay LBC controllable by the aforementioned selector switches.

At lower left-hand portion of Fig. 14B is provided a large bell closed relay LBCR for indicating a closed condition of the large bell, a large bell open relay LBOR for controlling coke bin counter CBC each time the large bell opens, and a furnace full relay FFR for preventing opening of the large bell when the furnace is full. Furnace full relay FFR has a three-branch energizing circuit comprising a right stockline recorder limit switch RSRLS in the first branch, series connected right and left stockline hoist motor main contactor contacts RM and LM in the second branch, and left stockline recorder limit switch LSRLS in the third branch. Contacts RM and LM open when the right and left stockline hoist motor control systems (not shown) are energized and limit switches RSRLS and LSRLS open when the furnace is full to control relay FFR as hereinafter described. The control circuit shown in Fig. 14B is also provided with a lower left stockrod relay LLSRR and a lower right stockrod relay LRSRR for controlling the left and right stockrods as hereinafter described. The right and left stockline hoist motor control systems have not been shown herein to avoid complicating the drawings.

The large bell program control system also comprises a plurality of limit switches as follows:

A large bell valve operator open limit switch LBOLS–1 reset to open position when the valve operator is fully open.

A large bell valve operator closed limit switch LBCLS–1 reset to open position when the valve operator is fully closed.

A large bell closed limit switch LBLS–1 tripped to closed position when the large bell is fully closed.

A large bell open limit switch LBLS–2 tripped to closed position when the large bell is fully open.

A small bell closed limit switch SBLS–11 tripped to closed position when the small bell is closed.

A large bell slack cable limit switch LBLS–3 reset to open position when the large bell cable is slack.

A small bell slack cable limit switch SBLS–3 reset to open position when the small bell cable is slack.

Right stockrod hoist limit switches RSLS–3 and RSLS–4 tripped to closed position when the right stockrod is fully hoisted.

Left stockrod hoist limit switches LSLS–3 and LSLS–4 tripped to closed position when the left stockrod is fully hoisted.

A right stockline recorder limit switch RSRLS tripped to open position when the furnace is full.

A left stockline recorder limit switch LSRLS tripped to open position when the furnace is full.

Referring to Fig. 17, the extra load and water charging control circuit shown therein comprises apparatus for selectively inserting an extra load of scrap, water, coke or stone at any desired time within a charging cycle and a water valve control circuit for automatically discharging a predetermined amount of water into the skip car whenever a water charge has been preselected on the load summary program selector switches at the upper portion of Fig. 9B. Thus, there are provided extra scrap relays SC–1 and SC–2 controllable by an extra scrap pushbutton switch ESPB for charging extra scrap and an extra scrap indicator lamp IL27. An extra load relay EL is provided for rendering the right and left coke weigh hopper gate relays ineffective thus to prevent automatic discharging of coke into the skip car when an extra coke, an extra scrap or an extra stone charge has been initiated. Extra water relay EW is controllable by an extra water pushbutton switch EWPB for initiating an extra water charge. Relay EW controls an extra water indicator lamp IL28. Similarly, an extra coke relay EC and an extra ore or stone relay ES are controllable by pushbutton switches ECPB and EOPB, respectively, for initiating extra ore and extra stone charges which are indicated by indicator lamps IL29 and IL30, respectively.

There is also provided a cancel extra load pushbutton switch CEL in the upper left-hand portion of Fig. 17 for canceling an extra load that has been set up by mistake or one that is not desired, and a normally energized cancel extra load indicator lamp IL31. In addition, there is provided in Fig. 17 a water valve contactor WV and control circuit therefor connected across lines L22 and L23 for controlling a water volume counter WVC to measure a predetermined amount of water to be discharged into the skip car. Water volume counter WVC may be of any well known construction capable of closing the right and left skip water valves when the predetermined amount of water has been metered, and therefore has not been shown to avoid complicating the drawings. A water dumped relay WDR is provided for restoring water valve contactor WV. Water charging reset relay WCRR is controlled by the SHP switch for resetting the water volume counter.

The operation of the blast furnace program control system will now be described.

*Automatic operation*

Let it be assumed that suitable alternating current power is connected to conductors L1 through L5, L8 through L10 and L13 through L25 at the upper portions of Figs. 2, 4A, 6A, 8, 9A, 11A, 14A and 17 and that suitable direct current power is connected across conductors L6 and L7 of the undervoltage network shown in the lower portion of Fig. 4B and across conductors L11 and L12 of the distributor motor directional control network shown in Fig. 6B.

Let is also be assumed that knife switches 1KS and 2KS in the left-hand portion of Fig. 4B are opened, charging control transfer switch CTS in Fig. 4B is set in its Stockhouse operating position, manual-off-automatic selector switch MOA in the left-hand portion of Fig. 4A is set in its Auto operating position, the distributor remote-off-local selector switch DROL in the left-hand portion of Fig. 6B is set in its Remote operating position, the small bell remote-off-local selector switch SBROL in the left-hand portion of Figs. 11A and 11B is set in its Remote operating position, the large bell remote-off-local selector switch LBROL in the upper left-hand portion of Fig. 14B is set in its Remote operating position, and the left coke charging control on-off switch LCS in the upper portion of Fig. 8 is set in the On operating position wherein its normally open contact LCS1 is closed. The left coke charging control on-off switch has another normally closed contact LCS2 in the energizing circuit of program reset relay PRR in the upper portion of Fig. 4A, which contact is opened when the switch is set in the On position. The right coke charging control on-off switch is also set in the On operating position, opening its normally closed contacts RCS2 in the upper portion of Fig. 4A. The right coke charging control network is similar to the left coke charging control network shown in Fig. 8 and, therefore, has not been shown for the sake of simplicity. The skip hoist run-stop switch RS shown in Figs. 4A and 4B is left in its Stop position.

Let it further be assumed that a desired charging sequence is preset on the selector switches (Figs. 9A and 9B) located on the hoisthouse selector panel, these switches including four groups of switches for charging sequence, water charge, distributor angle change and large bell dump, respectively. The eighteen charging sequence selector switches comprise fours sets $a$, $b$, $c$ and $d$ of ore-stone-coke-off contacts each, with the exception of switches Nos. 1, 2 and 3 which comprise three sets of contacts $a$, $c$ and $d$, and switch No. 18 which comprises three sets of contacts $b$, $c$ and $d$, contact sets $a$ and $b$ in switches 4–17, contact sets $a$ in switches 1–3, and contact set $b$ in switch 18 being utilized for completing an energizing circuit for selector-switches-set-correctly relay SSR, the third material charge contact sets $c$ controlling stone-ore relay STR and automatic coke relay ACR, and the fourth contact sets $d$ controlling the load summary lights. As shown in Figs. 9A and 9B, for purposes of description, the aforementioned selector switches are preset for a typical 13-load charging sequence as follows:

| Load No. | Charge | Load No. | Charge |
|---|---|---|---|
| 1 | Coke. | 10 | Coke. |
| 2 | Coke. | 11 | Ore. |
| 3 | Coke. | 12 | Ore. |
| 4 | Coke. | 13 | Stone, Water, Large Bell Dump Distr. Angle Change. |
| 5 | Ore. | 14 | Off. |
| 6 | Ore. | 15 | Off. |
| 7 | Stone, Water, Large Bell Dump Distr. Angle Change. | 16 | Off. |
| 8 | Coke. | 17 | Off. |
| 9 | Coke. | 18 | Off. |

Thus, the charging sequence switches for loads Nos. 1 through 4, and 8 through 10 are set in the Coke operating position, the charging sequence switches for loads Nos. 5, 6, 11 and 12 are set in the Ore operating position, the charging sequence switches for loads Nos. 7 and 13 are set in the Stone operating position, and the remaining charging sequence switches for loads Nos. 14 through 18 are set in the Off position. The water charge selector switches for loads Nos. 7 and 13 are set in the Charge operating position while the remaining water charge switches are set in the Off position. The distributor angle change selector switches for loads Nos. 7 and 13 are set in the Change operating position while the remaining switches of this group are set in the Off position. Also the large bell dump selector switches for loads Nos. 7 and 13 are set in the Dump position while the remaining switches of this group are set in the Off position.

Let it further be assumed that the skip hoist program switch SHP shown in Fig. 3, the small bell program switch SBP shown in Fig. 12, the load summary program switch LSP shown in Fig. 10, the large bell program switch LBP shown in Fig. 15, and the distributor angle program switch DAP shown in Fig. 7 are all in their No. 1 operating positions; and that the remaining circuit elements of the system are in the positions shown in the drawings.

The skip hoist program switch SHP being in the left skip operating position 1, contacts SHP–1, 2B, 6, 10, 11, 8C and 1R are closed as shown by the SHP switch cam layout development in Fig. 3, while the remaining SHP switch contacts are open. The left skip car is in the charging pit while the right skip car is in the dump position at the top of the furnace. Under these conditions, as shown by the skip hoist limit switch cam layout development in Fig. 5, left skip limit switches LLS–1, 2, 3, 5, 7, 10 and 11 are in the closed condition and the remaining left skip limit switches are open. Also right skip limit switches RLS–3, 4, 6, 8 and 9 are in the closed condition while the remaining right skip limit switches are open.

When power is applied to the aforementioned lines L4 and L5 in the upper portion of the skip hoist control in Fig. 4A, program test transfer contactor PTS is energized through normally closed contacts PRR1 and the Normal contact of test selector switch TSS. Contactor PTS thus being energized closes contacts PTS1 to connect power to the skip hoist program control and opens contacts PTS2 to interrupt the test-reset circuit in the upper portion of Fig. 2, closes contacts PTS3 in the lower left-hand portion of Fig. 4A to close a point in the power circuit of the skip hoist directional control network, opens contacts PTS4 in the upper left-hand portion of Fig. 11A to interrupt the test-reset circuit of the small bell program control, opens contacts PTS5 in the upper left-hand portion of Fig. 14A to interrupt the test-reset circuit of the large bell program control, closes contacts PTS6 in the upper left-hand portion of Fig. 9A to connect power to the load summary program control and opens contacts PTS7 to interrupt the test-reset circuit of the load summary program control, closes contacts PTS8 in the upper left-hand portion of Fig. 6A to apply power to the distributor angle program control and opens contacts PTS9 to interrupt the test-reset circuit of the latter, and closes contacts PTS10 in the upper left-hand portion of Fig. 17 to connect power to the extra load and water charging control network.

Also upon application of power to lines L4 and L5 in Fig. 4A, stop filling relay SFR energizes through normally closed stop filling switch SFS. Relay SFR thus being energized closes contacts SFR1 in Fig. 14A to close a check point in the large bell program switch drive motor circuit for operating position 4, and opens contacts SFR2 to extinguish the stop-filling indicator lamp IL3 in the upper portion of Fig. 4A. Contacts SFR3 open a point in the energizing circuit of stop-filling alarm horn AH in the upper portion of Fig. 4A. Stop-filling alarm timing relay SFTR likewise energizes through stop-filling switch SFS and closes timed-opening contacts SFTR1 to close a point in the stop-filling alarm horn circuit. Skip hoist control-power-on indicating lamp IL5 energizes across lines L4 and L5. The closing coils of Nos. 1 and 2 slack cable relays 1SCR and 2SCR energize across lines L4 and L5. Relay 1SCR thus being energized maintains contacts 1SCR1 closed to complete the energizing circuit of No. 1 slack cable relay 1SC. Relay 2SCR thus being energized maintains contacts 2SCR1 closed to complete the energizing circuit of No. 2 slack cable relay 2SC. Relay 1SC energizes and opens contacts 1SC1 to interrupt the energizing circuit of the No. 1 slack cable latch coil controlling an annunciator and closes contacts 1SC2 to complete a point in the undervoltage relay UV circuit at the lower right-hand portion of Fig. 4B. Relay 2SC energizes and opens contacts 2SC1 to interrupt the energizing circuit of the No. 2 slack cable latch coil controlling an annunciator and closes contacts 2SC2 to complete a point in the undervoltage relay UV energizing circuit.

Left skip-in-pit relay LSP energizes and closes contacts LSP1 in the SHP drive motor reset circuit without effect, closes contacts LSP2 to complete a checkpoint for operating position 3 in the skip hoist program switch drive motor circuit in Fig. 2, closes contacts LSP3 to complete a point in the scale car left compartment solenoid circuit in the lower portion of Fig. 2, closes contacts LSP4 to complete a point in the left skip water valve solenoid circuit in the lower portion of Fig. 17, closes contacts LSP5 to complete an energizing circuit for skip-in-pit relay SPR across lines L4 and L5 in Fig. 4A, closes contacts LSP6 in the upper left-hand portion of Fig. 9A to complete a point in the load summary program switch drive motor circuit, closes contacts LSP7 in the lower portion of Fig. 8 to complete a point in the energizing circuit of left coke weigh hopper gate relay LHR, and opens contacts LSP8 in the lower right-hand portion of Fig. 4B.

Skip-in-pit relay SPR being energized through closure of contacts LSP5 as hereinbefore described, closes contacts SPR1 in the upper left-hand portion of Fig. 4A to close a point in the energizing circuit of program reset relay PRR, closes contacts SPR2 in the upper left-hand portion of Fig. 17 to close a point in the extra load relay EL energizing circuit, closes contacts SPR3 in the lower left-hand portion of Fig. 17 to close a point in the energizing circuit of water valve contractor WV, and closes contacts SPR4 in the lower portion of Fig. 11A to close a point in the scrap charge small bell open timing relay SCBT energizing circuit. Relay SPR also closes contacts SPR5 in the left-hand portion of Fig. 6A to prepare an energizing circuit for dump timer DT, opens contacts SPR6 to open a check point in the skip hoist program switch drive motor circuit for operating position 6, and opens contacts SPR7 in the lower left-hand portion of Fig. 17 to open a point in the energizing circuit of the water charging reset relay WCRR. In addition, relay SPR closes contacts SPR8 to prepare the energizing circuit of the skip hoist program switch drive motor. Furthermore, relay SPR closes contacts SPR9 to close a point in the energizing circuit of start-skip-hoist relay SS in the lower portion of Fig. 2, opens contacts SPR10 in the upper left-hand portion of Fig. 4A to interrupt the shunt across test selector switch TSS, and opens contacts SPR11 in the upper portion of Fig. 17 to interrupt the shunt across contacts SS3 and ACR6.

The closing coil C of the skip-in-pit latched relay SPLR in the lower left-hand portion of Fig. 4A also energizes across lines L4 and L5 through limit switch RLS-8 and late opening contacts SPLR3 and closes late opening contacts SPLR1 to close a point in the energizing circuit of its tripping coil T, closes contacts SPLR2 to light the hoist left skip arrow indicator lamp IL7, opens contacts SPLR4 to extinguish the hoist right skip arrow indicator lamp IL8, and opens contacts SPLR3 to deenergize closing coil C whereafter relay SPLR remains in its closed condition.

Right skip second slow-down light relay 2SDLR in the lower portion of Fig. 4A energizes through limit switch RLS-6 and opens contacts 2SDLR1 in the lower right-hand portion of Fig. 4B to interrupt a point in the energizing circuits of the first slow-down, top right and bottom left indicator lamps IL10 and IL11, respectively, closes contacts 2SDLR2 to prepare energizing circuits for the second slow-down, top right and bottom left indicator lamps IL12 and IL13, respectively; and opens contacts 2SDLR3 to open a point in the energizing circuits of the left fast and right fast indicator lamps IL14 and IL15.

Connection of power to the skip hoist program control in Fig. 2 by closure of contacts PTS1 results in energization of skip hoist program power-on indicator lamp IL1 across lines L1 and L3.

The distributor angle program switch DAP being in operating position 1, contacts DAP-1, 5, 9 and 11 are closed and the remaining DAP switch contacts are in their open condition. Connection of power to the distributor angle program control in Figs. 6A and 6B by closure of contacts PTS8 results in energization of DAP power-on indicator lamp IL16 and accurate-stop indicator lamp IL17, the latter indicating that the distributor has stopped at the zero degree operating position 1 through closure of hopper limit switch HLS-3. The significance of accurate-stop indicator lamp IL17 will hereinafter be described in connection with manual control of the distributor. Run distributor forward relay RDF (Fig. 6B) energizes across lines L8 and L10 in a circuit extending through contacts DRR3, DAP-5 and RDR2, and closes contacts RDF1 to close a point in the energizing circuit of distributor forward directional contractor F, and opens interlocking contacts RDF2 to prevent concurrent energization of run distributor reverse relay RDR.

The load summary program switch LSP being in operating position 1, contacts LSP-1, 19 and 23 are closed while the remaining LSP switch contacts are in their open condition. Upon connection of power to the load summary program control by closure of contacts PTS6 (Figs. 9A) as hereinbefore described, LSP power-on indicator lamp IL18 energizes across lines L15 and L17. Relay 1L energizes through contacts LSP-1 and closes contacts 1L1, 1L2 and 1L3 (Fig. 9B) in the water charge, distributor angle change and large bell dump networks, respectively, without effect at this time. Relay 1L also closes contacts 1L4 in the material charge network to complete an energizing circuit for automatic coke relay ACR through the Coke contact of the material charge contact set c for load No. 1 and contacts SC–18 and EL6, and closes contacts 1L5 adjacent to its operating coils in Fig. 9A to complete an energizing circuit for the count relay of a load cycle counter LCC to count the skip load being dispatched. Relay ACR thus being energized closes contacts ACR1 to prepare a check point in the skip hoist program switch drive motor circuit for operating position 5, closes contacts ACR2 to complete an energizing circuit for coke charge indicator lamp IL23, opens contacts ACR3 to interrupt a check point in the skip hoist program switch drive motor circuit for operating position 3, closes contacts ACR4 to close a point in the energizing circuit for the right coke weigh hopper gate relay in the lower portion of Fig. 17, closes contacts ACR5 to close a point in the energizing circuit of the left coke weigh hopper gate relay LHR in the right-hand portion of Fig. 8 and opens contacts ACR6 to interrupt a point in the energizing circuits of scrap charge relays SC–1 and SC–2.

If the charging sequence selector switches are set correctly, a circuit is established from line L15 through the Off contact and rotary contact of contact set b of charging sequence selector switches No. 18 through No. 15 and then through the Off contact and rotary contact of contact set a of charging sequence selector switch No. 14 and through contact sets a of switches No. 13 through No. 1 as follows: Stone contact of switch No. 13, Ore contact of switch No. 12 and switch No. 11, Coke contact of switches No. 10 through No. 8, Stone contact of switch No. 7, Ore contact of switches No. 6 and No. 5, and Coke contact of switches No. 4 through No. 1 and the operating coil of relay SSR to line L17. Relay SSR energizes and closes contacts SSR1 to close a point in the skip hoist program switch drive motor circuit in the upper portion of Fig. 2, closes contacts SSR2 to close a point in the small bell program switch drive motor circuit in the upper portion of Fig. 11A, and closes contacts SSR3 to close a point in the load summary program switch drive motor circuit in the upper portion of Fig. 9A. Relay SSR also closes contacts SSR4 adjacent its operating coil to energize the selector-switches-set-correctly indicator lamp IL19, closes contacts SSR5 to connect alternating current power to the load summary light network in the lower portion of Fig. 9B, and closes contacts SSR6 to close a point in the large bell program switch drive motor circuit in the upper portion of Fig. 14A.

The small bell program switch SBP in Fig. 11A being in operating position 1, contacts SBP-1, 4, 5, 9 and 1R are closed as shown in Fig. 12 and the remaining SBP switch contacts are in their open condition.

Let it be assumed that the small bell is closed, the relief valve is closed and that the equalizer valve is open. This is the normal condition of the furnace wherein the furnace top is pressurized.

Upon connection of alternating current power to conductors L18 and L20 of the small bell program control in the upper portion of Fig. 11A as hereinbefore described, a circuit is established for energizing the small bell program power-on lamp IL25 to light the same. Small bell closed relay SBCR in the lower portion of Fig. 11B energizes in a circuit extending through small bell closed limit switch SBLS-1, the latter having been tripped to the closed position when the small bell was closed. Contacts SBCR1 close to prepare a check point in the small bell program switch drive motor circuit for operating position 10. Contacts SBCR2 (Fig. 11B) close a point in the relief valve closing relay RVC energizing circuit. Contacts SBCR3 close to prepare a check point in the large bell program switch drive motor circuit for operating position 5. Contacts SBCR4 in the left-hand portion of Fig. 6A complete an energizing circuit of dump timer DT. High pressure top on automatic relay HPA in the lower portion of Fig. 11B energizes in a circuit extending from line L18 through the Remote contact of the high pressure top selector switch HPS to line L20. Contacts HPA1 close a point in the initial energizing circuit of the small bell program switch drive motor, contacts HPA2 close a point in the relief valve opening relay RVO energizing circuit in the lower portion of Fig. 11A, contacts HPA3 close a point in the equalizer valve closing relay EVC energizing circuit in the upper portion of Fig. 11B, contacts HPA4 close a point in the energizing circuit of relief valve closing relay RVC, and contacts HPA5 close a point in the energizing circuit of equalizer valve opening relay EVO. Relief valve closed relay RVCR at the lower portion of Fig. 11B energizes in a circuit extending from line L18 through relief valve closed limit switch RVLS-1 to line L20, switch RVLS-1 being tripped to the closed position as shown when the relief valve is closed. Contacts RVCR1 close to prepare a check point in the small bell program switch drive motor circuit for operating position 11, contacts RVCR2 close to prepare a check point in the LBP switch drive motor circuit for operating position 8, and contacts RVCR3 close a point in the energizing circuit of large bell opening relay LBO in the upper portion of Fig. 14B. Equalizer valve open relay EVOR in the lower portion of Fig. 11B energizes in a circuit extending from line L18 through equalizer valve open limit switch EVLS-2 to line L20, limit switch EVLS-2 being tripped to the closed position when the equalizer valve is opened. Contacts EVOR1 close to prepare a check point in the SBP drive motor circuit for operating position 11, contacts EVOR2 in the left-hand portion of Fig. 14A close to prepare a check point in the LBP switch drive motor energizing circuit for operating position 8, and contacts EVOR3 close a point in the large bell opening relay LBO energizing circuit in the upper right-hand portion of Fig. 14B.

When power is connected to conductors L13 and L14 of the left coke charging control in Fig. 8 and selector switch contact LCS1 thereof is set on the On position as hereinbefore described, the left coke system off relay LOR energizes across conductors L13 and L14 through contact FS1 of the fill selector switch FS in the Auto position, contact LCS1 in the On position and contact DS1 of the Discharge selector switch in the Auto position. Relay LOR opens contacts LOR1 to interrupt a check point in the skip hoist program switch drive motor circuit for operating position 3, closes contacts LOR2 to prepare a check point in the skip hoist program switch drive motor circuit to operating position 5, opens contacts LOR3 to interrupt a point in the energizing circuit of start skip hoist relay SS in the lower portion of Fig. 2, closes contacts LOR4 to prepare a point in the load summary program switch drive motor circuit in the upper left-hand portion of Fig. 9A, opens contacts LOR5 to interrupt a shunt circuit across contacts LOR4 and closes contacts LOR6 in Fig. 8 to complete a point in the left coke weigh hopper gate relay LHR energizing circuit. Assuming that the left coke weigh hopper is full by weight, the full weight limit switch FWLS is tripped to the closed position as shown. Thus, left coke full weight relay LFWR energizes through the fill selector contact FS2 and limit switch FWLS, and closes contacts LFWR1 to complete the energizing circuit of relay LHR through the discharge selector switch contacts DS2 and contacts LFWR1, ACR5, EL8, LSP7, LOR6 and LDT1. Contacts LFWR2 open to interrupt the energizing circuit of the left coke zero weight relay LZWR. Relay LHR energizes in this circuit and closes contacts LHR1 to complete a holding circuit for its operating coil in shunt of contacts LFWR1, closes contacts LHR2 to close a point in the energizing circuit of the left discharge hopper gate timing relay LDT, closes contacts LHR3 to complete an energizing circuit across lines L13 and L14 for the left discharge gate solenoid LDGS, and opens contacts LHR4 to interrupt a check point in the skip hoist program switch drive motor circuit for operating position 3. Upon the energization of left discharge gate solenoid LDGS, the gate opens and the coke is dumped from the weigh hopper into the left skip car. Full weight limit switch FWLS opens to interrupt the energizing circuit of relay LFWR whereupon the latter closes contacts LFWR2 to complete a point in the energizing circuit of the left coke zero weight relay LZWR. When all the cake is dumped from the left weigh hopper, zero weight limit switch ZWLS closes to complete the energizing circuit of relay LZWR across lines L13 and L14. Relay LZWR being thus energized closes contacts LZWR1 to prepare a check point in the skip hoist program switch drive motor circuit for operating position 3, closes contacts LZWR2 to complete a holding circuit for its operating coil in shunt of limit switch ZWLS, and closes contacts LZWR3 to complete the energizing circuit for the left discharge hopper gate timing relay LDT through the then closed contacts LHR2 and contact DS3. Relay LDT being thus energized opens contacts LDT1 after a predetermined time interval to interrupt the energizing circuit of relay LHR. Relay LHR deenergizes and opens contacts LHR3 to interrupt the energizing circuit of left discharge gate solenoid LDGS, whereupon the gate closes, and closes contacts LHR4 to prepare a check point in the skip hoist program switch drive motor circuit for operating position 3.

In the event the left coke system becomes inoperative, it can be locked out by turning fill selector switch FS, discharge selector switch DS or switch LCS to the Off position to deenergize relay LOR. If the fill selector switch is turned to the Off position, deenergization of relay LOR and opening of contacts LOR6 prevents discharging of the coke from the left weigh hopper into the left skip car. If the discharge selector switch is turned to the Off position, deenergization of relay LOR will permit automatic or manual filling of the left weigh hopper but will prevent discharge of coke therefrom into the left skip car. Deenergization of relay LOR effects closure of contacts LOR1 in Fig. 2 to permit skip hoist operation. Relay LOR also signals the charging control system to bypass the left coke system and obtain each preselected coke charge from the right coke system. To this end, the load summary program switch drive circuit in the upper portion of Fig. 9A is operated as hereinafter described.

Under normal automatic operating conditions, left coke system off relay LOR and a similar right coke system Off relay are energized thereby closing contacts LOR4 and ROR4 and opening contacts LOR5 and ROR5. Therefore, each time the left skip car is hoisted and contacts HL2 close, the LSP switch is driven to the next operating position to energize automatic coke relay ACR (Fig. 9B) and close contacts ACR5 in the left coke system and corresponding contacts in the right coke system if coke has been preselected for the next load. Similarly, each time the right skip car is hoisted and contacts HR2 (Fig. 9A) close, the LSP switch is driven to the next operating position to energize relay ACR and close contacts ACR5 in the left coke system and corresponding contacts in the right coke system. In this way, each skip load drives the LSP switch to prepare the coke systems for operation when the next skip car enters the charging pit.

Assuming now that the left coke system is locked out to restore relay LOR. As a result, relay LOR effects not only closure of contacts LOR1 and opening of contacts LOR6 as hereinbefore described but also closure of contacts LOR5 and opening of contacts LOR4. Now, when the empty left skip car is hoisted and contacts HL2 and HL3 close, an energizing circuit is not established for the LSP switch motor for the reason that contacts LOR4 and ROR5 are open. The empty left skip car, therefore, does not operate the LSP switch and the left coke system is by-passed. Consequently, the next scheduled coke load is discharged by the right coke system into the right skip car.

The large bell program switch LBP being in operating position 1 as shown in Fig. 15, contacts LBP–1, 4, 5, 6A, 6B, 7 and 1R are closed and the remaining LBP switch contacts are in their open condition. When power is supplied to conductors L21 and L23 in the upper portion of Fig. 14A as hereinbefore described, the large bell program power-on indicator lamp IL26 lights. Bell slack cable timing relay BSCTR energizes across conductors L21 and L23 and opens contacts BSCTR1 in the upper portion of Fig. 14A after a predetermined interval of time. The bell slack cable reset switch SCRS is pressed to complete an energizing circuit through normally closed limit switches LBLS–3 and SBLS–3 to energize bell slack cable relay BSC. The latter energizes and closes contacts BSC1 in the upper left-hand portion of Fig. 11B to close a point in the energizing circuit of small bell valve operator contactor SB to prepare for opening of the small bell, closes contacts BSC2 in the lower portion of Fig. 14A to close a point in the energizing circuit of large bell valve operator contactor LB to prepare for opening of the large bell, opens contacts BSC3 in the left-hand portion of Fig. 11B to open a point in the small bell closing circuit of small bell valve operator contactor SB, closes contacts BSC4 to complete a holding circuit for the operating coil of relay BSC in shunt of bell slack cable reset switch SCRS, and opens contacts BSC5 in the lower portion of Fig. 14A to interrupt a point in the large bell closing circuit of large bell valve operator contactor LB.

The large bell closed relay LBCR energizes in a circuit extending through limit switch LBLS–1, the latter having tripped to the closed position when the large bell closed, and closes contacts LBCR1 to prepare a check point in the small bell program switch drive motor circuit for operating position 2, closes contacts LBCR2 to close a point in the energizing circuit of equalizer valve closing relay EVC in the upper portion of Fig. 11B, and closes contacts LBCR3 to prepare a check point in the large bell program switch drive motor circuit for operating position 11. Furnace full relay FFR in the lower portion of Fig. 14B energizes in a circuit extending from line L21 through stock line recorder limit switches RSRLS and LSRLS in parallel to line L23, and closes contacts FFR1 to prepare a check point in the large bell program switch drive motor circuit for operating position 3. Relay LLSRR in the lower portion of Fig. 14B energizes and closes contacts LLSRR1 to close a point in the initial circuit for the large bell program switch drive motor. Relay LRSRR energizes and closes contacts LRSRR1 to close a further point in the energizing circuit for the large bell program switch drive motor. Energization of lower left stockrod relay LLSRR and lower right stockrod relay LRSRR also results in control of the left and right stockrod motor circuits to effect lowering of the stockrods into the furnace in a manner shown and described in Douglas W. Fath and Charles E. Smith copending application Serial No. 819,180, filed June 9, 1959.

To energize undervoltage relay UV, the undervoltage relay reset button in the lower left-hand portion of Fig. 4B is momentarily pressed. This completes an energizing circuit from line L6 through normally closed overspeed contacts LOS, normally closed contacts HR5 of hoist right relay HR, left skip limit switch LLS–11, left skip limit switch LLS–3, left Lilly overtravel limit switch LLOT, undervoltage reset switch UVR, contacts CTS8 of the charging control transfer switch, contacts RS3, contacts SHM4 of the stockhouse master switch, normally closed emergency stop switch ESS and contacts 1SC2 and 2SC2 to line L7. Relay UV thus being energized closes contacts UV1 to complete an energizing circuit from line L4 in the upper portion of Fig. 4A through selector switch MOA in the Auto position, normally closed contacts MAN4 and the operating coil of the AUTO relay to line L5. Relay AUTO thus being energized closes contacts AUTO1 to close a point in the energizing circuit of hoist right relay HR in the mid-portion of Fig. 4B, closes contacts AUTO2 to close a point in the energizing circuit of hoist left relay HL, closes contacts AUTO3 to complete a shunt circuit across contacts SHM3 and MAN3 in the energizing circuit of 475 feet per minute relay 475R, opens interlocking contacts AUTO4 to prevent concurrent operation of manual relay MAN, closes contacts AUTO5 to complete a point in the UV relay holding circuit in the lower portion of Fig. 4B, closes contacts AUTO6 adjacent its operating coil to light skip hoist on automatic indicator lamp IL6, closes contacts AUTO7 to close a point in the energizing circuit of distributor start relay DSR in Fig. 6A, closes contacts AUTO8 to complete a point in the energizing circuit of distributor run relay DR in Fig. 6B, closes contacts AUTO9 to complete the skip hoist program switch drive motor circuit in the upper portion of Fig. 2, closes contacts AUTO10 to complete the energizing circuit of small bell closing relay SBC in Fig. 11A, closes contacts AUTO11 in the energizing circuit of relief valve opening relay RVO in the lower portion of Fig. 11A, closes contacts AUTO12 to complete the energizing circuits of relief valve closing relay RVC and equalizer valve opening relay EVO, closes contacts AUTO13 to close a point in the distributor angle program switch drive motor circuit in the upper portion of Fig. 6A, closes contacts AUTO14 to close a point in the energizing circuit of extra load relay EL in Fig. 17, closes contacts AUTO15 to prepare an energizing circuit for water valve contactor WV in the lower portion of Fig. 17, closes contacts AUTO16 to prepare the energizing circuit of large bell opening relay LBO in the upper portion of Fig. 14B, closes contacts AUTO17 to complete a point in the small bell program switch drive motor circuit in the upper portion of Fig. 11A, and closes contacts AUTO18 to complete the large bell program switch drive motor circuit in the upper portion of Fig. 14A.

Undervoltage relay UV being energized as aforementioned also closes contacts UV2 in the lower portion of Fig. 4B to complete a holding circuit for itself in shunt of Reset switch UVR through right Lilly overtravel limit switch RLOT, right skip limit switch RLS3, contacts UV2, CTS10 and AUTO5. Thereafter the UV reset button may be released and undervoltage relay UV will be maintained through this holding circuit. Contacts UV3 and UV4 in the lower portion of Fig. 4A also close to apply power to the skip hoist directional control network and to light skip hoist power-on indicator lamp IL9. Undervoltage relay UV having been set, the skip hoist run-stop selector switch RS may be set in the On position preparatory to automatic operation of the skip hoist. The check small bell relay CSBR in the lower portion of Fig. 4A energizes in a circuit extending from line L4 through contacts SHP–11 to line L5 and closes contacts CSBR1 to complete a point in the energizing circuits of hoist right and hoist left relays HR and HL, respectively.

Left skip first slowdown light relay 1SDLL in the right-hand portion of Fig. 4B energizes through limit switch LLS–5 and closes contacts 1SDLL1 to close a point in the energizing circuits of left fast and right fast indicator lamps IL14 and IL15.

The SHP switch drive motor being energized as hereinbefore described, in a circuit extending through contacts SHP–1R, SPR8, AUTO9, SSR1, PRR6, switch NT1 in the Normal position and field winding F1 of the SHP switch motor, the skip hoist program switch rotates to operating position 2. Contacts SHP–1 in the upper left-hand portion of Fig. 4A interrupt the program reset lamp IL4 circuit to extinguish the lamp, contacts SHP–4 close a point in the energizing circuit of scale car interlocking relay SCIR in the lower portion of Fig. 2 without effect as ore and stone relay contacts STR1 are open, contacts SHP–6 open a point in the energizing circuit of hoist right relay HR in the mid-portion of Fig. 4B, contacts SHP–7 close a point in the energizing circuit of water valve contactor WV in the lower portion of Fig. 17, contacts SHP–10 interrupt a point in the energizing circuit of relay CSBR in the lower portion of Fig. 4A, contacts SHP–1R in the upper portion of Fig. 2 interrupt the initial energizing circuit of the skip hoist program switch drive motor, and contacts SHP–2R close to prepare the skip hoist program switch drive motor circuit for operating position 2.

Referring now to Fig. 6A, when dump timer DT times out a predetermined time interval after closure of contacts SPR5 when the left skip car reaches the charging pit, contacts DT1 close to complete an energizing circuit for the closing coil of distributor angle counter zero degree relay DRA in a circuit extending through contacts AUTO7, DRR2, DCRR3 and DT1. Relay DRA energizes in this circuit and closes contacts DRA1 to complete an energizing circuit for distributor stop relay DMR through contacts DAP–1 and DSR2, and closes contacts DRA2 in the energizing circuit of distributor counter reset relay DCRR. Relay DMR thus being energized, closes contacts DMR1 in the upper left-hand portion of Fig. 2 to complete a second energizing circuit for the skip hoist program switch drive motor through contacts SHP–2R, closes contacts DMR2 to prepare a check point in the small bell program switch drive motor circuit for operating position 3, closes contacts DMR3 to complete a holding circuit for its operating coil in shunt of contacts DAP–1 and DSR2, and opens contacts DMR4 to open a point in the energizing circuit of distributor run relay DR in the lower portion of Fig. 6B.

The skip hoist program switch drive motor circuit being energized through contacts SHP–2R and DMR1 as hereinbefore described, drives the SHP switch to operating position 3. As a result, contacts SHP–2R open and contacts SHP–3R close to complete a third energizing circuit for the skip hoist program switch drive motor extending through contacts LSP2, LZWR1, and LHR4, the closed condition of the latter two contacts indicating that the coke has been discharged from the weigh hopper into the left skip car. The SHP switch rotates to operating position 4 and, as extra water relay contacts EW4 and automatic water relay contacts AWR3 are closed established a fourth energizing circuit, the SHP switch rotates therethrough to operating position 5. As a result, contacts SHP–4R open and contacts SHP–5R close to complete a fifth energizing circuit for the SHP switch drive motor. Contacts SHP–5L in the lower left-hand portion of Fig. 2 close an energizing circuit for the start skip indicator lamp IL2 to light the same. Contacts LOR2 and ACR1 being closed at this time, the skip hoist program switch rotates to operating position 6. As a result, contacts SHP–4 in the lower portion of Fig. 2 open a point in the energizing circuit of relay SC1R. Contacts SHP–5 in the upper portion of Fig. 4B complete the energizing circuit for hoist left relay HL.

This circuit may be traced from line L4 through contacts GVR, CTS3, RS2, CSBR1, SHP–5, and AUTO2, limit switch LLS–1, contacts HR9, and limit switch LLS–2 to line L5. Contacts SHP–9 in the lower portion of Fig. 4A complete a holding circuit for the operating coil of relay CSBR in shunt of contacts SHP–11. Contacts SHP–5R open and contacts SHP–6R close to prepare a sixth energizing circuit for the SHP switch drive motor. However, the skip hoist program switch cannot rotate beyond operating position 6 at this time because skip-in-pit contacts SPR6 are open. Contacts SHP–5L interrupt the start skip indicator lamp circuit in the lower portion of Fig. 2 to extinguish the same.

Hoist left relay HL being energized as hereinbefore described, completes the energizing circuits of the hoist left skip directional contactors (not shown) which in turn complete the skip hoist motor power circuits to initiate hoisting of the left skip out of the pit. Relay HL in addition closes contacts HL1 to complete an energizing circuit for the 150 feet per minute relay 150R in the right-hand portion of Fig. 4B through limit switch LLS–5 and contacts CTS–5, closes contacts HL2 to complete the energizing circuit of the load summary program No. 1 run relay LSP1R in the upper portion of Fig. 9A. This circuit may be traced from line L15 through contacts LSP6, HL2, LOR4, LSP3R2, EL5, LSP2R4, LSP–19 and LSP2R5, to line L17. Relay HL also closes contacts HL3 in the upper left-hand portion of Fig. 9A to close a point in shunt of contacts LOR4, closes contacts HL4 adjacent its operating coil to complete an energizing circuit for a left coke starting relay, not shown herein but shown and described in the aforementioned Douglas W. Fath and Charles E. Smith copending application Serial No. 720,399, filed March 10, 1958, and opens contacts HL5 to interrupt a shunt across slowdown check limit switch LLS–11 in the left-hand portion of Fig. 4B in the under-voltage relay UV energizing circuit. Relay HL also closes contacts HL6 in the lower left-hand portion of Fig. 4B to establish a shunt across the governor overspeed contacts LOS to prevent dropping out of under-voltage relay UV during acceleration, closes contacts HL7 to close a point in the energizing circuit of the 475 feet per minute relay 475R, closes contacts HL8 adjacent its operating coil to complete an energizing circuit for a hoist left skip sequence recorder LSR, and opens interlocking contacts HL9 to prevent concurrent operation of hoist right relay HR. Relay 150R being thus energized closes contacts 150R1 to close a point in the 475R relay circuit, and opens contacts 150R2 to interrupt the shunt across contacts HR5 and limit switch LLS–11 in the lower left-hand portion of Fig. 4B.

Small bell closing relay SBC in the lower portion of Fig. 11A being energized by closure of contacts AUTO10 in a circuit extending also through contactor SBROL1 of the small bell selector switch in the Remote position, and contacts SBP–4 and SBO2. Relay SBC closes contacts SBC1 in Fig. 11B without effect at this time as contacts MAN13 are open, closes contacts SBC2 to close a point in the small bell closing circuit of small bell valve operator contactor SB, and opens interlocking contacts SBC3 in the lower right-hand portion of Fig. 11A to prevent operation of small bell opening relay SBO. Relief valve closing relay RVC being energized by closure of contacts AUTO12 in a circuit extending also through contacts SBP–9, HPA4, SBCR2 and RVO2, closes contacts RVC1 in the mid-portion of Fig. 11B, and opens interlocking contacts RVC2 in the lower portion of Fig. 11A to prevent energization of relief valve opening relay RVO. Equalizer valve opening relay EVO being energized by closure of contacts AUTO12 in a circuit extending also through contacts SBP–9, HPA4 and HPA5, limit switch RVLS–11 and contacts EVC2, closes contacts EVO1 in the mid-portion of Fig. 11B, and opens interlocking contacts EVO2 to prevent concurrent energization of equalizer valve closing relay EVC.

The large bell program switch LBP drive motor circuit in the upper portion of Fig. 14A being energized by closure of contacts AUTO18 as hereinbefore described, rotates the LBP switch to operating position 2. As a result, contacts LBP–1 further interrupt the program reset lamp IL4 circuit in Fig. 4A, and contacts LBP–2 close to prepare the LBP switch reset circuit in the upper portion of Fig. 14A. The LBP switch stops in operating position 2 to await a signal from dump large bell relay DLB to dump the large bell as hereinafter described.

Upon the closure of contacts HL2 in the upper left-hand portion of Fig. 9A, relay LSP1R is energized in the circuit hereinbefore described. As a result, contacts LSP1R1 close to complete the load summary program switch drive motor circuit through contacts SSR3, PRR10 and LSPRR3, switch NT3 in its normal position and field winding F3 of the switch motor. Contacts LSP1R2 close a holding circuit to maintain energization of relay LSP1R and motor field winding F3. Contacts LSP1R3 close an energizing circuit for relay LSP3R across lines L15 and L17. Contacts LSP1R4 open a point in the LSP switch alternate drive circuit. Contacts LSP1R5 open a point in the energizing circuit of relay LSP2R. Relay LSP3R energizes as aforementioned and closes contacts LSP3R1 to complete a holding circuit for its operating coil from line L15 through contacts LSP6, HL2, LOR4, and LSP3R1 to line L17. Contacts LSP3R2 open the original energizing circuit of relay LSP1R and the LSP switch drive motor, energization of the latter elements, however, being maintained through contacts LSP1R2.

As a result of energization of the LSP switch field winding F3, the switch is driven to operating position 2, and as a result as shown in Figs. 9A and 10, contacts LSP–1 open to interrupt energization of relay 1L, contacts LSP–2 complete an energizing circuit for relay 2L across lines L15 and L17, contacts LSP–19 interrupt energization of the LSP switch drive motor and relay LSP1R to stop the LSP switch in operating position 2, contacts LSP–20 close a point in the alternate energizing circuit of the LSP switch drive motor and in the energizing circuit of relay LSP2R, and contacts LSP23 open a point in the program reset lamp IL4 circuit in the upper portion of Fig. 4A.

Relay 1L being deenergized as hereinbefore described, opens contacts 1L1, 1L2 and 1L3 in the water charge, distributor angle change and large bell dump circuits, respectively, without effect, and opens contacts 1L4 in the automatic coke relay ACR energizing circuit, the latter, however, being maintained as hereinafter described. Relay 1L also opens contacts 1L5 adjacent its operating coil, the load cycle counter having registered one count for the first charging cycle.

Relay 2L being energized in operating position 2 of the LSP switch, closes contacts 2L1 without effect as a water charge has not been scheduled for load No. 2, closes contacts 2L2 to prepare an energizing circuit for change distributor angle relay CDAR to be completed when contacts SBP–7 close in operating position 8 of the SBP switch, closes contacts 2L3 to prepare an energizing circuit for dump large bell relay DLB to be completed upon closure of contacts SBP–7, and closes contacts 2L4 to complete an energizing circuit for relay ACR from line L15 through contacts 2L4, the Coke contact of material charge contact set c for load No. 2, and contacts SC–13 and EL6 to line L17 to prepare for a coke charge for load No. 2.

Referring to the skip hoist limit switch cam layout development in Fig. 5, when the loaded left skip car is hoisted from the pit, the empty right skip car leaves its dump position at the top of the furnace. When the left skip car leaves the pit, limit switches RLS–1 and RLS–2 close points in the hoist right relay HR energizing circuit in the right-hand portion of Fig. 4B. Relay 150R being energized and field forcing limit switch RLS–9 being closed as hereinbefore described, the shunt fields on the skip hoist motors are forced to obtain maximum acceleration torque in a well known manner. Relay 150R also controls the skip hoist motors, calling for a speed of 150 feet per minute. Limit switch RLS–4 remains closed to shunt overspeed contacts LOS through hoist left relay contacts HL6 in the lower left-hand portion of Fig. 4B to render the overspeed governor ineffective during acceleration.

When the left skip car moves a few (for example, four) inches out of the pit, limit switch RLS–8 interrupts the energizing circuit of left skip-in-pit relay LSP in the lower left-hand portion of Fig. 4A. As a result, relay LSP deenergizes and opens contacts LSP5 to interrupt the energizing circuit of relay SPR, opens contacts LSP6 in the upper left-hand portion of Fig. 9A to interrupt the holding circuit of the LSP switch run relay LSP3R to restore the latter and closes contacts LSP8 in the indicating lamp circuit in the lower right-hand portion of Fig. 4B.

Relay SPR being deenergized opens contacts SPR5 in Fig. 6A to interrupt energization of dump timer DT, and closes contacts SPR6 to complete an energizing circuit for the SHP switch drive motor for rotating the same from operating position 6 to operating position 7. As relay SPR is deenergized by relay LSP which in turn is deenergized by opening of limit switch RLS–8 when the left skip car leaves the pit, the aforementioned operating position 6 is a checkpoint to be certain that the left skip car actually leaves the pit. As a result, the SHP switch rotates to operating position 7 and stops in that position to await operation of the small bell program switch. Dump timer DT being thus deenergized, opens contacts DT1 in Fig. 6A to interrupt energization of closing coil C of latched relay DRA until the right skip car enters the charging pit.

The SHP switch having been driven to operating position 7, contacts SHP–3 in the upper left-hand portion of Fig. 11A complete the energizing circuit of the SBP switch drive motor in a circuit extending from line L18 through contacts SBP–1R, HPA1, AUTO17, SSR2, PRR13, Normal contact of normal-test selector switch NT4 and field winding F4 of the SBP switch motor to line L20 to drive the SBP switch to operating position 2. Contacts SHP–11 in the lower portion of Fig. 4A open without effect at this time as relay CSBR is maintained through contacts SHP–9 and limit switch LLS–10. Contacts SHP–8B close a point in the scrap charge relay SC–2 circuit in the upper portion of Fig. 17, contacts SHP–8C open a point in the extra load relay EL circuit in Fig. 17, and contacts SHP–7R close to prepare to advance the SHP switch to operating position 8 when the small bell program switch reaches operating position 3.

The SBP switch having been driven to operating position 2, opens contacts SBP–1 in the reset lamp IL4 circuit in the upper portion of Fig. 4A, closes contacts SBP–2 in the SBP switch reset circuit, opens contacts SBP–5 to hold up operation of the SHP switch at operating position 8 until the small bell opening and closing sequence is completed, opens contacts SBP–9 to interrupt energization of relays RVC and EVO, closes contacts SBP–8 to complete an energizing circuit for equalizer valve closing relay EVC through contacts AUTO11, HPA2, HPA3, LBCR2 and EVO2, and closes contacts SBP–11 to energize small bell open timing relay SBOT. Relay EVC energizes and closes contacts EVC1 to complete an energizing circuit for equalizer valve operator contactor EV in a circuit extending from line L18 through contacts EVC1 and limit switch EVCLS-1 to line L20, and opens contacts EVC2 to prevent energization of relay EVO. Contactor EV energizes and closes contacts EV1 adjacent its operating coil to energize the air valve operator motor whereupon the latter actuates the air valve toward the closed position.

The equalizer valve operator is well-known and, therefore, the details thereof have not been shown for the sake of simplicity. It comprises a pneumatic equalizer valve cylinder controlled by a three-way air valve which is driven by a gear motor through a suitable crank and linkage mechanism. The air valve mechanism is arranged so that 180 degrees rotation of the crank arm on the gear motor moves the air valve from the open to the closed position, shutting off the compressed air to the equalizer valve cylinder and exhausting the cylinder to the atmosphere. The cylinder is counter-weighted and lowers by gravity, causing the equalizer valve to close. The next 180 degrees of rotation of crank arm on the gear motor moves the air valve from the closed to the open position, admitting compressed air to the cylinder. The cylinder is raised by the compressed air, causing the equalizer valve to open.

The air valve operator motor having been energized by closure of contacts EV1, moves the air valve toward the closed position. Limit switch EVOLS-1 closes. When the air valve is closed, limit switch EVCLS-1 in the lower right-hand portion of Fig. 11B opens to interrupt energization of contactor EV whereupon the latter opens contact EV1 to stop the motor. Also, the equalizer valve cylinder is exhausted to the atmosphere and the equalizer valve starts to close. When the equalizer valve is fully closed, hence closing the space between the small and large bells from the interior of the furnace, limit switches EVLS-1 and EVLS-11 close. Limit switch EVLS-1 in the lower left-hand portion of Fig. 11B effects energization of equalizer valve closed relay EVCR while limit switch EVLS-11 in the lower portion of Fig. 11A effects energization of relief valve opening relay RVO in a circuit extending also through contacts AUTO11, SBP-8, HPA2 and RVC2.

Going back to the operation of the small bell program switch, the latter has reached operating position 2 as hereinbefore described. A check is made in position 2 to determine if the large bell is closed. Contacts LBCR1 being closed indicates that the large bell is closed and the small bell program switch drive motor circuit is completed through contacts SBP-2R and LBCR1 to drive the SBP switch to operating position 3. As a result, contacts SBP-6 close in the left-hand portion of Fig. 2 to permit the skip hoist program switch to advance to operating position 8. Contacts SBP-3R close in operating position 3 of the small bell program switch. In this position a check is made to determine if the distributor rotation has been completed, indicated by contacts MCR3 and DMR2 being in the closed position. The distributor having been set for zero degree rotation and relay DMR being energized, an energizing circuit is established through contacts SBP-3R, MCR3 and DMR2 to advance the SBP switch to operating position 4. In operating position 4, contacts SBP-10 in the upper portion of Fig. 6B close to complete an energizing circuit for distributor reset relay DRR across lines L8 and L10. Contacts SBP-4R also close in operating position 4 of the SBP switch to prepare for advancement of the latter from operating position 4 to operating position 5.

Referring to Figs. 6A and 6B, distributor reset relay DRR in the upper portion of Fig. 6B having been energized by closure of contacts SBP-10 when the SBP switch reached operating position 4, closes contacts DRR1 to complete an energizing circuit for distributor counter reset relay DCRR through the then closed contacts DRA2, opens contacts DRR2 to interrupt the energizing circuit of relay DMR, and opens contacts DRR3 to interrupt energization of relay RDF. Relay DCRR thus being energized, closes contacts DCRR1 to complete a holding circuit for its operating coil in shunt of contacts DRR1, closes contacts DCRR2 to initiate resetting of counter HLSC, and at contacts DCRR3 opens another point in the relay DMR energizing circuit. Relay RDF being thus deenergized, opens contacts RDF1 in the circuit of distributor forward contactor F, and closes contacts RDF2 in the circuit of relay RDR. Relay DMR being deenergized, opens contacts DMR3 to interrupt the holding circuit for its operating coil, and closes contacts DMR4 in Fig. 6B to close a point in the energizing circuit of distributor run relay DR.

As a final step in resetting the counter, tripping coil T of latched relay DRA is energized and opens contacts DRA1 to prevent energization of distributor start relay DSR until dump timer DT is energized when the right skip car enters the charging pit, and opens contacts DRA2 to interrupt energization of relay DCRR.

Small bell open timing relay SBOT being energized as hereinbefore described closes contacts SBOT1 to complete an energizing circuit for the SBP switch drive motor through contacts SBP-4R, to advance the small bell program switch to operating position 5, and opens contacts SBOT2 to interrupt a check point in the SBP switch drive motor circuit for operating position 9. When the SBP switch rotates to operating position 5, contacts SBP-4R open and contacts SBP-5R close to prepare an energizing circuit for rotating the SBP switch to operating position 6.

Relay EVCR at the lower portion of Fig. 11B having been energized, closes contacts EVCR1 to prepare the SBP switch for rotation to operating position 6, and closes contacts EVCR2 to prepare an energizing circuit for small bell opening relay SBO in the lower right-hand portion of Fig. 11A. Relay RVO having been energized, closes contacts RVO1 to complete an energizing circuit through limit switch RVOLS-1 for relief valve operator contactor RV, and opens contacts RVO2 to prevent operation of relay RVC. Contactor RV energizes and closes contacts RV1 adjacent its operating coil to energize the air valve operator motor whereupon the latter actuates the air valve toward the open position. Limit switch RVCLS-1 closes. The relief valve operator is similar to the equalizer valve operator hereinbefore described. When the air valve is fully open, limit switch RVOLS-1 opens to interrupt energization of contactor RV whereupon the latter opens contacts RV1 to stop the motor. Compressed air is admitted to the relief valve cylinder and the relief valve starts to open. Limit switches RVLS-1 and RVLS-11 open. When the relief valve is fully open, depressurizing the furnace top, limit switch RVLS-2 effects energization of relief valve open relay RVOR in the lower portion of Fig. 11B. Contacts RVOR1 complete an energizing circuit through contacts SBP-5R and EVCR1 to drive the SBP switch to operating position 6, and contacts RVOR2 prepare an energizing circuit for small bell opening relay SBO.

In operating position 5, a check was made to determine that the equalizer valve is closed and the relief valve is open. The closed condition of contacts EVRC1 and RVOR1 indicated that the furnace top was depressurized and the SBP switch moved to operating position 6. As a result, contacts SBP-5R open and contacts SBP-6R close. In operating position 6, a final check is made to insure that the LBP switch is in a position wherein the large bell is closed. The LBP switch being in operating position 2, contacts LBP-5 are closed and the SBP switch is driven to operating position 7. As a result contacts SBP-4 interrupt energization of relay SBC, and contacts SBP-3 close an energizing circuit for small bell opening relay SBO in a circuit extending through contact SBROL1 of the small bell selector switch in its Remote position, contacts AUTO10 and SBP-3, limit switch LBLS-11, and contacts HPM3, RVOR2, EVCR2 and SBC3. Also, contacts SBP-6 open the SHP switch drive motor circuit for operating position 7, the SHP switch having been advanced to operating position 8, and contacts SBP-10 in the upper portion of Fig. 6B open to restore distributor reset relay DRR.

Relay SBO energizes and closes contacts SBO1 to complete an energizing circuit for small bell valve operator contactor SB in a circuit extending through contacts BSC1 and limit switch SBOLS-1. Contactor SB energizes and closes contacts SB1 adjacent its operating coil to energize the small bell valve operator motor, whereupon the latter actuates the air valve toward its open position. Limit switch SBCLS-1 closes as shown in the small bell valve operator rotating cam limit switch layout development in Fig. 13. The small bell operator is similar to the equalizer valve operator hereinbefore described. When the air valve is fully open, limit switch SBOLS-1 opens as shown in Fig. 13 to interrupt energization of contactor SB whereupon the latter opens contacts SB1 to stop the motor. Compressed air is admitted to the small bell cylinder and the small bell opens to dump any load previously deposited on the small bell. Limit switch SBLS-1 opens to restore relay SBCR, which opens contacts SBCR1 to prevent rotation of the SBP switch beyond operating position 10 until the small bell closes, opens contacts SBCR2 to prevent energization of relay RVC, opens contacts SBCR3 in Fig. 14A to prevent operation of the LBP switch beyond operating position 5 until the small bell is closed, and opens contacts SBCR4 in the energizing circuit of dump timer DT in Fig. 6A. Also, liimt switch SBLS-11 at the upper portion of Fig. 14B opens to prevent energization of large bell opening relay LBO. When the small bell is fully open, limit switch SBLS-2 effects energization of small bell open relay SBOR in the lower left-hand portion of Fig. 11B. Relay SBOR closes contacts SBOR1 to complete an energizing circuit through contacts SBP-7R to effect rotation of the SBP switch to operating position 8, and closes count contacts SBOR2 in the loads on large bell counter LLBC adjacent its operating coil to register one count for the load dumped from the small bell onto the large bell.

In being driven to operating position 8, the SBP switch closes contacts SBP-7 in the left-hand portion of Fig. 9B to complete an energizing circuit for change distributor angle relay CDAR through contacts 2L2, and to complete an energizing circuit for dump large bell relay DLB through contacts 2L3. Contacts SBP-11 interrupt energization of small bell open timing relay SBOT in Fig. 11A, which begins to time the closure of contacts SBOT2 and opens contacts SBOT1.

Relay CDAR being energized as hereinbefore described, operation of distributor angle program switch DAP is initiated. As a result, contacts CDAR1 in the upper left-hand portion of Fig. 6A complete an energizing circuit for relay DAP2R across lines L8 and L10 through contacts AUTO13, MCR2, DAP3R2, DAP1R4, DAP-9 and DAP1R5. Relay DAP2R being thus energized, closes contacts DAP2R1 to complete an energizing circuit for the DAP switch drive motor through contacts PRR8, the Normal contact of normal-test selector switch NT2 and DAP switch motor field winding F2. Contacts DAP2R2 complete a holding circuit for its operating coil, contacts DAP2R3 complete an energizing circuit for relay DAP3R across lines L8 and L10, contacts DAP2R4 open a point in the energizing circuit of relay DAP1R, and contacts DAP2R5 further interrupt the circuit of relay DAP1R. Relay DAP3R being thus energized, closes contacts DAP3R1 to complete a holding circuit for its operating coil through contacts CDAR1, AUTO13, and MCR2, and opens contacts DAP3R2 to interrupt the original energizing circuit of relay DAP2R, the latter however being maintained through holding contacts DAP2R2.

As a result of energization of its motor field winding F2, the DAP switch is driven to operating position 2. As a result, as shown in Figs. 6A and 7, contacts DAP-1 interrupt a point in the energizing circuit of distributor stop relay DMR, contacts DAP-2 close to prepare an energizing circuit for relay DMR to be completed by hopper limit switch counter HLSC upon rotation of the distributor 60 degrees, contacts DAP-7 in the mid-portion of Fig. 6A close a point in the energizing circuit of distributor start relay DSR, contacts DAP-8 in the upper portion of Fig. 6A close a point in the DAP switch drive motor circuit preparatory to operation of the DAP switch from operating position 2 to operating position 3, contacts DAP-9 open the original energizing circuit of relay DAP2R to restore the latter, contacts DAP-10 close a point in the DAP switch reset circuit in the upper portion of Fig. 6A, and contacts DAP-11 open a point in the program reset lamp circuit in the upper portion of Fig. 4A.

The DAP switch stops in operating position 2 upon the deenergization of relay DAP2R and opening of its holding circuit at contacts DAP2R2 because contacts DAP3R2 are also open. This is the distributor angle change which occurs automatically after each charging sequence.

Relay DLB in the right-hand portion of Fig. 9B having been energized through closure of contacts SBP-7 as hereinbefore described, closes contacts DLB1 in the mid-portion of Fig. 14A to complete an energizing circuit for field winding F5 of the large bell program switch LBP drive motor in a circuit extending through the then closed contacts LBP-2R, the LBP switch being in operating position 2 as hereinbefore described. As a result, the LBP switch is driven to operating position 3, opening contacts LBP-2R and closing contacts LBP-3R preparatory to further rotation of the program switch. Contacts LBP-5 in the left-hand portion of Fig. 11A open a check point in SBP switch drive motor circuit, contacts LBP-7 (Fig. 11A) open to indicate that the LBP switch is out of its normal position, and contacts LBP-8 at the lower portion of Fig. 14A complete an energizing circuit for large bell open timing relay LBOT. Relay LBOT closes contacts LBOT1 to prepare an energizing circuit for the LBP switch for operating position 6, and opens timed closing contacts LBOT2 in the LBP switch energizing circuit for operating position 10.

Operating position 3 of the LBP switch is a check point to insure that the furnace is not full before dumping the large bell. When the furnace is not full, furnace full relay FFR is energized through right and left stockline recorder limit switches RSRLS and LSRLS in parallel, contacts RM and LM being open when the right and left stockrod hoist controls are turned on, these contacts being operated by the right and left stockrod hoist main contactors, respectively. Right and left stockline recorder limit switches RSRLS and LSRLS open to deenergize relay FFR when the furnace is full. Thus, if the furnace is full, contacts FFR1 are open and the LBP switch cannot rotate beyond operation position 3 to open the large bell.

Assuming that the furnace is not full, contacts FFR1 are closed and the LBP switch rotates to operating position 4. As a result, contacts LBP-6A and LBP-6B in the lower portion of Fig. 14B open to deenergize lower left stockrod relay LLSRR and lower right stockrod relay LRSRR whereupon contacts LLSRR1 and LRSRR1 interrupt the original energizing circuit of the LBP switch. Relays LLSRR and LRSRR also control, upon being deenergized, the stockrod hoist motors to hoist the left and right stockrods to the top of the furnace in a manner not shown. When the stockrods are fully retracted, limit switches RSLS-3 and LSLS-3 in Fig. 14A and limit switches RSLS-4 and LSLS-4 in Fig. 14B close.

Unless stop filling switch SFS shown in the upper portion of Fig. 4A and which is located at the mud gun operator's station has been pressed, stop filling relay SFR is energized and its contacts SFR1 closed to complete an energizing circuit through contacts LBP–4R to effect rotation of the LBP switch to operating position 5. If switch SFS is pressed, relay SFR is deenergized to open contacts SFR1 to prevent advancement of the LBP switch from operating position 4 thereby to prevent further charging of the furnace. Contacts SFR2 close to energize stop filling indicator lamp IL3, and contacts SFR3 effect energization of stop filling alarm horn AH for a predetermined timed interval. Switch SFS also interrupts energization of stop filling alarm timing relay SFTR and after such time interval, contacts SFTR1 open to silence horn AH.

Assuming that switch SFS has not been pressed, the LBP switch rotates to operating position 5 wherein a check is made to insure that the small bell is closed before proceeding with opening of the large bell. The small bell being open at this time, with the SBP switch in operating position 8, small bell closed relay contacts SBCR3 are open and the LBP switch is held in operating position 5 until the small bell closes as hereinafter described.

Referring to Figs. 4A, 4B and 5, as the skip hoist motors accelerate, the aforementioned limit switch RLS–9 (not shown) opens to terminate field forcing of the skip hoist motors. Limit switch RLS–7 completes an energizing circuit for 475 feet per minute relay 475R from line L4 in the lower left-hand portion of Fig. 4B through contacts HL7, CTS7, AUTO3 and 150R1 to line L5. Relay 475R energizes to accelerate the skip hoist motors to a speed of 475 feet per minute in a manner shown in the aforementioned Douglas W. Fath and Charles E. Smith copending application Serial No. 722,016, filed March 17, 1958, and opens contacts 475R1 in the lower left-hand portion of Fig. 4B. Limit switch RLS–6 interrupts energization of relay 2SDLR to close contacts 2SDLR1 in the lower right-hand portion of Fig. 4B. Contacts 2SDLR2 interrupt the second slowdown top right and bottom left indicator lamps IL12 and IL13 to extinguish the same, and contacts 2SDLR3 close a point in the energizing circuits of left fast and right fast indicator lamps IL14 and IL15. Limit switch RLS–4 interrupts the shunt from governor overspeed contacts LOS. Limit switch RLS–5 completes and energizing circuit across lines L4 and L5 for right skip first slowdown light relay 1SDLR to open at contacts 1SDLR1 the energizing circuit of lamps IL10 and IL11, and to close at contacts 1SDLR2 the energizing circuit for left fast and right fast indicator lamps As the left skip car approaches the top of the furnace, limit switch LLS–5 interrupts the energizing circuits of relays 150R, 475R and 1SDLL. Relays 150R and 475R decelerate the skip hoist motors to approximately 75 feet per minute. Relay 1SDLL opens contacts 1SDLL1 to extinguish left fast and right fast lamps IL14 and IL15. Limit switch LLS–11 in the left-hand portion of Fig. 4B opens to check the positions of relays 150R and 475R. If either one of these relays has failed to have deenergized at this time leaving contacts 150R2 or 475R1 open, undervoltage relay UV is deenergized and the skip hoist is stopped by dynamic braking. Limit switch LLS–6 completes an energizing circuit for left skip slowdown light relay 2SDLL to energize second slowdown top left and bottom right lamps (not shown) similar to lamps IL12 and IL13, and opens contacts 2SDLL1 to further interrupt the circuit of lamps IL14 and IL15. Limit switch LLS–10 in the lower portion of Fig. 4A opens and will deenergize check small bell relay CSBR to stop the skip hoist at contacts CSBR1 if the small bell is not closed at this time. If contacts SHP–11 are closed at this time, indicating that the small bell is closed, relay CSBR will remain energized and the skip hoist will continue advancing. As contacts SHP–11 are open, indicating that the small bell is open, relay CSBR will deenergize and open contacts CSBR1 in Fig. 4B deenergizing relay HL. As a result, the skip hoist will stop and wait for the small bell to close.

As the SBP switch was driven to operating position 8, contacts SBP–7R open and contacts SBP–8R close to complete an energizing circuit through scrap charge relay contacts SC–23 to effect rotation of the SBP switch to operating position 9. Contacts SC–23 constitute a check point to determine if the load about to be dumped is scrap. Since the small bell must be maintained open while scrap is dumped from the skip car, relay SC–2 is energized for a scrap charge as hereinafter described in connection with Fig. 17, and opens contacts SC–23 to hold the small bell program switch in operating position 8 and hence the small bell open until the skip car has been in the dump position for a predetermined time interval. After the time interval, as determined by the setting of timer SCBT in Fig. 11A, contacts SC–23 close and the SBP switch is driven to operating position 9.

A scrap charge not having been scheduled at this time, the SBP switch rotates to operating position 9 and hence opens contacts SBP–8R and closes contacts SBP–9R to prepare for rotation of the program switch to operating position 10. When small bell open timing relay SBOT times out after a predetermined interval, contacts SBOT2 complete an energizing circuit through contacts SBR–9R to drive the SBP switch to operating position 10. As a result, contacts SBP–7 in the left-hand portion of Fig. 9B open to deenergize relays CDAR and DLB, and contacts SBP–3 open and contacts SBP–4 close thereby signalling the small bell to close as follows. Contacts CDAR1 open to restore distributor run relay DAP3R. Contacts SBP–3 interrupt energization of relay SBO and contacts SBP–4 complete an energizing circuit for small bell closing relay SBC through switch SBROL1 and contacts AUTO10 and SBO2. As a result, contacts SBC2 complete an energizing circuit for small bell valve operator contactor SB through limit switch SBCLS–1. Contactor SB closes contacts SB1 to energize the small bell valve operator motor, whereupon the latter actuates the air valve toward its closed position. Limit switch SBOLS–1 closes as shown in Fig. 13. When the air valve is fully closed, limit switch SBCLS–1 opens as shown in Fig. 13 to interrupt energization of contactor SB whereupon the latter opens contacts SB1 to stop the motor. Also the small bell cylinder is exhausted to the atmosphere and the small bell starts to close. Limit switch SBLS–2 interrupts energization of relay SBOR. When the small bell is fully closed, limit switch SBLS–1 effects energization of relay SBCR and limit switch SBLS–11 at the upper portion of Fig. 14B closes. Contacts SBCR1 complete an energizing circuit through contacts SBP–10R to effect rotation of the SBP switch to operating position 11. As a result, contacts SBP–5 complete an energizing circuit through contacts SHP–8R to effect rotation of the SHP switch to right skip operating position 1.

Referring now to Figs. 4A and 4B, in right skip operating position 1, the SHP switch closes contacts SHP–11 to complete energizing circuit of check small bell relay CSBR. Contacts CSBR1 again complete the energizing circuit of hoist left skip relay HL to effect hoisting of the left skip car toward its dump position at the top of the furnace.

This completes the skip hoist program cycle for the left skip car.

In operating position 11, the SBP switch also opens contacts SBP–8 and closes contacts SBP–9 in Figs. 11A and 11B, respectively. Contacts SBP–8 interrupt energization of relays RVO and EVC while contacts SBP–9 complete the aforementioned energizing circuit for relief valve closing relay RVC and prepare a circuit for equalizer valve opening relay EVO. Relay RVC energizes and closes contacts RCV1 to complete an energizing circuit through limit switch RVCLS–1 for relief valve operator contactor RV, and opens contacts RVC2 to prevent energization of relay RVO. Contactor RV energizes and closes contacts RV1 to energize the air valve operator motor whereupon the latter actuates the air valve toward its closed position. Limit switch RVOLS–1 closes. When the air valve is fully closed, limit switch RVCLS–1 interrupts energization of contactor RV whereupon the latter opens contacts RV1 to stop the motor. The relief valve cylinder is exhausted to the atmosphere and the relief valve starts to close. Limit switch RVLS–2 interrupts energization of relay RVOR. When the relief valve is fully closed, limit switch RVLS–1 effects energization of relay RVCR and limit switch RVLS–11 effects energization of relay EVO.

Relay EVO being thus energized, closes contacts EVO1 to complete an energizing circuit through limit switch EVOLS–1 for equalizer valve operator contactor EV. The latter energizes and closes contacts EV1 adjacent its operating coil to energize the air valve operator motor whereupon the latter actuates the air valve toward its open position. As a result, limit switch EVCLS–1 closes. When the air valve is fully open, limit switch EVOLS–1 opens to interrupt energization of contactor EV whereupon the latter opens contacts EV1 to stop the motor. Compressed air is admitted to the equalizer valve cylinder and the equalizer valve starts to open. As a result, limit switches EVLS–1 and EVLS–11 open. When the equalizer valve is fully open pressurizing the furnace top, limit switch EVLS–2 closes to effect energization of equalizer valve open relay EVOR. Closure of contacts EVOR1 and RVCR1 as well as contacts SBP–11R in operating position 11 of the SBP switch effects rotation thereof to operating position 12. In this position a check is made to insure that the large bell program switch LBP is in its normal position before permitting another small bell dumping cycle. As the LBP switch cycle has started, contacts LBP–7 are open and the SBP switch is held in operating position 12 to prevent initiation of another small bell dumping cycle until the LBP switch returns to its normal position.

Referring again to Figs. 4A and 4B, as the left skip car approaches its dump position at the top of the furnace, field forcing limit switch LLS–9 (not shown) closes providing field forcing of the skip hoist motors during deceleration.

As the left skip car reaches its dump position at the top of the furnace and dumps the coke onto the small bell, left skip limit switch LLS–8 closes and left skip limit switches LLS–1 and LLS–2 open as shown in the skip hoist limit switch cam layout development in Fig. 5. Limit switches LLS–1 and LLS–2 interrupt energization of hoist left relay HL to stop the skip hoist. Limit switch LLS–8 in the lower left-hand portion of Fig. 4A completes an energizing circuit for right skip-in-pit relay RSP across lines L4 and L5 and also completes an energizing circuit for tripping coil T of skip-in-pit latched relay SPLR through contacts SPLR1 preparatory to loading of and hoisting the right skip car as hereinafter described. Should the skip hoist fail to stop for any reason, left skip overtravel limit switch LLS–3 in the upper left-hand portion of Fig. 4B interrupts energization of undervoltage relay UV to disconnect power from the skip hoist directional control network as well as to deenergize the charging control automatic relay AUTO thereby to stop operation of the control system.

Coke having been scheduled for load No. 2, the skip hoist program reoperates in the manner hereinbefore described, except that the skip hoist limit switches operate in the direction shown by the upper arrow in Fig. 5. The right coke charging system (not shown) is similar to the left coke charging system shown in Fig. 8. The right coke charging system is controlled through contacts RSP3 of right skip-in-pit relay RSP, corresponding to contacts LSP7 in Fig. 8, contacts RSP3 being shown in the lower portion of Fig. 17.

When skip-in-pit relay SPR again energizes following energization of relay RSP, contacts SPR5 complete the energizing circuit of dump timer DT in Fig. 6A. Dump timer DT delays closure of contacts DT1 for a predetermined time interval to permit dumping of all the coke from the left skip car onto the small bell before distributor rotation is initiated.

When the dump timer DT times out and closes contacts DT1 in Fig. 6A, the closing coil of relay DRA is energized in a circuit extending through contacts AUTO7, DRR2 and DCRR3. As a result, contacts DRA1 effect energization of distributor start relay DSR through contacts DAP–7, and contacts DRA2 prepare an energizing circuit for distributor counter reset relay DCRR. Distributor start relay DSR being energized closes contacts DSR1 to complete the energizing circuit of relay DR from line L8 through the Remote contact of selector switch DROL and contacts AUTO8 and DMR4 to line L17. Contacts DSR2 open to prevent concurrent operation of relay DMR. Relay DR being energized closes contacts DR1 to complete a check point in the skip hoist program switch drive circuit for operating position 2 to permit the same to advance, and closes contacts DR2 to complete the energizing circuit for the distributor forward directional contactor F across lines L11 and L12. As a result, contactor F energizes and closes appropriate contacts (not shown) to start the distributor motor and drive the distributor in the forward direction. When the distributor starts, contacts MCR1 close to prepare the hopper limit switch counter circuit, contacts MCR2 open to prevent operation of the DAP switch while the distributor is rotating, and contacts MCR3 in the upper left-hand portion of Fig. 11A open to prevent opening of the small bell when the distributor is running. Contacts MCR1, MCR2 and MCR3 may be operated in any desired manner, as for example, by the distributor motor main contactor, if desired.

The hopper limit switch in the left-hand portion of Fig. 6A rotates one revolution or 360 degrees for each 60 degrees rotation of the distributor. The hopper limit switch transmits two pulses to the counter per revolution, one pulse through limit switch HLS–1 at the 180 degree position and the second pulse through limit switch HLS–2 at the 360 degree position of the hopper limit switch. The counter counts the pulses transmitted by the hopper limit switch and closes its 60 degree contacts after two pulses have been received. Similarly, the counter closes its 120 degree contacts after 4 pulses have been received and closes its 180 degree contacts after 6 pulses have been received. When the hopper limit switch starts to rotate, limit switch HLS–3 opens to extinguish accurate stop lamp IL17 and limit switch HLS–2 opens without effect at this time.

When the hopper limit switch reaches its 180 degree position corresponding to 30 degrees rotation of the distributor, limit switch HLS–1 closes to transmit the first pulse to the counter. When the hopper limit switch reaches its 360 degree position corresponding to 60 degrees rotation of distributor, hopper limit switch HLS–2 closes to send a second pulse to the counter. As a result, the counter closes its 60 degree contacts to complete an energizing circuit for distributor stop relay DMR through contacts DAP–2. Limit switch HLS–3 also closes in this position and completes the energizing circuit of the accurate stop lamp IL17 to provide an indication of the accuracy of the stopping position. Relay DMR being energized closes contacts DMR3 to complete a holding circuit for its operating coil in shunt of the counter and opens contacts DMR4 to interrupt energization of the distributor run relay DR and forward contactor F whereby to stop the distributor. As a result, contacts MCR1 open and contacts MCR2 close to prepare for further operation of the DAP switch when relay CDAR is again energized.

Small bell closed relay SBCR having been energized as hereinbefore described also closes contacts SBCR3 to complete an energizing circuit through contacts LBP-5R to effect driving of the LBP switch to operating position 6, opening contacts LBP-5R and closing contacts LBP-6R. In operating position 6 a check is made to insure that timer relay LBOT is energized in preparation for timing the open time of the large bell. Relay LBOT having been energized, contacts LBOT1 are closed and the LBP switch is driven to operating position 7, opening contacts LBP-6R and closing contacts LBP-7R.

In operating position 7 a check is made to insure that the stockrods are in their retracted positions. Assuming that the stockrods have been fully retracted as hereinbefore described, limit switches RSLS-3 and LSLS-3 are closed and the LBP switch runs through operating position 7 to operating position 8, opening contacts LBP-7R and closing contacts LBP-8R. In operating position 8, a final check is made to insure that the furnace top is pressurized before opening the large bell. Contacts RVCR2 and EVOR2 being closed, indicating that the relief valve is closed and the equalizer valve is open, the LBP switch is driven to operating position 9, opening contacts LBP-8R and closing contacts LBP-9R.

In operating position 9, contacts LBP-4 open and contacts LBP-3 close to signal the large bell to open. Contacts LBP-4 interrupt energization of relay LBC and contacts LBP-3 complete an energizing circuit for large bell opening relay LBO in a circuit extending through contacts LBROL1 of the large bell selector switch in its Remote position, contacts AUTO16 and LBP-3, limit switches SBLS-11, RSLS-4 and LSLS-4, and contacts RVCR3, EVOR3 and LBC2. Relay LBO energizes and closes contacts LBO1 in the lower portion of Fig. 14A to complete an energizing circuit for large bell valve operator contactor LB through contacts BSC2 and limit switch LBOLS-1, closes contacts LBO2 in Fig. 11B to reset the loads on large bell counter, and opens contacts LBO3 to prevent energization of large bell closing relay LBC. Contactor LB energizes and closes contacts LB1 adjacent its operating coil to energize the large bell valve operator motor whereupon the latter actuates the air valve toward its open position. As a result, limit switch LBCLS-1 closes as shown in the large bell valve operator rotating cam limit switch layout development in Fig. 16. The large bell operator is similar to the equalizer valve operator hereinbefore described. When the air valve is fully open, limit switch LBOLS-1 opens (Fig. 16) to interrupt energization of contactor LB, whereupon the latter opens contacts LB1 to stop the motor.

Compressed air is admitted to the large bell cylinder and the large bell opens to drop the charge into the furnace. Limit switch LBLS-1 opens to restore relay LBCR, and limit switch LBLS-11 in the lower portion of Fig. 11A opens to prevent opening of the small bell when the large bell is open. Relay LBCR opens contacts LBCR1 in Fig. 11A to prevent rotation of the SBP switch beyond operating position 2 until the large bell is closed, opens contacts LBCR2 in the upper portion of Fig. 11B to prevent closing of the equalizer valve, and opens contacts LBCR3 in Fig. 14A to prevent rotation of the LBP switch beyond operating position 11 until the large bell closes.

When the large bell is fully open, limit switch LBLS-2 effects energization of large bell open relay LBOR in Fig. 14B. Relay LBOR closes contacts LBOR1 adjacent its operating coil to complete an energizing circuit to a coke bin count relay, described in Douglas W. Fath and Charles E. Smith copending application Serial No. 721,717, filed March 17, 1958, to change the combination of bins from which coke is drawn into the weigh hoppers for discharge into the skip cars. Relay LBOR also closes contacts LBOR2 to effect rotation of the LBP switch to operating position 10.

In operating position 10, contacts LBP-8 open to deenergize timing relay LBOT thereby to start the timing cycle which times the open interval of the large bell. Contacts LBP-9R open and contacts LBP-10R close. When the timer times out, contacts LBOT2 close to effect rotation of the LBP switch to operating position 11. As a result, contacts LBP-3 open and contacts LBP-4 close thereby signalling the large bell to close as follows. Contacts LBP-3 interrupt energization of relay LBO and contacts LBP-4 complete the energizing circuit for large bell closing relay LBC hereinbefore described. Contacts LBC1 complete an energizing circuit for large bell valve operator contactor LB through limit switch LBCLS-1. Contactor LB closes contacts LB1 to energize the large bell valve operator motor, whereupon the latter actuates the air valve toward its closed position. Limit switch LBOLS-1 closes (Fig. 16). When the air valve is fully closed, limit switch LBCLS-1 opens (Fig. 16) to interrupt energization of contactor LB, whereupon the latter opens contacts LB1 to stop the motor. Also, the large bell cylinder is exhausted to the atmosphere and the large bell starts to close. Limit switch LBLS-2 interrupts energization of relay LBOR.

When the large bell is fully closed, limit switch LBLS-1 effects energization of relay LBCR and limit switch LBLS-11 in the lower portion of Fig. 11A closes. Contacts LBCR3 close to effect rotation of the LBP switch to operating position 1. As a result, contacts LBP-6A and LBP-6B effect energization of relays LLSRR and LRSRR to lower the left and right stockrods, and contacts LBP-7 close to effect rotation of the SBP switch to operating position 1. This completes the small bell program cycle. Relays LLSRR and LRSRR close contacts LLSRR1 and LRSRR1 to effect rotation of the LBP switch to operating position 2, this being the normal waiting position of the LBP switch between large bell dumps. This completes the large bell program cycle.

As hereinbefore described, the left skip car has been filled with coke and hoisted to the top of the furnace and the coke dumped onto the small bell in the distributor hopper. Following this, the distributor rotation angle has been changed from zero degrees to 60 degrees and the distributor rotated the latter amount, this being the change in distributor rotation angle which occurs following the end of each plural load charging cycle. In addition, the large bell has been dumped to discharge into the furnace material previously accumulated thereon, if any.

The SBP switch is in operating position 1, the LBP switch is in operating position 2, the SHP switch is in right skip operating position 1, the DAP switch is in operating position 2, and the LSP switch is in operating position 2.

As coke has been scheduled for loads Nos. 2, 3 and 4, the charging control system operates in the hereinbefore described manner to deposit three more loads of coke onto the large bell, except that for loads 2 and 4 the right skip car functions to hoist the load and the skip hoist limit switch shown in Fig .5 operates in the right-hand direction. Each time that a skip load is being hoisted, the small bell is opened and closed to discharge onto the large bell the previous skip load that has theretofore been deposited on the small bell and rotated to an angle of 60 degrees.

Each time a skip car enters the charging pit, effecting energization of right skip-in-pit relay RSP or left skip-in-pit relay LSP as the case may be, the load summary program switch is advanced one step so that at the end of the fourth coke load the load summary program switch is in operating position 5. The SHP switch operates through a complete revolution for each two skip loads so that at the end of the fourth coke load the SHP switch is in its initial left skip operating position 1. The SBP switch operates through a complete cycle for each small bell dump and remains in operating position 1 to await the signal from the SHP switch to open the small bell. The LBP switch remains in operating position 2, its normal position, to await the signal from the load summary program, dump large bell relay DLB to dump the large bell on load No. 7. The DAP switch remains in operating position 2 and thus effects 60 degrees rotation of the distributor responsive to each operation of the dump timer, and remains in operating position 2 to await the signal from the load summary program, change distributor angle relay CDAR to change the distributor rotation angle to 120 degrees on load No. 7.

Ore having been scheduled for load No. 5, when the left skip car enters the charging pit, the SHP switch advances from left skip operating position 1 to operating position 5 in the manner hereinbefore described. The SHP switch remains in operating position 5 until the scale car operator presses the start skip pushbutton switch PB at the lower portion of Fig. 2 to start the skip hoist.

The LSP switch having been driven to operating position 5, contacts LSP-5 are closed to energize relay 5L. Relay 5L closes contacts 5L4 in the lower portion of Fig. 9B to complete an energizing circuit for ore and stone relay STR in a circuit extending from line L15 through contacts 5L4, contacts set c of the material charge selector switch for load No. 5 in its Ore operating position, and the operating coil of relay STR to line L17. Relay STR energizes and closes contacts STR1 in the lower left-hand portion of Fig. 2 to complete an energizing circuit through contacts SHP-4 for scale car interlocking relay SCIR. Relay SCIR closes contacts SCIR1 adjacent its operating coil to complete an energizing circuit through contacts LSP of left skip-in-pit relay LSP for the scale car left compartment solenoid thereby to dump a load of ore into the left skip car.

The scale car operator then presses start skip switch PB to complete an energizing circuit for start skip relay SS through contacts STR1 and SPR9. Relay SS closes contacts SS1 to complete an energizing circuit for the SHP switch drive motor through contacts SHP5R to drive the SHP switch to operating position 6, closes contacts SS2 to complete a holding circuit for its operating coil in shunt of start skip switch PB, and opens contacts SS3 in the upper portion of Fig. 17 to lock out scrap charge relays SC-1 and SC-2.

Thereafter, the SHP switch advances as hereinbefore described to control the skip hoist whereby the left skip car is hoisted to the top of the furnace and the load of ore dumped onto the small bell.

Ore having been scheduled for load No. 6, the charging control system operates in a similar manner to discharge a load of ore into the right skip car and to hoist the same to the top of the furnace following pressing of start skip switch PB by the scale car operator. The load summary lights at the lower portion of Fig. 9B indicate to the scale car operator the material to be charged on each skip load so that he may make preparations for dumping ore and stone loads into the skip cars, a set of these indicator lights being located not only on the hoisthouse indicator panel but also on the scale car indicator panel.

At the end of the sixth skip load, the LSP switch is in operating position 7, the SHP switch is in left skip operating position 1, the SBP switch is in operating position 1, the LBP switch is in operating position 2, and the DAP switch is in operating position 2. Operating position 2 is the normal waiting position of the LBP switch. This is for the reason that when the LBP switch has completed its cycle of operation and returned to operating position 1 and the large bell has closed, lower left and lower right stockrod relays LLSRR and LRSRR at the lower portion of Fig. 14B are energized through the then closed LBP switch contacts LBP-6A and LBP-6B, respectively, to effect lowering of the left and right stockrods and to drive the LBP switch to its normal operating position 2.

Referring to the hereinbefore described preselected charging sequence, for load No. 7 there is scheduled a stone charge, a water charge, a large bell dump and a distributor angle change.

As the left skip car enters the charging pit, the dump timer in Fig. 6A energizes and, upon timing out, initiates distributor angle rotation to 60 degrees as hereinbefore described. Also the SHP switch is driven from left skip operating position 1 to operating position 4. The SHP switch remains in operating position 4 until the water charging control system has discharged a predetermined amount of water into the left skip car.

The LSP switch having been driven to operating position 7, contacts LSP-7 are closed to energize relay 7L. Relay 7L closes contacts 7L1 in Fig. 9B to complete an energizing circuit for automatic water relay AWR in a circuit extending through the water charge selector switch for load No. 7 in its Charge position. Relay 7L also closes contacts 7L2 without effect as the latter contacts are in series connection with the distributor angle change selector switch for load No. 5, and closes contacts 7L3 without effect as the latter contacts are in series connection with the large bell dump selector switch for load No. 5. It will be apparent that although a distributor angle change has been scheduled for load No. 7, this function will not be initiated until after load No. 7 has been rotated by the distributor. Thus, the selector switch for load No. 7 having been set in its Change position, the rotation angle will be changed to 120 degrees after load No. 8 has been dispatched from the stockhouse, load No. 7 having been rotated to the 60 degree position at that time. Also, a large bell dump having been scheduled for load No. 7, this function will be initiated after load No. 7 has been deposited on the large bell. Thus, the selector switch for load No. 7 having been set in its Dump position, the large bell will be dumped after load No. 8 has been dispatched from the stockhouse. This coordination of functions is attained by the hereinbefore described connection of the contacts of load summary relays 3L, 4L, 5L, etc., respectively, in series with the selector switches for loads Nos. 1, 2, 3, etc., as shown in Fig. 9B, so that the selector switch for load No. 7 does not become effective until load summary relay 9L energizes as hereinafter described.

In addition, relay 7L closes contacts 7L4 to complete an energizing circuit for ore and stone relay STR in a circuit extending through contact set c of the charging sequence selector switch for load No. 7 in its Stone position.

A common relay STR being utilized for both ore and stone charges, the charging control system operates in the same manner hereinbefore described in connection with ore charges for discharging stone from the scale car into the left skip car. The difference is that, having observed a load summary light indication of stone for load No. 7, the scale car operator has made preparations for discharge of stone from the left compartment of the scale car. Thus, when scale car interlocking relay SCIR operates, the scale car left compartment solenoid is energized to discharge a load of stone into the left skip car.

Automatic water relay AWR being energized, contacts AWR1 in Fig. 17 complete an energizing circuit for water valve contactor WV in a circuit extending from power supply line L24 through contacts SPR3, AUTO15, EL3, AWR1, SHP-7 and WDR1 to line L25. Relay AWR also closes contacts AWR2 adjacent its operating coil to energize water charge indicator lamp IL24, and opens contacts AWR3 in the mid-portion of Fig. 2 to prevent rotation of the SHP switch from operating position 4 until the water has been dumped as hereinafter described. Contactor WV closes contacts WV1 to complete an energizing circuit through contacts LSP4 for the left skip water valve solenoid (not shown) in water volume counter WVC. The solenoid effects opening of the water valve by pneumatic means or the like and permits flow of water into the left skip car until the solenoid is deenergized to close the water valve. Water is obtained directly from a water main and is discharged into the skip car without being stored in tanks.

Water volume counter WVC may be of any well-known construction having a water volume selector for preselecting in uniform increments the volume of water to be discharged into the skip car and a water meter for measuring the volume of water passing through the meter and, therefore, has not been shown in detail to avoid complicating the drawings. When the preselected volume of water has been discharged into the left skip car, water volume counter WVC energizes water dumped relay WDR. Relay WDR opens contacts WDR1 adjacent its operating coil to interrupt energization of contactor WV, the latter deenergizing the solenoid whereupon the left skip water valve is closed. Thus, the water flow is cut off after the desired amount is dumped into the left skip car. Relay WDR also closes contacts WDR2 in the mid-portion of Fig. 2 to effect rotation of the SHP switch from operating position 4 to operating position 5.

Both stone and water having been dumped into the left skip car, the scale car operator presses start skip switch PB to start the skip hoist as hereinbefore described in connection with ore loads. The LSP switch is driven to operating position 8.

The SHP switch then automatically controls the SBP switch and small bell to dump the prior load of ore onto the large bell, the distributor having been rotated to 60 degrees.

When the SHP switch reaches operating position 8, contacts SHP–8A complete an energizing circuit for water charging reset relay WCRR. Relay WCRR energizes and closes contacts WCRR1 to reset water volume counter WVC to its normal position in a well-known manner.

Coke having been scheduled for loads Nos. 8, 9 and 10, the charging control system automatically operates to hoist coke loads as hereinbefore described. When the right skip car leaves the charging pit with load No. 8, hoist right skip relay contacts HR2 in the upper left-hand portion of Fig. 9A close to effect rotation of the LSP switch to operating position 9. As a result, contacts LSP–9 close to effect energization of load summary relay 9L. In Fig. 9B, contacts 9L2 close to prepare an energizing circuit for relay CDAR through the distributor angle change selector switch for load No. 7, and contacts 9L3 close to prepare an energizing circuit for relay DLB through the large bell dump selector switch for load No. 7.

Following rotation of load No. 7 to an angle of 60 degrees, the small bell automatically opens to deposit load No. 7 on the large bell. When the SBP switch reaches operating position 8 and closes contacts SBP–7 in the left-hand portion of Fig. 9B, relays CDAR and DLB are energized across lines L15 and L17. Relay CDAR closes contacts CDAR1 in the upper left-hand portion of Fig. 6A to drive the DAP switch to operating position 3, calling for a distributor rotation angle of 120 degrees each time a skip car enters the charging pit thereafter. Thus, in operating position 3, contacts DAP–3 (Fig. 6A) are closed so that hopper limit switch HLS must be driven two complete revolutions by the distributor, transmitting four pulses to its counter HLSC, before relay DMR is energized to stop the distributor rotation.

Relay DLB being thus energized closes contacts DLB1 in the mid-portion of Fig. 14A to initiate rotation of the LBP switch from its normal waiting position 2, thus to effect dumping of the large bell as hereinbefore described.

Ore having been scheduled for loads Nos. 11 and 12, the charging control system operates responsive to closure of start switch PB in Fig. 2 to hoist ore loads as hereinbefore described. The DAP switch being in operating position 3, each time a skip car enters the charging pit and following timing out of dump timer DT (Fig. 6A), the distributor is activated to rotate the load previously deposited on the small bell 120 degrees. Also, when each of these skip loads is being hoisted, the small bell is dumped to deposit the rotated load in its 120 degree position on the large bell.

For load No. 13, there is scheduled a stone charge, a water charge, a distributor angle change, and a large bell dump. Thus, the charging control system operates in the manner hereinbefore described in connection with load No. 7 to charge stone and water into the left skip car, to drive the DAP switch to operating position 4, calling for a rotation angle of 180 degrees from then on, and to dump the large bell.

It will be apparent that the distributor angle program control network shown in Figs. 6A, 6B and 7 is constructed to rotate the distributor in the forward direction for rotation angles of 60, 120 and 180 degrees and in the reverse direction for rotation angles of 240 and 300 degrees. Thus, if the change distributor angle relay contacts CDAR1 in the upper left-hand portion of Fig. 6A are closed to drive the DAP switch to operating position 5, contacts DAP–5 open and contacts DAP–6 close. Contacts DAP–5 interrupt the energizing circuit of run distributor forward relay RDF and contacts DAP–6 complete an energizing circuit for run distributor reverse relay RDR. Also contacts DAP–3 in Fig. 6A close to prepare an energizing circuit for distributor stop relay DMR to be completed by the 120 degree contacts of counter HLSC when four pulses have been received from the hopper limit switch, corresponding to 120 degrees rotation of the distributor in the reverse direction, resulting in a rotation angle of 240 degrees. Should the DAP switch be driven to operating position 6, contacts DAP–3 open and contacts DAP–2 close to prepare an energizing circuit for relay DMR to be completed by the 60 degree contacts of the counter when two pulses have been received, corresponding to 60 degrees rotation in the reverse direction, resulting in a rotation angle of 300 degrees.

When the left skip car is dispatched with load No. 13 comprising stone and water, the LSP switch drive motor circuit is energized as hereinbefore described to drive the switch to operating position 14. The charging sequence selector switch for load No. 14 (Fig. 9B) as well as the switches for loads Nos. 15 through 18 having been set in their Off positions a circuit is prepared through contacts 14L4 of load summary relay 14L and contact set c of the charging sequence selector switch for load No. 14 in its Off position for the operating coil of load summary program reset relay LSPR. When the SBP switch reaches operating position 8, contacts SBP–7 close to complete the aforementioned circuit across lines L15 and L17. Relay LSPR energizes in this circuit and closes contacts LSPR1 in the upper portion of Fig. 9A to complete an energizing circuit through the then closed contacts LSP–22 for load summary program reset relay LSPRR. Relay LSPRR closes contacts LSPRR1 in the upper left-hand portion of Fig. 9A to effect energization of field winding F3 of the LSP switch drive motor. The circuit of winding F3 may be traced through the Normal contact of selector switch NT3a, contacts LSP–21 and the Normal contact of selector switch NT3. Relay LSPRR also closes contacts LSPRR2 to complete a holding circuit for its operating coil, opens contacts LSPRR3 to interrupt the automatic driving circuit of the LSP switch, and opens contacts LSPRR4 at the left-hand portion of Fig. 9A to interrupt energization of relays 14L, SSR and LSPR and the load summary lights. The LSP switch drive circuit being thus energized, drives the LSP switch to operating position 1 wherein contacts LSP–21 interrupt its driving circuit and contacts LSP–22 open to restore relay LSPRR.

At the end of the thirteenth load, the SHP switch is in right skip operating position 1, the SBP switch is in operating position 1, the LBP switch is in operating position 2 (its normal position), and the DAP switch is in operating position 4. The right skip car is in the pit and the left skip car is in its dump position.

The LSP switch having been reset to operating position 1, the charging control system automatically recycles another thirteen load charging sequence starting with coke for load No. 1.

*Extra load*

The insertion of extra loads during a charging sequence will now be described. Extra ore, stone, coke, water or scrap may be inserted into the preselected charging sequence at any time by pressing the corresponding pushbutton switch provided on the scale car operator's desk and shown in Fig. 17. When an extra load is desired, the appropriate pushbutton switch should be pressed before the empty skip car reaches the pit to prevent automatic dumping of coke or water which may be scheduled. In the event the operator initiates an extra load by mistake or for other reasons desires to cancel the same, a cancel extra load pushbutton switch is pressed to cancel the extra load as hereinafter described.

*Extra scrap*

Let it be assumed that a scrap charge is desired at a given point in the charging sequence. Referring to Fig. 17, extra scrap pushbutton switch ESPB is pressed as an empty skip car approaches the charging pit. Closure of switch ESPB completes an energizing circuit for scrap charge relay SC–1 in a circuit extending from power supply line L24 through normally closed cancel extra load switch CEL, contacts PRR17, extra scrap switch ESPB, contacts SS3, ACR6, SCBT1, EC4 and ES4, and the operating coil of relay SC–1 to line L25. Relay SC–1 energizes and closes contacts SC–11 to complete a holding circuit for its operating coil in shunt of switch ESPB and contacts SS3 and ACR6 whereafter switch ESPB may be released, closes contacts SC–12 to complete an energizing circuit for extra load relay EL through contacts AUTO14, SHP–8C and PRR17 and switch CEL, closes contacts SC–13 to energize extra scrap indicator lamp IL27, and closes contacts SC–14 in the lower portion of Fig. 11A to complete an energizing circuit for scrap charge small bell open timing relay SCBT. Relay SC–1 also opens contacts SC–15 and SC–16 to prevent energization of extra coke and extra stone relays EC and ES, respectively, opens contacts SC–17 to interrupt energization of cancel extra load indicator lamp IL31, and opens contacts SC–18 at the lower portion of Fig. 9B to prevent energization of automatic coke relay ACR.

Extra load relay EL energizes and closes contacts EL1 in the mid-portion of Fig. 2 to permit rotation of the SHP switch through operating position 4, closes contacts EL2 to permit energization of scale car interlocking relay SCIR and to prepare an energizing circuit for start skip relay SS at the lower portion of Fig. 2, opens contacts EL3 at the left-hand portion of Fig. 17 to prevent automatic water charging that may have been scheduled, and opens contacts EL4 to further interrupt the circuit of indicator lamp IL31. Relay EL also opens contacts EL5 at the upper portion of Fig. 9A to prevent operation of the LSP switch, opens contacts EL6 at the lower portion of Fig. 9B to maintain lockout of automatic coke relay ACR, opens contacts EL7 at the lower portion of Fig. 17 to prevent operation of the right coke charging control circuit, and opens contacts EL8 in Fig. 8 to prevent operation of the left coke charging control circuit. As a result of the LSP switch drive motor circuit being rendered ineffective, the extra scrap load will not be counted as a load in the charging sequence.

Just before the empty skip car enters the pit, contacts SHP–8B of the SHP switch close to energize scrap charge relay SC–2 in the upper portion of Fig. 17. Relay SC–2 closes contacts SC–21 in the mid-portion of Fig. 4B to shunt check small bell relay contacts CSBR1, and hence to maintain operation of the skip hoists to dump the scrap load into the distributor hopper when the small bell is open. Relay SC–2 also closes contacts SC–22 to complete a holding circuit for its operating coil, and opens contacts SC–23 in the left-hand portion of Fig. 11A to maintain the small bell open while the scrap is being dumped onto the large bell from the skip car.

When the skip car enters the pit, the SHP switch operates as hereinbefore described and effects energization of relay SCIR at contacts SHP–4 to dump scrap into the skip car. After the scrap is dumped into the skip car, the scale car operator presses start skip switch PB to actuate the skip hoist to send the load of scrap to the furnace top. As the skip hoist runs and the SHP switch reaches operating position 7, contacts SHP–8C open to restore extra load relay EL. Restoration of relay EL permits the next step of the preselected charging sequence to be performed on the empty other skip car entering the pit. The small bell opens as hereinbefore described and the loaded skip car stops in the dump position. Timing relay SCBT having been energized, times the scrap dumping time. When relay SCBT times out, contacts SCBT1 at the upper portion of Fig. 17 open to restore scrap charge relays SC–1 and SC–2. Contacts SC–23 close to permit rotation of the SBP switch from operating position 8, and hence to close the small bell. The charging of scrap is thus completed and the charging control system resumes automatic operation to charge the next scheduled charging sequence load.

*Extra ore or stone*

Let it be assumed that an extra ore or stone load is desired at a given point in the charging sequence. Referring to Fig. 17, extra stone-ore pushbutton switch EOPB is pressed before an empty skip car enters the pit. Closure of switch EOPB completes an energizing circuit for extra ore or stone relay ES through contacts SC–16 and EC9. Relay ES closes contacts ES1 to energize extra load relay EL, closes contacts ES2 to complete a holding circuit for its operating coil in shunt of switch EOPB whereafter the latter may be released, closes contacts ES3 to light extra stone-ore indicator lamp IL30, opens contacts ES4 to prevent operation of scrap charge relays SC–1 and SC–2, and opens contacts ES5 to prevent energization of extra coke relay EC. Relay EL energizes and performs the functions hereinbefore described in connection with an extra scrap charge. Also, the charging control system functions in the manner hereinbefore described to hoist the skip car, except that scrap charge small bell open timing relay SCBT is not effective. Thus, the small bell closes and the extra load of stone or ore is dumped thereon. After hoisting of the loaded skip car is initiated by pressing start skip switch PB, contacts SHP–8C open to restore relays ES and EL, thus to reset the charging program control system for normal automatic operation.

*Extra coke*

Let it be assumed that an extra coke load is desired at a given point in the charging sequence. In that event, extra coke pushbutton switch ECPB in the mid-portion of Fig. 17 is pressed. An extra load of coke may be charged even though the next scheduled automatic load is a coke load if switch ECPB is pressed before the empty skip car reaches the pit. Once the skip car stops in the pit, an extra coke load cannot be initiated or a preset extra coke load canceled.

Closure of switch ECPB effects energization of extra coke relay EC in a circuit extending through contacts SC–15 and ES5. Relay EC closes contacts EC1 to light extra coke indicator lamp IL29, closes contacts EC2 in the lower portion of Fig. 17 and contacts EC3 in Fig. 8 to permit operation of the right or left coke charging system as the case may be, and opens contacts EC4 to prevent operation of the aforementioned scrap charge relays. Relay EC also closes contacts EC5 to shunt cancel extra load switch CEL and hence prevent cancellation of the extra load, closes contacts EC6 to effect energization of extra load relay EL, closes contacts EC7 to complete a holding circuit for its operating coil in shunt of switch ECPB, opens contacts EC8 in Fig. 2 to prevent rotation of the SHP switch beyond operating position 3 until coke is dumped into the skip car, and opens contacts EC9 to prevent operation of extra ore and stone relay ES.

The coke charging system such as that shown in Fig. 8 responds to relay EC to dump a load of coke in the skip car as hereinbefore described. Relay EL energizes and performs the functions hereinbefore described. Also the charging control system functions to hoist the loaded skip car when start skip switch PB is pressed. On extra coke loads, the start skip switch must be pressed to start the skip hoist. The automatic starting circuit is not operative because contacts ACR1 in the left-hand portion of Fig. 2 are open at this time. After hoisting of the skip car is initiated, contacts SHP-8C open to restore relays EC and EL, thus to reset the system for normal automatic operation.

*Extra water*

Let it be assumed that an extra charge of water is desired at a given point in the charging sequence. Referring to Fig. 17, extra water pushbutton EWPB is pressed to effect energization of extra water relay EW before the empty skip car reaches the pit. Extra water may be charged with any of the other materials that are normally charged and, hence, the addition of an extra water charge does not interrupt the preselected charging sequence as is the case when extra scrap, extra coke or extra ore or stone is charged.

Relay EW energizes and closes contacts EW1 to complete a holding circuit for its operating coil in shunt of switch EWPB, and closes contacts EW2 to effect energization of water valve contactor WV in a circuit extending through contacts SPR3, AUTO15, EW2, SHP-7 and WDR1. Relay EW also opens contacts EW3 to extinguish cancel extra load lamp IL31, opens contacts EW4 in Fig. 2 to prevent rotation of the SHP switch beyond operating position 4 until the water has been dumped into the skip car, and closes contacts EW5 to energize extra water indicator lamp IL28.

Contactor WV energizes and activates water volume counter WVC to discharge a predetermined volume of water into the skip car as hereinafter described in connection with load No. 7, whereafter water dumped relay is energized to open contacts WDR1 and to close contacts WDR2. Contacts WDR1 restore contactor WC to interrupt water flow into the skip car, and contacts WDR2 in Fig. 2 initiate operation of the SHP switch from operating position 4. After the scale car operator presses switch PB to start the skip hoist, contacts SHP-8C open to restore relay EW, thus to reset the extra water system to normal position.

*Cancel extra load*

In the event the operator sets up an extra load by mistake or changes his mind, cancel extra load switch CEL is pressed to cancel the extra load. Opening of switch CEL interrupts energization of scrap charge relay SC-1, extra water relay EW, extra coke relay EC provided contacts SPR2 are not yet closed, or extra ore-stone relay ES, as the case may be, as well as extra load relay EL if energized, to prevent charging an extra load when the skip car enters the pit.

*Manual operation*

Manual operation of the various portions of the charging control system will now be described. The skip hoist, the distributor controller, the coke systems, the small bell, the large bell, and the stockrod hoists are arranged for manual operation as hereinafter described.

The system is arranged to afford transfer from automatic to manual operation without restoring undervoltage relay UV. This is required because the undervoltage relay, if restored, must be reenergized by pressing reset switch UVR located in the hoisthouse. To transfer to manual operation, charging control transfer switch CTS is left in its Stockhouse operating position, this being its setting for automatic operation. Skip hoist selector switch RS is turned to its Off position thereby to complete at contacts RS4 the original energizing circuit of relay UV to prevent deenergization of the latter when relay AUTO is restored. Switch MOA is turned to its Manual operating position to restore relay AUTO and energize relay MAN. Referring to the lower portion of Fig. 4B, it will be seen that manual relay contacts MAN5 complete a shunt across contacts AUTO5 to reestablish the holding circuit for relay UV hereinafter described. Skip hoist selector switch RS may then be returned to its On position and opening of contacts RS4 will not deenergize relay UV. Thus, the distributor controller, the small bell, the large bell, and the stockrod hoists are transferred to manual operation and the skip hoist is transferred to manual operation from the stockhouse without requiring resetting of the undervoltage relay. When the skip hoist is transferred to manual operation from the hoisthouse as hereinafter described, relay UV is allowed to deenergize inasmuch as the latter can be readily reset from switch UVR located in the hoisthouse. The coke systems are transferred to manual operation as hereinafter described.

Let it be assumed that selector switch MOA in Fig. 4A is set in its Manual operating position to complete an energizing circuit for relay MAN through contacts AUTO4. Contacts MAN1 and MAN2 in Fig. 4B close to prepare energizing circuits for hoist right and hoist left relays HR and HL, respectively. Contacts MAN3 prepare an energizing circuit for relay 475R, interlocking contacts MAN4 open to prevent operation of relay AUTO, contacts MAN5 complete a shunt across contacts RS4 and contacts SHM5 of the stockhouse master switch to complete a holding circuit for relay UV when charging control transfer switch CTS is in its Stockhouse operating position, and contacts MAN6 prepare a holding circuit for relay UV when switch CTS is in its Hoisthouse operating position. Also, contacts MAN7 in the upper left-hand portion of Fig. 14B close to prepare an energizing circuit for relay LBO, contacts MAN8 in the lower left-hand portion of Fig. 6B close to prepare energizing circuits for relays MRF and MRR, contacts MAN9 and MAN10 in the lower portion of Fig. 14B close to complete energizing circuits for relays LLSRR and LRSRR, contacts MAN11 in the lower mid-portion of Fig. 11A close to prepare an energizing circuit for relay SBO, contacts MAN12 in the lower left-hand portion of Fig 11A close to prepare an energizing circuit for relay SBC, contacts MAN13 in Fig 11B close to prepare energizing circuits for relays RVC and EVO, and contacts MAN14 in Fig. 6A close to prepare an energizing circuit for the DAP switch drive motor.

Referring to Fig. 4B, the skip hoist may be operated manually from either the stockhouse or the hoisthouse depending upon the position of charging control transfer switch CTS. Let it be assumed that switch CTS is set in its Stockhouse operating position and that undervoltage relay UV is maintained energized as hereinbefore described. Stockhouse master switch SHM then can be employed to operate the skip hoist. Assuming that the left skip is in the pit, switch SHM is moved to its Hoist Left Slow operating position to start the skip hoist. Contacts SHM2 complete an energizing circuit for hoist left relay HL in a circuit extending from line L4 through contacts GVR, CTS1, SHM2 and MAN2, limit switch LLS-1, contacts HR9 and limit switch LLS-2 to line L5. Relay HL energizes and initiates hoisting of the left skip car as hereinbefore described. Movement of switch SHM to Hoist Left Fast operating position results in closure of contacts SHM3 to complete an energizing circuit for 475 feet per minute relay 475R in a circuit extending from line L4 through limit switch RLS–7 and contacts HL7, CTS7, SHM3, MAN3 and 150R1 to line L5, limit switch RLS–7 closing when the right skip car has moved a predetermined distance out from its dump position as shown in Fig. 5. Relay 475R energizes and accelerates the skip car as hereinbefore described. Stockhouse master switch SHM is similarly operated to its Hoist Right Slow and Fast operating positions to hoist the right skip car from the pit.

To provide for manual operation of the skip hoist from the hoisthouse, switch CTS is moved to its Hoisthouse operating position and relay UV is reset as hereinbefore described in connection with automatic operation. To initiate hoisting the left skip car, hoisthouse master switch HHM is moved to its Hoist Left 75 operating position. As a result contacts HHM2 close to complete an energizing circuit for relay HL through contacts GVR, CTS2 and HHM2, switch BOS4, contacts MAN2, limit switch LLS–1, contacts HR9 and limit switch LLS–2. Relay HL initiates hoisting of the left skip car as hereinbefore described. The skip car is accelerated by movement of switch HHM to its 150 annd 475 operating positions, these numbers being indicative of the skip speed attainable in the respective operating positions. In the 150 feet per minute operating position, contacts HHM3 complete an energizing circuit for relay 150R through limit switch LLS–5 and contacts HL1, CTS4 and HHM3. Relay 150R energizes and accelerates the skip car as hereinbefore described. In the 475 feet per minute operating position, contacts HHM4 complete an energizing circuit for relay 475R through limit switch RLS–7 and contacts HL7, CTS6, HHM4 and 150R1. Relay 475R energizes and still further accelerates the skip car.

In the event of overtravel of the skip hoist beyond its normal stopping position due to maladjustment of the brakes or failure of the final stopping limit switches, two overtravel switches for each end of travel open to deenergize relay UV and hence stop the skip hoist. In the upper left-hand portion of Fig. 4B, right Lilly overtravel switch RLOT and left Lilly overtravel switch LLOT are located in the centrifugal governor and open in response to overtravel of the right and left skip cars, respectively. Also, left skip limit switch LLS–3 and right skip limit switch RLS–3 open as shown in Fig. 5 in the event of overtravel beyond the normal stopping position of the skip cars.

In the event of overtravel, it becomes necessary to perform a backout procedure hereinafter described. Assuming that the overtravel occurred when the right skip car entered the pit during automatic operation of the skip hoist, selector switch MOA in Fig. 4A moved to its Manual operating position. Charging control transfer switch CTS in Fig. 4B is moved into its Hoisthouse operating position. Backout switch BOS in the left-hand portion of Fig. 4B is moved to its Hoist Right operating position and at the same time slack cable switch SCPB in the lower right-hand portion of Fig. 4B is pressed because a slack cable condition may have occurred during the overtravel. Movement of switch BOS as described results in closure of contacts BOS2 to shunt the then open switches LLOT and LLS–3 in the undervoltage relay circuit. Movement of switch BOS also results in rotation of contacts BOS3 and BOS4 in the right-hand portion of Fig. 4B in the counterclockwise direction to their hoist right contacts HR. Thus, it becomes impossible to inadvertently energize hoist left relay HL and cause still further overtravel. Undervoltage relay UV is then energized by closing reset switch UVR. The hoisthouse master switch HHM is then turned from the Off position to the 75 Hoist Right operating position. As a result, relay HR is energized and the right skip car is hoisted from the pit. After the skip hoist cable becomes tight and the overtravel switches have closed, backout switch BOS may be returned to its normal Off position without deenergizing the undervoltage relay. After making necessary adjustments to prevent overtravel, the right skip car may be returned to its normal stopping position in the pit by turning hoisthouse master switch HHM to its 75 Hoist Left operating position.

In order to reset the skip hoist control system for automatic operation, switch CTS is turned to its Stockhouse operating position, switch RS is turned to its Off position, switch MOA is moved to its AUTO operating position, and relay UV is energized. The skip hoist will then resume automatic operation in response to movement of switch RS to its On position.

Manual operation of the distributor controller will now be described. Referring to Figs. 6A and 6B, the distributor is prepared for manual operation by moving switch MOA in Fig. 4A to its Manual operating position to energize relay MAN as described in connection with skip hoist manual operation. As a result, contacts MAN 8 in Fig. 6B and contacts MAN14 in Fig. 6A close. The distributor may then be operated manually from the stockhouse by manipulating distributor master switch DMS into its forward or reverse operating position as desired. With switch DMS in its forward operating position, manual run forward relay MRF is energized in a circuit extending through contacts MAN8, DROL2 in Remote position, and DMS1. Relay MRF closes contacts MRF1 to energize distributor forward power contactor F, thus to effect rotation of the distributor in the forward direction. Similarly, with switch DMS in its reverse operating position, manual run reverse relay MRR is energized through contacts MAN3, DROL2 and DMS2 to effect distributor rotation in the reverse direction. Alternatively, relays MRF and MRR may be selectively operated by manipulating switch DTS located at the furnace top. For the latter operation, selector switch DROL must be placed in its Local operating position.

The distributor rotation angle may be advanced manually in 60 degrees increments by pressing change distributor angle switch CDA at the left-hand portion of Fig. 6A. Each time switch CDA is pressed, a circuit is established through contacts MAN14 in shunt of contacts CDAR1 and AUTO13 to advance the DAP switch one step as hereinbefore described.

Accurate stop lamp IL17 is energized by hopper limit switch HLS–3 for a short time interval at each incremental 60 degree position of the distributor hopper. Thus, while the distributor is running, the accurate stop lamp blinks on momentarily each time a normal stopping point is passed.

Let it be assumed that it is desired to rotate the distributor in the forward direction to its 120 degree position. As the hopper passes the 60 degree position, lamp IL17 blinks on momentarily. At the instant lamp IL17 blinks on a second time indicating that the hopper has reached the 120 degree position, switch DMS is returned to the Off position to stop the distributor. Since the stopping operation is not initiated until the accurate stop light is energized, the hopper will drift beyond the normal automatic stopping point and lamp IL17 will not remain energized. However, if the operator always turns switch DMS to its Off position when the accurate stop lamp is energized, the stopping points will be 60 degrees apart. Distributor test switch DTS is provided for testing the distributor rotating mechanism. Switch DROL has an Off position in which the distributor cannot be started either manually or automatically. This position provides a convenient means of locking out the distributor motor in the event repair or adjustment is to be done on the mechanism.

The coke charging control system shown in Fig. 8 is prepared for manual operation by turning discharge selector switch DS to its Manual operating position and placing switch LCS in its On position, the latter switch energizing relay LOR. Fill selector switch FS may be left in its AUTO operating position. Left coke weigh hopper gate relay LHR may now be energized, provided the skip car is in the pit, by moving manual discharge switch MD to its Open position. The circuit for relay LHR may be traced through contacts DS2, MD, LSP7, LOR6 and LDT1. Energization of relay LHR effects dumping of the coke from the weigh hopper into the skip car as hereinbefore described in connection with automatic operation. The weigh hopper discharge gate remains open as long as switch DS is in the Open position and closes when switch DS is moved to its Close position. The left coke charging control system can be locked out either by turning fill switch FS to its Off position or by turning switch LCS to its Off position, thus releasing relay LOR. Restoration of relay LOR prevents emptying the weigh hopper into the skip car at contacts LOR6. At contacts LOR1 in Fig. 2 and contacts LOR4 in Fig. 9A the charging control system is signaled to by-pass the left coke system and obtain all coke from the right coke system. Thus, contacts LOR1 permit rotation of the SHP switch to effect hoisting of the empty left skip car and contacts LOR4 lock out the LSP switch for the empty left skip car.

Manual operation of the small bell will now be described. To prepare the small bell for manual operation, switch MOA is turned to its Manual operating position to energize relay MAN as hereinbefore described. Switch SBROL is left in its Remote operating position. The small bell can then be operated manually by manipulation of the small bell master switch SBMS. Since the furnace top must always be depressurized in order to open the small bell, operation of switch SBMS to its Open operating position automatically effects depressurizing of the furnace top before allowing the small bell to open.

Let it be assumed that the large bell is closed and the furnace top pressurized. Operation of switch SBMS to its Open operating position effects energization of relay EVC in a circuit extending through contacts MAN12, SBROL2, SBMS3, HPA2, HPA3, LBCR2 and EVO2. Relay EVC in turn effects energization of contactor EV to close the equalizer valve as hereinbefore described. Limit switches EVLS-1 and EVLS-11 close to energize relays EVCR and RVO. Relay RVO in turn effects energization of contactor RV to open the relief valve as hereinbefore described. Relay EVCR effects energization of relay SBO in a circuit extending through contacts SBROL1, SBMS1 and MAN11, limit switch LBLS-11, and contacts HPM3, RVOR2, EVCR2 and SBC3. Relay SBO effects energization of contactor SB to open the small bell. The small bell will remain open as long as switch SBMS remains in its Open operating position.

Operation of switch SBMS to its Close operating position results in deenergization of relay SBO and energization of relay SBC in a circuit extending through contacts MAN12, SBROL2, SBMS2 and SBO2. Relay SBC in turn energizes contactor SB to initiate closure of the small bell. Limit switch SBCLS-1 opens as hereinbefore described to restore contactor SB. Relay SBOR is deenergized by limit switch SBLS-2. When the small bell is fully closed, relay SBCR is energized by limit switch SBLS-1.

After the small bell is closed, the relief valve is closed and the equalizer valve is opened to automatically pressurize the furnace top as hereinbefore described in connection with automatic operation.

The small bell is normally interlocked to prevent opening of the small bell and the large bell concurrently either manually or automatically. However, if it is desired to open the small bell manually when the large bell is open, bell interlock switch contacts BIL1 in the lower portion of Fig. 11A is turned to its Out position to shunt large bell closed limit switch LBLS-11. The small bell can then be operated by manipulation of switch SBMS as hereinbefore described.

The small bell may also be manually operated to test operation of the same. Let it be assumed that switch MOA in Fig. 4A is set in its Manual operating position to energize relay MAN, the bell interlock switch BIL1 is turned to its In position, the large bell is closed, the relief valve is closed, the equalizer valve is open, and the small bell is closed. When the bell interlock switch is turned to its In position, it is necessary for the large bell to be closed and the furnace top depressurized before the small bell can be opened. If the large bell is open when it is desired to test small bell operation, selector switch LBTS shown in Fig. 14B is provided at the same station for manually operating the large bell as hereinafter described. The furnace top is depressurized automatically when the small bell is tested as will be apparent from the following description.

To open the small bell, selector switch SBROL is turned to its Local operating position. As a result, relay EVO is restored and relay EVC is energized in a circuit extending through contacts MAN12, SBROL2, HPA2, HPA3, LBCR2 and EVO2. Relay EVC energizes contactor EV to close the equalizer valve. Limit switches EVLS-1 and EVLS-11 close to energize relays EVCR and RVO, respectively. Relay RVO in turn energizes contactor RV to open the relief valve. Limit switch RVLS-2 closes to energize relay RVOR. This completes depressurizing of the furnace top.

Operation of the small bell test selector switch SBTS to its Open position results in energization of relay SBO in a circuit extending through contacts MAN12, and SBROL2, switches SBTS and LBLS-11, and contacts HPM3, RVOR2, EVCR2 and SBC3. Relay SBO energizes contactor SB to open the small bell which will remain open as long as switch SBTS remains in its Open position. To close the small bell, switch SBTS is turned to its Close position to restore relay SBO and energize relay SBC. The small bell may be locked out by turning switch SBROL to its Off position. This prevents operation of the small bell either manually or automatically.

If the cable between the small bell cylinder and the small bell becomes slack due to jamming of some part of the bell mechanism when the bell is being opened, slack cable limit switch SBLS-3 in the upper portion of Fig. 14A opens to restore bell slack cable relay BSC. Contacts BSC1 open and contacts BSC3 close in Fig. 11B to reverse the direction of travel of the small bell cylinder toward the closed position in order to remove the slack from the cable.

Relay BSC must be reset manually by pressing switch SCRS before the charging control system can resume normal operation. Timing relay BSCTR is provided to reset relay BSC automatically when control power has been interrupted for maintenance purposes and reapplied.

Operation of the relief valve and equalizer valve may be tested at any time even when the charging control is on automatic operation. The furnace top can be pressurized and depressurized at will as long as the small and large bells are closed. When the small bell is open, the furnace top cannot be pressurized. Likewise when the large bell is open, the furnace top cannot be depressurized.

To prepare for testing of the relief and equalizer valves, high pressure top selector switch HPS in the lower portion of Fig. 11B is turned to its Local operating position. As a result, relay HPA is restored and relay HPM is energized. The relief and equalizer valves may then be operated by manipulation of relief valve selector switch RVS and equalizer valve selector switch EVS, respectively. Thus, operation of switch RVS to its Open and Closed positions effects energization of relays RVO and RVC, respectively, to open and close the relief valve as hereinbefore described. Likewise, operation of switch EVS to its Open and Closed positions effects energization of relays EVO and EVC, respectively, to open and close the equalizer valve.

The control is arranged so that both valves cannot be opened at the same time. This is accomplished by interlocking limit switches EVLS–11 and RVLS–11 in the circuits of relays RVO and EVO, respectively.

The furnace top is prevented from being pressurized when the small bell is open by contacts SBCR2 and limit switch RVLS–11 in the upper right-hand portion of Fig. 11B. Thus, when the small bell is open, the relief valve cannot be closed and the equalizer valve cannot be opened. The furnace top is prevented from being depressurized when the large bell is open by contacts LBCR2 and limit switch EVLS–11. Thus, when the large bell is open, the equalizer valve cannot be closed and the relief valve cannot be opened.

When the high pressure top selector switch HPS is turned to its Off position, the relief valve and equalizer valve operators are locked out for maintenance purposes.

Manual operation of the large bell will now be described. The large bell is prepared for manual operation by turning selector switch MOA in Fig. 4A in the Manual operating position. Selector switch LBROL in the upper left-hand portion of Fig. 14B may be left in its Remote operating position. The large bell may then be operated manually by manipulation of large bell manual selector switch LBMS.

Let it be assumed that the small bell is closed and that the furnace top is pressurized. Before the large bell can be opened manually, the left and right stockrods must be hoisted. This is accomplished by turning stockrod switches LSR2 and RSR2 in the lower left-hand portion of Fig. 14B to their Out positions. As a result, relays LLSRR and LRSRR are restored and the stockrods are hoisted as hereinbefore described. When the left and right stockrods are fully hoisted, limit switches LSLS–4 and RSLS–4 close.

Operation of selector switch LBMS to its Open operating position effects energization of relay LBO in a circuit extending through contacts MAN7, switch LBROL2, contacts LBMS1, limit switches SBLS–11, RSLS–4, LSLS–4 and contacts RVCR3, EVOR3 and LBC2. Relay LBO in turn effects energization of contactor LB to open the large bell as hereinbefore described in connection with automatic operation. The large bell will remain open as long as switch LBMS remains in its Open position.

To close the large bell, selector switch LBMS is turned to its Close operating position. As a result, relay LBO is restored and relay LBC is energized in a circuit extending through contacts MAN7, switch LBROL2, contacts LBMS2 and LBO3 to close the large bell. After the large bell is closed, the stockrods may be lowered to measure the depth of the charge in the furnace by turning switches LSR2 and RSR2 to their In positions.

To provide for testing the large bell, large bell test selector switch LBTS is located at the small bell valve operator station along with the aforementioned small bell test selector switch SBTS. The large bell is normally interlocked so that the large and small bells cannot be opened concurrently either manually or automatically. If it is desired to open the large bell manually when the small bell is open, bell interlock switches BIL2 and BIL3 are turned to their Out operating positions thereby to shunt small bell closed limit switch SBLS–11 and contacts RVCR3 and EVOR3. Switches BIL2 and BIL3 are preferably mechanically interconnected with the aforementioned switch BIL1 shown in the lower portion of Fig. 11A as indicated by the broken line so that all three switches move in unison to render the bell interlock mechanism effective or ineffective.

When the bell interlock switch is turned to the In operating position, it is necessary for the small bell to be closed and the furnace top pressurized before the large bell can be opened. Also, the stockrods must be hoisted out of the furnace as hereinbefore described before the large bell can be opened.

Let it be assumed that switch MOA in Fig. 4A is in its Manual position to energize relay MAN, the small bell is closed, the relief valve is closed, the equalizer valve is open, and the stockrods are hoisted. To prepare for testing large bell operation, selector switch LBROL is turned to its Local operating position. To open the large bell, large bell test selector switch LBTS is moved to its Open position to complete an energizing circuit for relay LBO through contacts MAN7, switches LBROL2, LBTS, SBLS–11, RSLS–4 and LSLS–4 and contacts RVCR3, EVOR3 and LBC2. Relay LBO effects energization of contactor LB to open the large bell. The large bell will remain open until switch LBTS is turned to its Close position, whereupon relay LBO is restored and relay LBC is energized to effect closure of the large bell as hereinbefore described. The large bell may be locked out by turning switch LBROL to its Off position to prevent either automatic or manual operation thereof.

If the cable between the large bell cylinder and the large bell becomes slack due to jamming of some part of the bell mechanism, slack cable limit switch LBLS–3 in the upper portion of Fig. 14A opens to restore bell slack cable relay BSC. Relay BSC opens contacts BSC2 and closes contacts BSC5 in the lower portion of Fig. 14A to reverse the direction of travel of the large bell and remove the slack from the cable. Relay BSC is reset manually as hereinbefore described to enable the control system to resume normal operation.

The undervoltage relay circuit in the lower and left-hand portions of Fig. 4B has been provided with the aforementioned Lilly governor overspeed contacts LOS which open in the event of skip hoist overspeed to restore relay UV and stop the skip hoist for reasons of safety. These overspeed contacts are, however, shunted for a predetermined time interval by contacts HL6 and limit switch RLS–4 when the left skip car is being hoisted and by contacts HR6 and limit switch LLS–4 when the right skip car is being hoisted to render the same ineffective during acceleration of the skip cars. Limit switches LLS–11 and RLS–11 operate to restore the undervoltage relay in the event accelerating relays 150R and 475R fail to operate properly during slowdown, this being indicated by failure of contacts 150R2 or 475R1 to close. In addition to skip hoist limit switches RLS–3 and LLS–3, there are provided right Lilly overtravel switch RLOT and left Lilly overtravel switch LLOT of the cam operated type or the like for restoring relay UV in the event of overtravel of a skip car. The skip hoist may be stopped at any time by pressing emergency stop switch ESS and thus deenergizing the undervoltage relay.

*Testing of program switches*

As shown in the aforementioned Douglas W. Fath and Charles E. Smith copending application, Serial No. 788,553, filed January 23, 1959, two switches of the toggle type or the like are mounted in front of the drive motor on each program switch, including the SHP switch, the DAP switch, the LSP switch, the SBP switch and the LBP switch. These switches are shown in Figs. 2, 6A, 9A, 11A and 14A of the circuit diagrams as switches NT1–5 and JR1–5, respectively. These switches afford testing the operation of the program switches without actually running any of the devices controlled thereby.

Considering the test switches, switches NT1–5 are provided with a Norm operating position for normal automatic operation of each program switch and a Test operating position for testing operation of each program switch. Switches JR1–5 are provided with a Jog operating position for energizing the drive motor of each program switch as long as switches JR1–5 are maintained in that position, a Reset operating position for resetting each program switch to its normal position, and an Off position. Switches JR1–5 are preferably spring loaded to return to their Off positions when released.

To test the program switches, test selector switch TSS in the upper portion of Fig. 4A is turned to its Test position thereby to restore program test transfer contactor PTS. Contactor PTS disconnects power from the control circuits that are normally energized through contacts of the program switches and closes contacts PTS2, PTS4, PTS5, PTS7 and PTS9 to apply power to the test circuits of the SHP switch, the SBP switch, the LBP switch, the LSP switch, and the DAP switch, respectively.

To test operation of the SHP switch, switch NT1 is turned to its Test operating position. The program switch drive motor can then be energized to run the switch by manipulating switch JR1. The program switch motor runs continuously when switch JR1 is turned to its Jog position, and runs to its left skip operating position 1 when switch JR1 is turned to its Reset position while the left skip car is in the pit and resets to its right skip operating position 1 when the right skip car is in the charging pit. Switch JR1 automatically returns to its Off position when released.

To test operation of the DAP, LSP, SBP and LBP switches, switches NT2–5 are likewise turned to their Test operating positions. Similarly, the drive motors of these program switches can then be energized to run continuously when switches JR2–5 are turned to their JOG operating positions. Also, the DAP, SBP and LBP switches run to their operating position 1 when switches JR2, JR4 and JR5, respectively, are turned to their Reset positions. The LSP, SBP and LBP switch control circuits are provided with additional normal-test selector switches NT3*a*, NT4*a* and NT5*a* preferably mechanically connected to switches NT3, NT4 and NT5, respectively. Switch NT3*a* (Fig. 9A) must be turned to its Test operating position to afford manual resetting of the LSP switch in response to movement of switch JR3 to its Reset position. Switch NT3*a* is normally set in its Normal operating position to afford automatic resetting of the LSP switch after completion of each plural load charging cycle as hereinbefore described and thereby recycling the charging control system to repeat the charging sequence. Switches NT4*a* (Fig. 11A) and NT5*a* (Fig. 14A) in the SBP switch and LBP switch control circuits must be turned to their Test operating positions to disconnect control power from the small bell and large bell control circuits while the corresponding program switches are being tested.

*Program reset operation*

In the event the program switches move out of their proper sequence for any reason, the entire control system may be reset and synchronized as hereinafter described. During the resetting operation, the large bell is automatically dumped, and all the program switches are reset to their normal positions.

Let it be assumed that one skip car is in the pit so that relay SPR is energized and contacts SPR1 in the upper left-hand portion of Fig. 4A are closed. Skip hoist run-stop selector switch RS is turned to its Off position. The left and right coke system selector switches LCS and RCS2 are turned to their Off positions. The latter switches prevent the dumping of coke on top of any material that may already be in the skip car at the time of the reset operation if the first load of the charging sequence is coke. If the skip car is empty at the time of the reset operation and coke is preselected for the first load in the charging sequence, the prescheduled coke load can be automatically dumped into the skip car by turning the coke system selector switches to their On positions as soon as the reset operation is completed. The operator is advised of completion of the reset operation by momentary energization of program reset lamp IL4 in Fig. 4A and energization of the load summary lights in the lower portion of Fig. 9B. Selector switch TSS in the upper left-hand portion of Fig. 4A is turned to its Normal position so that program test transfer contactor PTS is energized.

To initiate the reset operation, program reset switch PR in the upper portion of Fig. 4A is pressed to effect energization of program reset relay PRR in a circuit extending through contacts SPR1, switches LCS2, RCS2, RS1 and PR and contacts PARR1. Relay PRR energizes and opens contacts PRR1 in the upper left-hand portion of Fig. 4A to deenergize contactor PTS thereby to disconnect power from the control circuits normally energized for automatic operation and to connect control power to the program switch reset circuits. In Fig. 4A, relay PRR also closes contacts PRR2 to complete a holding circuit for its operating coil in shunt of switches LCS2, RCS2, RS1 and PR, closes contacts PRR3 to reset load cycle counter LCC, and closes contacts PRR4 to prepare an energizing circuit for programs-all-reset relay PARR to be subsequently completed when all the program switches reach their No. 1 operating positions. In Fig. 2, relay PRR closes contacts PRR5 to complete the reset circuit of the SHP switch, and opens contacts PRR6 to interrupt the automatic indexing circuit of the SHP switch. In Fig. 6A, relay PRR closes contacts PRR7 to complete the reset circuit of the DAP switch, and opens contacts PRR8 to interrupt the automatic indexing circuit of the DAP switch. In Fig. 9A, relay PRR closes contacts PRR9 to complete the reset circuit of the LSP switch, opens contacts PRR10 to interrupt the automatic indexing circuit of the LSP switch, and opens contacts PRR11 to render load cycle counter LCC ineffective. In Fig. 11A, contacts PRR12 complete the reset circuit of the SBP switch, and contacts PRR13 interrupt the automatic indexing circuit of the SBP switch. In Fig. 14A, contacts PRR14 interrupt the LBP switch drive motor circuit for operating position 1, contacts PRR15 complete a shunt across contacts SSR6 in the LBP switch drive motor circuit to afford operation of the large bell under reset conditions, and contacts PRR16 complete the reset energizing circuit of the LBP switch drive motor in shunt of contacts DLB1. In Fig. 17, contacts PRR17 open to render the extra load control system ineffective.

Assuming that the right skip car is in the pit, closure of contacts PRR5 effects energization of the SHP switch in a circuit extending from line L2 through contacts PTS2, SHP–2B, RSP4 and PRR5, switch NT1 and motor field winding F1 to line L3. The SHP switch rotates until contacts SHP–2B open in right skip operating position 1. If the left skip car is in the pit when the reset operation is performed, a circuit is established through contacts SHP–2A and LSP1 in shunt of the aforementioned contacts SHP–2B and RSP4 to rotate the SHP switch until contacts SHP–2A open in left skip operating position 1.

Closure of contacts PRR7 completes the energizing circuit of the DAP switch drive motor from line L9 through contacts PTS9, DAP–10 and PRR7, switch NT2 and field winding F2 to line L10. The DAP switch rotates until contacts DAP–10 open in operating position 1.

Closure of contacts PRR9 completes the energizing circuit of the LSP switch drive motor from line L16 through contacts PTS7 and PRR9, switch NT3*a*, contacts LSP–21, switch NT3 and field winding F3 to line L17. The LSP switch rotates until contacts LSP–21 open in operating position 1.

Closure of contacts PRR12 completes the energizing circuit of the SBP switch drive motor from line L19 through contacts PTS4, SBP–2 and PRR12, switch NT4 and field winding F4 to line L20. The SBP switch rotates until contacts SBP–2 open in operating position 1.

The aforementioned reset energizing circuit of the LBP switch may be traced from line L21 through switch NT5*a*, contacts LBP–2R, PRR16, AUTO18 and PRR2, switch NT5 and field winding FS to line L23, assuming that the large bell is closed and the LBP switch is in operating position 2, its normal waiting position. As a result, the LBP switch is driven to operating position 3 and therethrough and through operating positions 4 through 11 to operating position 1 to control hoisting of the stockrods, opening and closing of the large bell and lowering of the stockrods as hereinbefore described. When the LBP switch reaches operating position 1, contacts LBP–1 in Fig. 4A complete the energizing circuit of programs-all-reset relay PARR and program reset lamp IL4, contacts SHP–1, DAP–11, SBP–1 and LSP–23 having been closed when the respective program switches were reset as hereinbefore described. Relay PARR opens contacts PARR1 to interrupt energization of program reset relay PRR. Contacts PRR1 close to reenergize contactor PTS thereby to apply power to the charging control networks and energize the load summary lights. Contacts PRR4 restore relay PARR. This completes the reset operation.

Energization of program reset lamp IL4 and the load summary lights indicates to the scale car operator that the reset operation has been completed. If coke is scheduled for the first load and the skip car in the pit is empty, left and right coke system selector switch LCS and RCS2 are turned to their On positions to dump coke automatically into the skip car. If the skip car in the pit had been filled before the reset operation was initiated, the coke system selector switches are left in their Off positions until the skip car leaves the pit. Normal automatic operation can be resumed by turning skip hoist switch RS to its On position.

During normal automatic operation of the charging control system, distributor by-pass switches DBP1 and DBP2 shown in the upper portions of Figs. 2 and 11A, respectively, are set in their Norm operating positions as shown whereby to interlock the SHP switch and the SBP switch with the distributor. In the event the distributor becomes inoperative or it is desired to operate the charging control system without distributor rotation, this can be accomplished by turning selector switch DROL in the left-hand portion of Fig. 6B to its Off position and turning distributor by-pass switches DBP1 and DBP2 to their By-Pass operating positions. Switch DROL locks out the distributor. Switch DBP1 shunts distributor stop relay contacts DMR1 and distributor run relay contacts DR1 to permit operation of the skip hoist program control, while switch DBP2 shunts distributor stop relay contacts DMR2 to permit operation of the small bell program control. Thus, automatic charging of the furnace can be carried on while the distributor is rendered ineffective.

We claim:

1. In a charging program control system for a blast furnace wherein the ore, stone and coke are conveyed by skip hoist apparatus from a charging pit to a rotatable distributor hopper at the upper portion of the furnace, the furnace being provided with a small bell associated with the distributor hopper, and a large bell, and wherein the small bell is arranged to open and discharge each skip load from the hopper onto the large bell and the large bell is arranged to open and drop a plurality of skip loads accumulated thereon into the furnace, the combination of means responsive to a skip car entering the charging pit for stopping the skip hoist, load summary program control means comprising means for preselecting a plural-load charging program of ore, stone and coke and means for filling each skip car when it enters the charging pit with the preselected charging material, skip hoist program control means comprising a multi-position program switch for automatically restarting the skip hoist a predetermined time interval after stopping thereof on coke loads and comprising manual control means for restarting the skip hoist on ore and stone loads, and small bell program control means comprising a multi-position program switch responsive to said skip hoist program switch after a skip load has left the charging pit for opening and closing the small bell.

2. The invention defined in claim 1, together with distributor angle program control means operative a predetermined time interval after a skip load is dumped into the distributor hopper for controlling the angle of rotation of the distributor hopper in accordance with a predetermined program.

3. The invention defined in claim 1, together with means in said load summary program control means for manually preselecting a distributor angle change for a given skip load of the charging program, and distributor angle program control means responsive to said small bell program control means and said angle change preselecting means when said given load has been dumped in the distributor hopper for changing the angle to which the distributor hopper shall thereafter be rotated a uniform incremental amount.

4. The invention defined in claim 1, together with means in said load summary program control means for manually preselecting a large bell dumping cycle for a given skip load of the charging program, and large bell program control means responsive to said small bell program control means and said dumping cycle preselecting means when said given load has been deposited on the large bell for affording a large bell dumping cycle.

5. In a charging program control system for a blast furnace wherein ore, stone and coke are conveyed by skip car apparatus to a distributor hopper at the upper portion of the furnace, said furnace being provided with small and large bells, and wherein the small bell is arranged to open and discharge its load onto the large bell each time that the skip car apparatus conveys a load to the distributor hopper, the combination of a series of manually presettable ore, stone and coke designating selector switches arranged to be preset in accordance with a preselected skip load charging program, a rotary stepping switch, means responsive to conveying of each successive skip load for effecting successive stepping of said rotary switch, means responsive to said preset selector switches and to the operation of said rotary switch for filling the skip cars with the preselected charging materials, means responsive to filling a skip car with coke for automatically restarting said skip car to convey the coke load to the distributor hopper, said skip car apparatus requiring manual restarting on ore and stone loads, and means responsive to conveying the last skip load of the preselected charging program for resetting said rotary switch to its normal position thereby to recycle said charging program.

6. In a blast furnace charging program control system for charging the furnace in accordance with a preselected charging sequence, the combination with an upper receptacle, a lower receptacle, a large bell normally closing the bottom of said lower receptacle and a small bell normally closing said lower receptacle from said upper receptacle, said upper receptacle and said small bell forming a rotatable distributor hopper, and skip hoist means for hoisting preselected charging materials and dumping the same into said distributor hopper, of load summary program control means comprising a group of presettable means for preselecting an ore, stone or coke charge for any given skip load of a plural-load charging sequence, means for starting said skip hoist, means in said load summary program control means progressively responsive to hoisting of said preselected skip loads for sensing succeeding ones of said presettable means, and means responsive to said sensing means for charging the furnace in accordance with the preselected charging sequence, the last mentioned means being operative following initial starting of the skip hoist for automatically charging coke loads, the skip hoist requiring restarting for each preselected ore and stone load.

7. The invention defined in claim 6, together with a group of presettable means for preselecting a water charge for any given skip load of the charging sequence, said sensing means also sensing succeeding ones of said water charge preselecting means, and means responsive to said sensing means for charging a predetermined volume of water into the skip car in accordance with setting of said water charge preselecting means.

8. The invention defined in claim 6, together with a group of presettable means for preselecting a large bell dump operation for said given skip load of the charging sequence, said sensing means also sensing succeeding ones of said large bell dump preselecting means, means in said sensing means for delaying the sensing of said large bell dump preselecting means relative to the sensing of the first mentioned preselecting means to enable deposit of said given skip load on the large bell before operation of the latter is effected, and means responsive to said sensing means for effecting operation of the large bell to discharge said given skip load into the furnace.

9. The invention defined in claim 6, together with means for registering the number of skip loads of charging material accumulated on the large bell in the lower receptacle by counting the small bell dumps, and means responsive to said registering means registering a predetermined number for automatically effecting lowering of the large bell, means for timing the open interval of the large bell, and means responsive to said timing means for raising the large bell to close said lower receptacle.

10. In a blast furnace charging program control system for charging the furnace in accordance with a preselected charging sequence, the combination with an upper small bell, a lower large bell, a relief valve connecting the space between the bells to the atmosphere, an equalizer valve connecting the space between the bells to the interior of the furnace, stockrods for measuring the charge in the furnace and control means for raising and lowering the stockrods, of large bell program control means comprising a program switch having a plurality of operating positions for controlling lowering and raising of the large bell and a control network therefor comprising a plurality of sequentially-operable contacts for completing energizing circuits to operate said program switch, and a plurality of check devices respectively in circuit with said contacts insuring when operated that the furnace is not full, the small bell is closed, the stockrods are raised, the relief valve is closed and that the equalizer valve is open.

11. In a blast furnace charging program control system for charging the furnace in accordance with a preselected skip hoist load charging sequence, the combination with a lower large bell normally closing the furnace, an upper small bell normally closing the space between the bells from the atmosphere, a normally closed relief valve for connecting the space between the bells to the atmosphere, a normally open equalizer valve connecting the space between the bells to the interior of the furnace, and stockrods for measuring the charge in the furnace, of automatic means for controlling the large bell and the stockrods in response to a dump-large-bell signal from the charging control system, first manual control means at a remote station for operating the large bell, selectively operable means for transferring the large bell and stockrods from automatic to manual operation, second manual control means at said remote station for operating the stockrods, means responsive to operation of said second manual control means when said transfer is effected for raising and lowering the stockrods, and bell control means responsive to operation of said first manual control means when said transfer is effected and said stockrods are fully raised for lowering and raising the large bell.

12. The invention defined in claim 11, together with a third manual control means at a local station for testing large bell operations, said bell control means being operative when said transfer is effected and said stockrods are fully raised to lower and raise the large bell in response to operation of said third manual control means.

13. In a blast furnace charging program control system for charging the furnace in accordance with a preselected skip load charging sequence, the combination with an upper small bell, a lower large bell, a relief valve connecting the space between the bells to the atmosphere, an equalizer valve connecting the space between the bells to the interior of the furnace, and a rotatable distributor hopper associated with the small bell, of small bell program control means comprising a program switch having a plurality of operating positions for controlling lowering and raising of the small bell to discharge material dumped into the distributor hopper and a control network therefor comprising a plurality of sequentially-operable contacts on said program switch for completing energizing circuits to operate the latter, and a plurality of check devices in circuit with said contacts insuring when operated that the equalizer valve is closed, the relief valve is open and that the large bell is closed, said check devices preventing operation of said program switch to open the small bell until the aforementioned conditions are attained.

14. The invention defined in claim 13, wherein said check devices are operable to also insure that the distributor is stopped, said check devices preventing operation of said program switch to open the small bell until the aforementioned conditions are attained.

15. In a blast furnace charging program control system for charging the furnace in accordance with a preselected skip hoist load charging sequence, the combination with a lower large bell normally closing the furnace, an upper small bell normally closing the space between the bells from the atmosphere, a normally closed relief valve for connecting the space between the bells to the atmosphere, and a normally open equalizer valve connecting the space between the bells to the interior of the furnace, of automatic means for controlling the small bell and relief and equalizer valves in response to operation of the skip hoist, manual control means at a remote station for operating the small bell, selectively operable means for transferring the small bell from automatic to manual operation, and means responsive to operation of said manual control means when said transfer is effected for operating the small bell and relief and equalizer valves.

16. The invention defined in claim 15, together with manually operable means at a local station for testing small bell operation, and means responsive to operation of said testing means when said transfer is effected for operating the small bell and relief and equalizer valves.

17. The invention defined in claim 15, together with manually operable means at a local station for testing relief and equalizer valve operation, selectively operable means for transferring said valves from automatic to test operation and for rendering said automatic means ineffectivce, and means responsive to operation of said manually operable means when the last mentioned transfer is effected for operating the relief and equalizer valves.

18. In a blast furnace charging program control system for charging the furnace in accordance with a preselected skip load charging sequence, the combination with a rotatable distributor hopper at the upper portion of the furnace, a small bell normally closing the lower portion of said hopper, and a skip hoist for conveying charging materials from a charging pit at the base of the furnace and dumping the same into said hopper, said skip hoist comprising left and right skip cars arranged in counterbalancing relation so that when one skip car is in the charging pit the other skip car is in its dump position over the distributor hopper, of skip hoist program control means comprising a program switch having a plurality of operating positions and self-operated contacts sequentially operable for completing energizing circuits to advance said switch through its operating positions, and a plurality of check devices in circuit with said contacts insuring when operated that the distributor has been rotated and that preselected charging material has been discharged into the skip car.

19. In a blast furnace charging program control system for charging the furnace in accordance with a preselected skip load charging sequence, in combination with a rotatable distributor hopper at the upper portion of the furnace, a small bell normally closing the lower portion of said hopper, and a skip hoist for conveying charging materials from a charging pit at the base of the furnace and dumping the same into said hopper, said skip hoist comprising left and right skip cars arranged in counterbalancing relation so that when one skip car is in the charging pit the other skip car is in its dump position over the distributor hopper, of skip hoist program control means comprising a program switch having a plurality of operating positions, means responsive to a skip car entering the charging pit for initiating operation of said program switch, means automatically operable for discharging charging material into each skip car when the latter is in the charging pit, means responsive to operation of said program switch for operating said skip hoist, small bell program control means, and means responsive to further operation of said program switch after said skip car has left the pit for initiating operation of said small bell program control means to operate the small bell.

20. The invention defined in claim 19, together with check means responsive to said skip car approaching its dump position over the distributor hopper for stopping the skip hoist in the event the small bell is open, means responsive to closure of the small bell for operating said small bell program control means, means responsive to operation of said small bell program control means for operating said skip hoist program switch, and means responsive to said skip hoist program switch for operating said check means to restart said skip hoist thereby to dump the skip car load into the distributor hopper.

21. In a high pressure blast furnace top, the combination with a normally closed large bell for closing the furnace and a normally closed small bell in series relation with the large bell for closing the space between the bells from the atmosphere, and interlocking means for normally preventing opening of the small bell when the large bell is open and for preventing opening of the large bell when the small bell is open, of selectively operable means operative when set in one operating position for rendering said interlocking means effective and operative when set in another operating position for rendering said interlocking means ineffective.

22. The invention defined in claim 21, together with a normally closed relief valve for connecting the space between the bells to the atmosphere, a normally open equalizer valve connecting the space between the bells to the interior of the furnace, and second interlocking means for normally preventing opening of the large bell unless the relief valve is closed and the equalizer valve is open, said selectively operable means being operative when set in one operating position for rendering said second interlocking means effective and operative when set in another operating position for rendering said second interlocking means ineffective.

23. In a charging program control system for a blast furnace, a plurality of manually presettable charging sequence selector switches each comprising a contact set having ore, stone and coke designating operating positions and an off position and adapted to be preset in accordance with a desired skip load program for a plural-load charging sequence, control means for charging the blast furnace in accordance with the charging sequence preset on said selector switches, permissive means operable when energized for preparing said control means for operation and operable when deenergized for preventing operation of said control means, and means comprising additional contact sets on said selector switches for establishing an energizing circuit for said permissive means only when said selector switches are set correctly, said correct setting comprising a setting of each consecutive selector switch to a load designating operating position in accordance with the corresponding load in said charging sequence and a setting of the remaining selector switches if any in their off positions.

24. In a blast furnace charging program control system for charging the furnace in accordance with a preselected charging load sequence, the combination with a small bell in series relation with a large bell providing a high pressure furnace top and a charge-receiving rotatable distributor hopper associated with the small bell, of means for preselecting a distributor angle change to occur at a given load in the charging sequence, and means for effecting a distributor angle change in response to charging of said given load.

25. In a blast furnace charging program control system for charging the furnace in accordance with a preselected skip load charging sequence, the combination with skip hoist means comprising a pair of skip cars in counterbalancing relation for alternately conveying loads of charging materials from a charging pit to the top of the furnace, a rotatable distributor hopper for receiving said loads, and a small bell normally closing the bottom of said hopper, of distributor angle program control means having a zero degree position and a plurality of operating position settings designating rotation angles in uniform incremental amounts, presettable means for preselecting a distributor angle change for any given load of the charging sequence, said distributor angle change constituting a movement of said control means to the next operating position or to said zero degree position from the last operating position, means for operating said skip hoist means, means responsive to the second skip car entering the charging pit when the first skip car has dumped said given load on said small bell in said distributor hopper for rotating said latter in accordance with the operating position setting of said control means, and means responsive to said second skip car leaving the charging pit for effecting a distributor angle change.

26. In a blast furnace charging program control system for charging the furnace in accordance with a preselected skip load charging sequence, the combination with a small bell in series relation with a large bell providing a high pressure furnace top and a charge-receiving rotatable distributor hopper associated with the small bell, of distributor angle program control means responsive to operation of said charging program control system for initiating rotation of said distributor hopper to a predetermined angular position after each skip load is dumped into said hopper, counting means responsive to rotation of said hopper for registering increments of angular rotation and stopping said hopper at said predetermined angular position, small bell program control means for controlling movement of the small bell to discharge the charging material therefrom onto the large bell, and means responsive to operation of said small bell program control means for resetting said counting means to its normal position.

27. In a charging program control system for a blast furnace, the combination with a small bell in series relation with a large bell providing a high pressure furnace top, and a charge-receiving rotatable distributor hopper associated with the small bell, of a group of manually presettable charging sequence selector switches having a plurality of diverse charging material designating operating positions and adapted to be preset in accordance with a desired skip load program for a plural-load charging sequence, control means for charging the furnace in accordance with the setting of said selector switches, means for controlling the degree of angular rotation of said distributor hopper in response to a preselected skip load count, means responsive to completion of said charging sequence for recycling said control means to repeat said charging sequence, and means responsive to initiation of said repeating charging sequence for advancing the degree of angular rotation of said distributor hopper.

28. In a blast furnace charging program control system for charging the furnace in accordance with a preselected skip load charging sequence, the combination with a small bell in series relation with a large bell providing a high pressure furnace top, of a group of presettable large-bell-dump selector switches adapted to be preset to schedule a large bell dump following the deposit of a given load of the charging sequence onto the large bell, small bell program control means for controlling lowering and raising of the small bell to deposit said given load onto said large bell, load summary program control means progressively responsive to hoisting of the skip loads for sensing succeeding ones of said selector switches whereby to prepare for a large bell dump when the selector switch corresponding to said given load is sensed, and means jointly responsive to operation of said small bell program control means effecting deposit of said given load onto said large bell and to said sensing of the selector switch corresponding to said given load for initiating a large bell dump.

29. In a blast furnace charging program control system for charging the furnace in accordance with a preselected skip load charging sequence, said furnace having an upper receptacle, a lower receptacle, a large bell for closing the bottom of said lower receptacle, and a small bell for closing said lower receptacle from said upper receptacle, in combination, presettable means for preselecting a lowering operation of the large bell for any given loads of the charging sequence, control means for lowering and raising the small bell to deposit said given loads onto the large bell, and means effective when each of said given loads is deposited on the large bell for lowering the latter to drop the charge into the furnace.

30. The invention defined in claim 29, together with means responsive to initiation of charging of the first skip load of the charging sequence for lowering the large bell before said first skip load has been deposited thereon.

31. The invention defined in claim 29, together with means for counting the number of skip loads accumulated on the large bell, means responsive to said counting means when a predetermined number of skip loads have been deposited on the large bell for effecting a lowering operation of the latter, and means responsive to said lowering operation of the large bell for resetting said counting means to its normal position.

32. The invention defined in claim 29, together with means for counting the number of skip loads accumulated on the large bell, means responsive to said counting means for effecting a lowering operation of the large bell, and means for adjusting the last mentioned means to effect a lowering operation of the large bell at any desired count.

33. In a blast furnace charging program control system for charging the furnace in accordance with a preselected skip load charging sequence, said furnace having an upper receptacle, a lower receptacle, a large bell for closing the bottom of said lower receptacle and a small bell for closing said lower receptacle from said upper receptacle, and skip hoist means for automatically dumping loads of charging materials into the upper receptacle, in combination, means under the control of the skip hoist means for lowering and raising the small bell to deposit each skip load onto the large bell, means for counting the number of skip loads accumulated on the large bell, and means responsive to said counting means for effecting a lowering operation of the large bell on a predetermined maximum count to prevent accumulation of material whereby to jam the small bell.

34. In a blast furnace charging program control system for charging the furnace in accordance with a preselected skip load charging sequence, the combination with a rotatable distributor hopper at the upper portion of the furnace, a small bell normally closing the lower portion of said hopper, and a skip hoist for conveying charging materials from a charging pit at the base of the furnace and dumping the same into said hopper, of load summary program control means comprising a plurality of presettable devices each having a plurality of diverse charge designating operating positions for preselecting a desired skip load charging sequence, skip hoist program control means operative in response to a skip car entering the charging pit, skip loading control means responsive to said skip hoist program control means for discharging charging material into the skip car in accordance with the preselected charging sequence, extra load control means operable before a skip car enters the charging pit for initiating an extra load of predetermined charging material at any desired point in the preselected charging sequence, and means responsive to operation of said extra load control means for rendering said skip loading control means ineffective until said extra load has been charged.

35. The invention defined in claim 34, wherein said extra load control means comprises means for initiating an extra scrap load at any desired point in the charging sequence, means responsive to operation of said skip hoist program control means for opening the small bell, said extra scrap load initiating means being operative to maintain skip hoist operation to dump the extra scrap load into the distributor hopper and to maintain the small bell open, timing means responsive to the next skip car entering the pit during dumping of said extra scrap load for maintaining the small bell open for a predetermined time interval, and means responsive to said timing means timing out for resetting said extra scrap load initiating means.

36. The invention defined in claim 34, wherein said extra load control means comprises means for initiating an extra water charge for any given skip load of the charging sequence, said extra water charge being discharged into the given skip car along with the preselected charging material, and means responsive to operation of said skip hoist control means for resetting said extra water charge initiating means.

37. In a blast furnace charging program control system for charging the furnace in accordance with a preselected skip load charging sequence, the furnace having a large bell, a small bell, a rotatable distributor hopper associated with the small bell and a skip hoist mechanism for conveying charging materials from a charging pit to the distributor hopper, the combination of a skip hoist program switch, a distributor angle program switch, a small bell program switch, a large bell program switch, and a load summary program switch, control means for said program switches in interlocking arrangement to provide for operation of said switches in a predetermined operating sequence, a manually operable reset switch common to said program switches for synchronizing said program switches in the event the latter should move out of their proper operating sequence, and means responsive to operation of said reset switch for resetting said program switches to their normal positions.

38. In a blast furnace charging program control system for charging the furnace in accordance with a preselected skip load charging sequence, the combination of skip hoist means comprising a pair of skip cars traveling in opposite directions between a charging pit and a distributor hopper at the upper portion of the furnace, limit switch means responsive to a skip car entering the charging pit for stopping said skip hoist means, skip hoist program control means for automatically restarting said skip hoist means and controlling operation thereof, an undervoltage relay, automatic and manual control means, a selector switch for transferring said control system from said automatic to said manual control means, said automatic control means being energized through a contact of said undervoltage relay when energized, said undervoltage relay being energized through contacts of said automatic and manual control means when energized, and means for maintaining said undervoltage relay energized while said control system is transferred between automatic and manual control.

39. In a blast furnace charging program control system for charging the furnace in accordance with a preselected skip load charging sequence, the combination of skip hoist means comprising a pair of skip cars traveling in opposite directions between a charging pit and a distributor hopper at the furnace top, limit switch means responsive to a skip car entering the charging pit for stopping said skip hoist means, skip hoist program control means for automatically restarting said skip hoist and controlling operation thereof, manual control means for operating said skip hoist means, means for transferring said control system from automatic to manual control, an undervoltage relay for normally applying power to said skip hoist means, overtravel means responsive to failure of said skip hoist to stop when a skip car enters the charging pit for deenergizing said undervoltage relay, and back-out switch means for shunting said overtravel means to effect reenergization of said undervoltage relay and for energizing said skip hoist means to move said skip car out of the charging pit, said back-out switch insuring against movement of said skip car further into the charging pit.

40. In a blast furnace charging program control system for charging the furnace in accordance with a preselected skip load charging sequence, the furnace being provided with a rotatable distributor hopper, a small bell closing the lower portion of said distributor hopper, and skip hoist means having a pair of skip cars for conveying charging materials from a charging pit into said hopper, the combination of distributor rotation control means operable a predetermined time interval after the first skip car enters its dump position over the distributor hopper and in response to the other skip car entering the charging pit for automatically effecting rotation of the distributor hopper to a predetermined angle, manual control means at a remote position for operating said distributor hopper, and means for transferring the control system from automatic to manual operation.

41. The invention defined in claim 40, together with selectively operable means having a remote position for automatic and manual control of the distributor hopper and a local position, testing control means, and means responsive to operation of said testing control means when said selectively operable means is in its local position for testing the operation of said distributor hopper.

42. In a blast furnace charging program control system for charging the furnace in accordance with a preselected skip load charging sequence, the combination of a large bell for closing the furnace top, a small bell for closing the space between the bells from the atmosphere, a normally open equalizer valve connecting the space between the bells to the interior of the furnace, a normally closed relief valve for connecting when opened the space between the bells to the atmosphere, automatic means for closing said equalizer valve and opening said relief valve in response to initiation of opening of the small bell, manually operable means for operating said valves, and selectively operable means having an automatic designating operating position for rendering said automatic means effective and a manual designating operating position for rendering said manually operable means effective.

43. The invention defined in claim 42, together with means for preventing opening of said relief valve when said equalizer valve is open and means for preventing opening of said equalizer valve when said relief valve is open, and said manually operable means being effective to open one of said valves only when the other valve is closed.

44. In a blast furnace charging program control system for charging the furnace in accordance with a preselected skip load charging sequence, the furnace being provided with a rotatable distributor hopper, a small bell closing the lower portion of said hopper, and skip hoist means comprising a pair of skip cars in counterbalancing relation for conveying charging materials from a charging pit to said distributor hopper, the combination of distributor angle program control means for controlling rotation of the distributor hopper to a predetermined angular position in response to each dumping operation of the skip hoist means, presettable means responsive to charging of a given load of the charging sequence for changing the angle to which said distributor hopper shall be rotated thereafter, a manually operable switch, and means responsive to each closure of said manually operable switch for advancing the angular position to which said distributor hopper shall be rotated thereafter by a uniform incremental amount.

45. In a blast furnace charging program control system for charging the furnace in accordance with a preselected skip load charging sequence, the combination of a large bell for closing the furnace top, a small bell for closing the space between the bells from the atmosphere, cables connected to said bells, operating means connected to said cables for lowering and raising said bells, and means responsive to slack in one of said cables when the corresponding bell is being lowered for reversing said operating means thereby to raise the corresponding bell.

46. In a blast furnace charging program control system for charging the furnace in accordance with a preselected skip load charging sequence, the furnace being provided with a receptacle at its upper portion, the combination of skip hoist apparatus comprising a pair of skip cars in counterbalancing relation for conveying charging materials from a charging pit to said receptacle, cables connected to said skip cars, operating means connected to said cables for moving said skip cars, electroresponsive means energizable for connecting power to said operating means, and means responsive to detection of slack in said cables for deenergizing said electroresponsive means.

47. In a blast furnace charging program control system for charging the furnace in accordance with a preselected skip load charging sequence, the combination of a first group of manually presettable devices each having ore, stone and coke designating operating positions for preselecting a desired plural skip car load charging sequence, a second group of manually presettable devices for preselecting a water charge for any skip car load of said charging sequence, load summary program control means responsive to charging of each skip load of the charging sequence for sensing the device in each of said groups corresponding to the next skip load of charging sequence, and means responsive to said sensing means for filling each skip car in accordance with the settings of said presettable devices.

References Cited in the file of this patent

UNITED STATES PATENTS

| | | |
|---|---|---|
| 1,283,826 | Lindquist | Nov. 5, 1918 |
| 1,837,685 | Smith | Dec. 22, 1931 |
| 1,848,972 | Peebles | Mar. 8, 1932 |
| 1,937,951 | Fox et al. | Dec. 5, 1933 |
| 2,322,406 | Whitcomb et al. | June 23, 1943 |
| 2,773,610 | Mohr et al. | Dec. 11, 1956 |